US012795006B2

(12) United States Patent
Lin et al.

(10) Patent No.: US 12,795,006 B2
(45) Date of Patent: Nov. 10, 2026

(54) HINGE MECHANISM AND FOLDABLE DEVICE

(71) Applicant: Huawei Technologies Co., Ltd., Shenzhen (CN)

(72) Inventors: Yangming Lin, Dongguan (CN); Zhibin Zhang, Dongguan (CN); Shuqin Xie, Wuhan (CN); Qiang Zhan, Dongguan (CN); Haiqiang Tian, Dongguan (CN); Feng Jiang, Wuhan (CN); Ding Zhong, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 115 days.

(21) Appl. No.: 18/943,308

(22) Filed: Nov. 11, 2024

(65) Prior Publication Data

US 2025/0071196 A1 Feb. 27, 2025

Related U.S. Application Data

(63) Continuation of application No. PCT/CN2023/092118, filed on May 4, 2023.

(30) Foreign Application Priority Data

May 16, 2022 (CN) ........................ 202210531048.X

(51) Int. Cl.
*H04M 1/02* (2006.01)

(52) U.S. Cl.
CPC ................................ *H04M 1/0218* (2013.01)

(58) Field of Classification Search
None
See application file for complete search history.

(56) References Cited

U.S. PATENT DOCUMENTS

| | | | | |
|---|---|---|---|---|
| 2016/0378203 | A1 | 12/2016 | Kim et al. | |
| 2021/0120687 | A1* | 4/2021 | Kim | E05D 11/00 |
| 2022/0104370 | A1 | 3/2022 | Wu et al. | |
| 2022/0217859 | A1* | 7/2022 | Lee | G06F 1/1652 |
| 2023/0076291 | A1* | 3/2023 | Yun | H04M 1/022 |

(Continued)

FOREIGN PATENT DOCUMENTS

| | | |
|---|---|---|
| CN | 106255935 A | 12/2016 |
| CN | 110784570 A | 2/2020 |

(Continued)

*Primary Examiner* — Nicholas J Lee
(74) *Attorney, Agent, or Firm* — Conley Rose, P.C.

(57) ABSTRACT

A hinge mechanism includes two guide rod mechanisms that are respectively formed between a main shaft assembly in the hinge mechanism, a first support arm, a first guide rod arm, and a first connecting frame, and between the main shaft assembly in the hinge mechanism, a second support arm, a second guide rod arm, and a second connecting frame. A first support plate and a second support plate are respectively fastened to the first support arm and the second support arm. The first support arm and the first connecting frame are rotatably connected through a first arc-shaped sliding groove and a first arc-shaped arm that are in sliding fit. The second support arm and the second connecting frame are rotatably connected through a second arc-shaped sliding groove and a second arc-shaped arm that are in sliding fit.

20 Claims, 22 Drawing Sheets

(56) References Cited

U.S. PATENT DOCUMENTS

| | | | | |
|---|---|---|---|---|
| 2023/0176629 | A1* | 6/2023 | Cho | G06F 1/1681 361/679.27 |
| 2024/0023260 | A1* | 1/2024 | Feng | H05K 5/0226 |
| 2024/0028084 | A1* | 1/2024 | Feng | E05D 3/122 |
| 2024/0121905 | A1* | 4/2024 | Cao | F16C 11/04 |

FOREIGN PATENT DOCUMENTS

| | | | |
|---|---|---|---|
| CN | 111866235 | A | 10/2020 |
| CN | 112995368 | A | 6/2021 |
| CN | 217849479 | U | 11/2022 |
| CN | 113795683 | B | 12/2022 |

* cited by examiner

HINGE MECHANISM AND FOLDABLE DEVICE

CROSS-REFERENCE TO RELATED APPLICATIONS

This is a continuation of International Patent Application No. PCT/CN2023/092118, filed on May 4, 2023, which claims priority to Chinese Patent Application No. 202210531048.X, filed on May 16, 2022. The disclosures of the aforementioned applications are hereby incorporated by reference in their entireties.

TECHNICAL FIELD

Embodiments of this disclosure relate to the field of electronic device technologies, and in particular, to a hinge mechanism and a foldable device.

BACKGROUND

With development of screen technologies, flexible displays are increasingly used in electronic devices. A foldable device (for example, an electronic device like a foldable mobile phone, a foldable tablet, or a foldable computer) with a flexible display is expected to keep a good appearance with high reliability and user-friendly operation experience when folded and unfolded.

The foldable device includes a flexible display, two housings, and a hinge mechanism. The hinge mechanism may be folded and unfolded. The two housings are respectively fastened to two sides of the hinge mechanism, and are configured to mount and support the flexible display. The two housings and the flexible display mounted on the housings may be folded and unfolded together with the hinge mechanism. In a process of using the foldable device, the flexible display needs to be frequently folded along with the foldable device for a long term. Consequently, the flexible display has a short service life.

Therefore, how to design a hinge mechanism to ensure that the flexible display is not pulled in a folding process is an urgent problem to be resolved currently.

SUMMARY

Embodiments of this disclosure provide a hinge mechanism and a foldable device. Based on a structure design of a foldable assembly with a hinge mechanism, display accommodating space that is expanded at an end and that is used for folding a flexible display can be formed, and the formed display accommodating space is large, stable in form, and small in tolerance, so that a risk of damage to the flexible display in a folding process can be reduced.

According to a first aspect of this disclosure, a hinge mechanism is provided, including a main shaft assembly, a foldable assembly, and a support assembly. The foldable assembly is capable of rotating relative to the main shaft assembly, so that the hinge mechanism is switched between an unfolded state and a folded state. The foldable assembly includes a guide rod arm group, a support arm group, and a connecting frame group. The guide rod arm group includes a first guide rod arm and a second guide rod arm. The support arm group includes a first support arm and a second support arm. The connecting frame group includes a first connecting frame and a second connecting frame. The first guide rod arm, the first support arm, and the first connecting frame are distributed on one side of the main shaft assembly. The second guide rod arm, the second support arm, and the second connecting frame are distributed on the other side of the main shaft assembly. One end of the first support arm is rotatably connected to the main shaft assembly, and the other end of the first support arm is rotatably connected to the first connecting frame through a first arc-shaped sliding groove and a first arc-shaped arm that slidably fits the first arc-shaped sliding groove. The first arc-shaped sliding groove and the first arc-shaped arm are respectively disposed on the other end of the first support arm and the first connecting frame. One end of the first guide rod arm is rotatably connected to the main shaft assembly, and the other end of the first guide rod arm is slidably connected to the first connecting frame. A rotation axis through which the first support arm rotates relative to the main shaft assembly and a rotation axis through which the first guide rod arm rotates relative to the main shaft assembly are different, and are parallel to each other. One end of the second support arm is rotatably connected to the main shaft assembly, and the other end of the second support arm is rotatably connected to the second connecting frame through a second arc-shaped sliding groove and a second arc-shaped arm that slidably fits the second arc-shaped sliding groove. The second arc-shaped sliding groove and the second arc-shaped arm are disposed on the other end of the second support arm and the second connecting frame. One end of the second guide rod arm is rotatably connected to the main shaft assembly, and the other end of the second guide rod arm is slidably connected to the second connecting frame. A rotation axis through which the second support arm rotates relative to the main shaft assembly and a rotation axis through which the second guide rod arm rotates relative to the main shaft assembly are different, and are parallel to each other. The support assembly includes a first support plate and a second support plate that are respectively located on two sides of the main shaft assembly and that are configured to support a flexible display. The first support plate is fastened to the first support arm that is on a same side as the first support plate, and the second support plate is fastened to the second support arm that is on a same side as the second support plate. When the first connecting frame and the second connecting frame rotate toward each other, the first connecting frame and the second connecting frame respectively slide in a direction away from the first guide rod arm and in a direction away from the second guide rod arm, and the first support arm and the second support arm respectively rotate relative to the first connecting frame and the second connecting frame, so that an end that is of each of the first support plate and the second support plate and that is close to the main shaft assembly separately moves in a direction away from the main shaft assembly. When the hinge mechanism is in the folded state, a surface that is of each of the first support plate and the second support plate and that is used to support the flexible display is at an acute angle with the main shaft assembly. The first support plate, the second support plate, and the main shaft assembly jointly enclose display accommodating space.

According to the hinge mechanism in embodiments of this disclosure, the main shaft assembly, the first support arm, the first guide rod arm, and the first connecting frame form one guide rod mechanism, and the main shaft assembly, the second support arm, the second guide rod arm, and the second connecting frame form one guide rod mechanism. The first support plate and the second support plate are respectively fastened to the first support arm and the second support arm, and may respectively rotate with the first support arm and the second support arm. When the hinge mechanism is switched to the folded state, display accommodating space that is expanded at an end and that is used for folding the flexible display may be formed between the first support plate and the second support plate. The first support plate is strongly coupled to the first support arm, a rotation angle of the first support plate is consistent with a rotation angle of the first support arm, the second support plate is strongly coupled to the second support arm, and a rotation angle of the second support plate is consistent with a rotation angle of the second support arm, so that a tolerance that is of an included angle between the first support plate and the second support plate and that is caused by instability of relative positions between the first support plate and the first support arm and instability of relative positions between the second support plate and the second support arm can be reduced. In addition, a motion of the first support plate needs to be controlled only through rotation of the first support arm, and a motion of the second support plate needs to be controlled only through rotation of the second support arm, so that a control chain for controlling the motion of the first support plate and the motion of the second support plate is shortened. This helps control the motion of the first support plate and the motion of the second support plate more accurately. In addition, the included angle between the first support plate and the second support plate is more stable and has a smaller tolerance, so that the formed display accommodating space is more stable in form, and a risk of damage to the flexible display can be reduced. In addition, the first connecting frame is rotatably connected to the first support arm through the first arc-shaped sliding groove and the first arc-shaped arm, and the rotation axis through which the first connecting frame rotates relative to the first support arm is located outside the first connecting frame and the first support arm. The second connecting frame is rotatably connected to the second support arm through the second arc-shaped sliding groove and the second arc-shaped arm, and the rotation axis through which the second connecting frame rotates relative to the second support arm is located outside the second connecting frame and the second support arm. When the hinge mechanism is switched to the folded state, the end that is of the first support arm and that is connected to the first connecting frame and the end that is of the second support arm and that is connected to the second connecting frame approach the middle, so that the rotation angle of the first support arm and the first support plate that is fastened to the first support arm, and the rotation angle of the second support arm and the second support plate that is fastened to the second support arm may be increased. In this way, the included angle between the first support plate and the second support plate is increased, and the display accommodating space formed between the first support plate, the second support plate and the main shaft assembly is increased. When a fitting relationship between the first guide rod arm, the second guide rod arm, the first support arm, the second support arm, and the main shaft assembly remains unchanged, and a fitting relationship between the first guide rod arm, the second guide rod arm, the first connecting frame, and the second connecting frame remains unchanged, the display accommodating space may be increased without disposing a rotatable connecting structure through which the first support plate and the first support arm rotate relative to each other, and the second support plate and the second support arm rotate relative to each other. Therefore, the hinge mechanism is simple in structure, and is convenient to assemble.

In a possible implementation, when the first connecting frame and the second connecting frame rotate toward each other, the first arc-shaped arm slides clockwise along the first arc-shaped sliding groove, and the second arc-shaped arm slides anticlockwise along the second arc-shaped sliding groove.

In a possible implementation, when the first connecting frame and the second connecting frame rotate toward each other, an angle at which the first connecting frame rotates relative to the main shaft assembly is less than an angle at which the first support arm rotates relative to the main shaft assembly, and an angle at which the second connecting frame rotates relative to the main shaft assembly is less than an angle at which the second support arm rotates relative to the main shaft assembly.

In a possible implementation, the first support plate includes a plurality of first sub-boards. The plurality of first sub-boards of the first support plate is sequentially assembled and fastened in an axial direction of the main shaft assembly. Each first sub-board is configured to support the flexible display, and at least one first sub-board is fastened to the first support arm. Alternatively/in addition, the second support plate includes a plurality of second sub-boards. The plurality of second sub-boards of the second support plate is sequentially assembled and fastened in the axial direction of the main shaft assembly. Each second sub-board is configured to support the flexible display, and at least one second sub-board is fastened to the second support arm.

In a possible implementation, the first support plate and the first support arm are of an integrated structure. Alternatively/in addition, the second support plate and the second support arm are of an integrated structure.

In a possible implementation, a first positioning post is disposed on the first support arm. A first positioning hole corresponding to the first positioning post is provided on the first support plate. The first positioning post extends into the corresponding first positioning hole, so that the first support arm and the first support plate are positioned. Alternatively/in addition, a second positioning post is disposed on the second support arm. A second positioning hole corresponding to the second positioning post is provided on the second support plate. The second positioning post extends into the corresponding second positioning hole, so that the second support arm and the second support plate are positioned.

In a possible implementation, the first support arm is fastened to the first support plate by using a first plate body fastener. Alternatively/in addition, the second support plate is fastened to the second support plate by using a second plate body fastener.

In a possible implementation, the first support arm is fastened to the first support plate by using at least two first plate body fasteners, and the at least two first plate body fasteners and the first positioning post are not on a same straight line. Alternatively/in addition, the second support arm is fastened to the second support plate by using at least two second plate body fasteners, and the at least two second plate body fasteners and the second positioning post are not on a same straight line.

In a possible implementation, the first support arm is rotatably connected to the main shaft assembly by using a third arc-shaped sliding groove and a third arc-shaped arm that slidably fits the third arc-shaped sliding groove. The third arc-shaped sliding groove and the third arc-shaped arm are disposed on the first support arm and the main shaft assembly. Alternatively/in addition, the second support arm is rotatably connected to the main shaft assembly by using a fourth arc-shaped sliding groove and a fourth arc-shaped arm that slidably fits the fourth arc-shaped sliding groove.

The fourth arc-shaped sliding groove and the fourth arc-shaped arm are disposed on the second support arm and the main shaft assembly.

In a possible implementation, the first connecting frame is slidably connected to the first guide rod arm by using a first linear sliding groove and a first sliding block that slidably fits the first linear sliding groove. The first linear sliding groove and the first sliding block are disposed on the first connecting frame and the first guide rod arm. Alternatively/in addition, the second connecting frame is slidably connected to the second guide rod arm by using a second linear sliding groove and a second sliding block that slidably fits the second linear sliding groove. The second linear sliding groove and the second sliding block are disposed on the second connecting frame and the second guide rod arm.

In a possible implementation, the first guide rod arm is rotatably connected to the main shaft assembly by using a first connecting shaft that is disposed on the main shaft assembly. Alternatively/in addition, the second guide rod arm is rotatably connected to the main shaft assembly by using a second connecting shaft that is disposed on the main shaft assembly.

In a possible implementation, the support assembly further includes a first secondary support plate and a second secondary support plate that are located on a side that is of the main shaft assembly and that faces the flexible display, and that are configured to support the flexible display. An end of the first secondary support plate is rotatably connected to an end that is of the first support plate and that faces the main shaft assembly, and an end of the second secondary support plate is rotatably connected to an end that is of the second support plate and that faces the main shaft assembly. The hinge mechanism further includes a first constraint structure and a second constraint structure. The first constraint structure is configured to constrain a moving track of an end that is of the first secondary support plate and that is away from the first support plate. The second constraint structure is configured to constrain a moving track of an end that is of the second secondary support plate and that is away from the second support plate. When the hinge mechanism is switched from the unfolded state to the folded state, the end that is of the first secondary support plate and that is connected to the first support plate and the end that is of the second secondary support plate and that is connected to the second support plate separately move in a direction away from the main shaft assembly. In addition, the first secondary support plate and the second secondary support plate respectively rotate relative to the first support plate and the second support plate, so that the end that is of the first secondary support plate and that is away from the first support plate and the end that is of the second secondary support plate and that is away from the second support plate respectively rotate relative to the main shaft assembly under constraints of the first constraint structure and the second constraint structure, and respectively move toward two sides of the main shaft assembly. When the hinge mechanism is in the folded state, a surface that is of each of the first secondary support plate and the second secondary support plate and that is used to support the flexible display is at an obtuse angle with the main shaft assembly. The first secondary support plate, the second secondary support plate, the first support plate, the second support plate, and the main shaft assembly jointly enclose the display accommodating space.

In a possible implementation, when the hinge mechanism is switched from the unfolded state to the folded state, an angle at which the first secondary support plate rotates relative to the main shaft assembly is less than an angle at which the first connecting frame rotates relative to the main shaft assembly, and an angle at which the second secondary support plate rotates relative to the main shaft assembly is less than an angle at which the second connecting frame rotates relative to the main shaft assembly.

In a possible implementation, a first support part is disposed at the end that is of the first support plate and that faces the main shaft assembly. The first support part is configured to support the first secondary support plate when the hinge mechanism is switched to the unfolded state. Alternatively/in addition, a second support part is disposed at the end that is of the second support plate and that faces the main shaft assembly. The second support part is configured to support the second secondary support plate when the hinge mechanism is switched to the unfolded state.

In a possible implementation, the first constraint structure includes a first torsion spring and a first limiting part that is disposed on the main shaft assembly. The first torsion spring is disposed between the first secondary support plate and the first support plate. The first torsion spring is configured to provide force for rotating the first secondary support plate toward the first support part. When the hinge mechanism is in the unfolded state, the first secondary support plate presses against the first support part under action force of the first torsion spring. When the hinge mechanism is switched from the unfolded state to the folded state, the first limiting part is configured to enable the first secondary support plate to rotate relative to the first support plate in a direction away from the first support part. Alternatively/in addition, the second constraint structure includes a second torsion spring and a second limiting part that is disposed on the main shaft assembly. The second torsion spring is disposed between the second secondary support plate and the second support plate. The second torsion spring is configured to provide force for rotating the second secondary support plate toward the second support part. When the hinge mechanism is in the unfolded state, the second secondary support plate presses against the second support part under action force of the second torsion spring. When the hinge mechanism is switched from the unfolded state to the folded state, the second limiting part is configured to enable the second secondary support plate to rotate relative to the second support plate in a direction away from the second support part.

In a possible implementation, the first constraint structure includes a first sliding shaft disposed at the end that is of the first secondary support plate and that is away from the first support plate and a first track slot provided on the main shaft assembly. The first sliding shaft is oriented in the axial direction of the main shaft assembly. The first sliding shaft extends into the first track slot and slidably fits the first track slot, and the first sliding shaft is capable of rotating in the first track slot. Alternatively/in addition, the second constraint structure includes a second sliding shaft disposed at the end that is of the second secondary support plate and that is away from the second support plate and a second track slot provided on the main shaft assembly. The second sliding shaft is oriented in the axial direction of the main shaft assembly. The second sliding shaft extends into the second track slot and slidably fits the second track slot, and the second sliding shaft is capable of rotating in the second track slot.

In a possible implementation, the first track slot is provided on the main shaft assembly. An end that is of the first track slot and that is close to a central axis of the main shaft assembly is open. An end that is of the first track slot and that is away from the central axis of the main shaft assembly is sealed. The end that is of the first track slot and that is close to the central axis of the main shaft assembly is used for the first sliding shaft to enter and exit. When the hinge mechanism is in the folded state, the first sliding shaft presses against the end that is of the first track slot and that is away from the central axis of the main shaft assembly, to limit an angle at which the first secondary support plate rotates. Alternatively/in addition, the second track slot is provided on the main shaft assembly. An end that is of the second track slot and that is close to the central axis of the main shaft assembly is open. An end that is of the second track slot and that is away from the central axis of the main shaft assembly is sealed. The end that is of the second track slot and that is close to the central axis of the main shaft assembly is used for the second sliding shaft to enter and exit. When the hinge mechanism is in the folded state, the second sliding shaft presses against the end that is of the second track slot and that is away from the central axis of the main shaft assembly, to limit an angle at which the second secondary support plate rotates.

In a possible implementation, the end that is of the first support plate and that faces the main shaft assembly is rotatably connected to the first secondary support plate by using a first elastic snap-fit and a first pin shaft that is snap-fitted into the first elastic snap-fit and that rotatably fits the first elastic snap-fit. The first elastic snap-fit and the first pin shaft are disposed on the end that is of the first support plate and that faces the main shaft assembly, and the first secondary support plate. Alternatively/in addition, the end that is of the second support plate and that faces the main shaft assembly is rotatably connected to the second secondary support plate by using a second elastic snap-fit and a second pin shaft that is snap-fitted into the second elastic snap-fit and that rotatably fits the second elastic snap-fit. The second elastic snap-fit and the second pin shaft are disposed on the end that is of the second support plate and that faces the main shaft assembly, and the second secondary support plate.

In a possible implementation, the first secondary support plate includes a plurality of third sub-boards. The plurality of third sub-boards of the first secondary support plate is sequentially assembled and fastened in the axial direction of the main shaft assembly. Each third sub-board is configured to support the flexible display, and an end of at least one third sub-board is rotatably connected to the end that is of the first support plate and that faces the main shaft assembly. Alternatively/in addition, the second secondary support plate includes a plurality of fourth sub-boards. The plurality of fourth sub-boards of the second secondary support plate is sequentially assembled and fastened in the axial direction of the main shaft assembly. Each fourth sub-board is configured to support the flexible display, and an end of at least one fourth sub-board is rotatably connected to the end that is of the second support plate and that faces the main shaft assembly.

In a possible implementation, a first avoidance groove and a second avoidance groove are provided on the main shaft assembly. The first avoidance groove is used for rotating the first support plate, and a groove wall of the first avoidance groove is an arc surface extending along a rotation path of the end that is of the first support plate and that is close to the main shaft assembly. The second avoidance groove is used for rotating the second support plate, and a groove wall of the second avoidance groove is an arc surface extending along a rotation path of the end that is of the second support plate and that is close to the main shaft assembly. The end that is of the first support plate and that is close to the main shaft assembly is in lap fit with the groove wall of the first avoidance groove, to limit the first support plate to move toward the main shaft assembly. The end that is of the second support plate and that is close to the main shaft assembly is in lap fit with the groove wall of the second avoidance groove, to limit the second support plate to move toward the main shaft assembly.

According to a second aspect of embodiments of this disclosure, a foldable device is provided, including a flexible display, a housing assembly, and the hinge mechanism in any one of the foregoing implementations. The housing assembly includes a first housing and a second housing that are located on two sides of a main shaft assembly of the hinge mechanism. The first housing is fastened to a first connecting frame of the hinge mechanism. The second housing is fastened to a second connecting frame of the hinge mechanism. Two ends of the flexible display are respectively mounted on the first housing and the second housing.

DESCRIPTIONS OF REFERENCE NUMERALS

100: flexible display; 110: first display area; 120: second display area; 130: third display area; 200: housing assembly; 210: first housing; 220: second housing; 300 and 300*a*: hinge mechanisms; 310 and 310*a*: main shaft assemblies; 311: first avoidance groove; 312: second avoidance groove; 313: third avoidance groove; 314: fourth avoidance groove; 320 and 320*a*: foldable assemblies; 321: first connecting frame; 322: second connecting frame; 323: first support arm; 324: second support arm; 325: first guide rod arm; 326: second guide rod arm; 330: support assembly; 331*a*: movable support plate; 332: first support plate; 333: second support plate; 334: first secondary support plate; 335: second secondary support plate; 336: first pin shaft; 337: second pin shaft; 341: first arc-shaped sliding groove; 342: second arc-shaped sliding groove; 343: first arc-shaped arm; 344: second arc-shaped arm; 345: third arc-shaped sliding groove; 346: fourth arc-shaped sliding groove; 347: third arc-shaped arm; 348: fourth arc-shaped arm; 351: first positioning post; 352: second positioning post; 353: first sliding block; 354: second sliding block; 355: first linear sliding groove; 356: second linear sliding groove; 357: first mounting hole; 358: first positioning hole; 359: second positioning hole; 361: first plate body fastener; 362: second plate body fastener; 363: second mounting hole; 371: first support part; 372: second support part; 373: first arc-shaped lap joint part; 374: second arc-shaped lap joint part; 375: first elastic snap-fit; 376: second elastic snap-fit; 410: first connecting shaft; 420: second connecting shaft; 510: first gear; 520: second gear; 530: force transfer gear group; 531: force transfer gear; 532: gear connecting shaft; 600: damping assembly; 610: fastening base; 620: elastic pressing assembly; 621: pressure rod; 622: spring; 623: fastening member; 630: first cam; 640: second cam; 650: third cam; 660: fourth cam; 670: circlip; 710: first extension arm; 720: second extension arm; 731: first mounting post; 732: second mounting post; 733: first torsion spring; 734: second torsion spring; 741: first sliding shaft; 742: second sliding shaft; 743: first track slot; 744: second track slot; 751: first limiting part; 752: second limiting part; 753: first pressing part; and 754: second pressing part.

DESCRIPTION OF EMBODIMENTS

The terms used in embodiments of this disclosure are only used to explain specific embodiments of this disclosure, and are not intended to limit this disclosure. The following describes the implementations of embodiments of this disclosure in detail with reference to the accompanying drawings.

Figure 1:
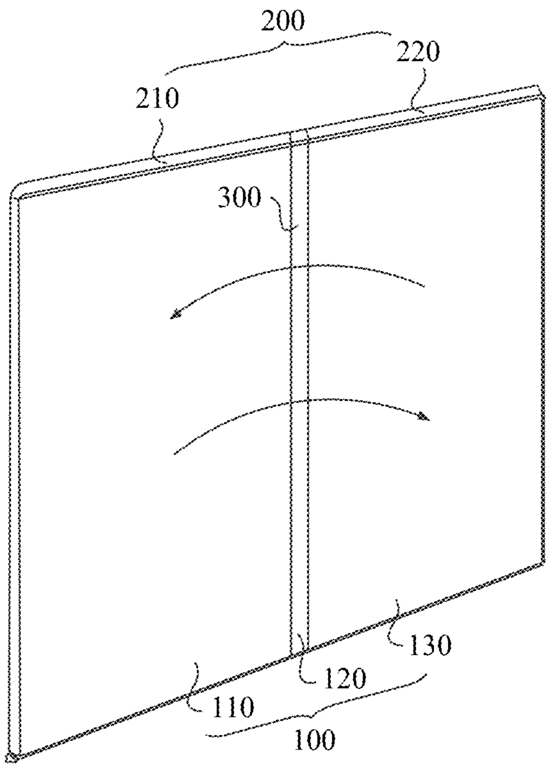
FIG. 1 is a schematic diagram in which a foldable device is unfolded according to an embodiment of this disclosure.
Figure 2:
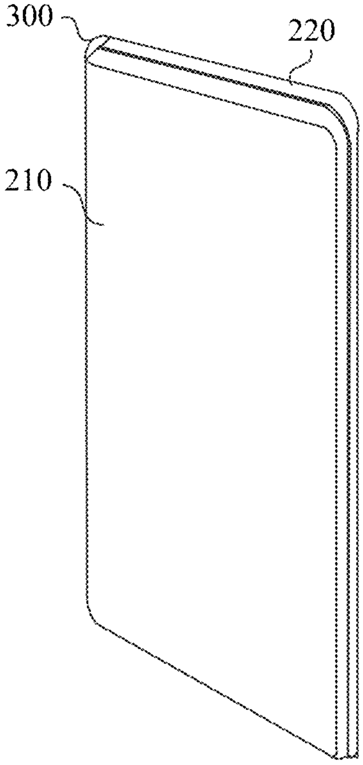
FIG. 2 is a schematic diagram in which a foldable device is folded according to an embodiment of this disclosure.

FIG. 1 is a schematic diagram in which a foldable device is unfolded according to an embodiment of this disclosure. FIG. 2 is a schematic diagram in which a foldable device is folded according to an embodiment of this disclosure.

Referring to FIG. 1 and FIG. 2, an embodiment of this disclosure provides a foldable device, and a form of the foldable device may be changed by folding and unfolding, to meet requirements of a user in different scenarios. For example, when being carried, the foldable device may be folded to reduce a size of the foldable device; and when being used, the foldable device may be unfolded to increase a size of a display used for displaying or operating.

It may be understood that, the foldable device provided in embodiments of this disclosure may include but is not limited to a foldable fixed terminal or mobile terminal like a mobile phone, a tablet computer, a notebook computer, an ultra-mobile personal computer (UMPC), a handheld computer, a touch television, a walkie-talkie, a netbook, a point of sale (POS) terminal, a personal digital assistant (PDA), a wearable device, or a virtual reality device. In embodiments of this disclosure, a foldable mobile phone is used as an example for description.

As shown in FIG. 1, the foldable device in this embodiment of this disclosure may include a flexible display 100, a housing assembly 200, and a hinge mechanism 300. The housing assembly 200 includes a first housing 210 and a second housing 220 that are located on two sides of the hinge mechanism 300. The first housing 210 and the second housing 220 are respectively fastened to two opposite sides of the hinge mechanism 300. It should be noted that the first housing 210 and the second housing 220 may be separately fastened to the two sides of the hinge mechanism 300 by welding, bonding, or using a fastener like a bolt. Connecting parts may be disposed on the two opposite sides of the hinge mechanism 300, and the first housing 210 and the second housing 220 may be separately fastened to the hinge mechanism 300 by using the connecting parts on the two sides of the hinge mechanism 300. During actual disclosure, components such as a processor, a battery, and a camera may be mounted in the first housing 210 and the second housing 220.

Still referring to FIG. 1, in this embodiment of this disclosure, two ends of the flexible display 100 are respectively mounted on the first housing 210 and the second housing 220. It should be noted that the flexible display 100 is disposed on surfaces that are of the first housing 210, the second housing 220, and the hinge mechanism 300 and that are on a same side. The hinge mechanism 300 may be configured to support the flexible display 100. The flexible display 100 may include a first display area 110, a second display area 120, and a third display area 130 that are sequentially connected. The first display area 110 is fastened to the first housing 210, and the third display area 130 is fastened to the second housing 220. The first display area 110 and the third display area 130 may be fastened through bonding or the like, and the hinge mechanism 300 is configured to support the second display area 120. The flexible display 100 may be configured to display an image, or may be used as a virtual keyboard to input information.

For example, the flexible display 100 may be an organic light-emitting diode display, an active-matrix organic light-emitting diode display, an active-matrix organic light-emitting diode display, a mini light-emitting diode display, a micro light-emitting diode display, a micro organic light-emitting diode display, or a quantum dot light-emitting diode display.

Referring to FIG. 1 and FIG. 2, in this embodiment of this disclosure, the hinge mechanism 300 may be switched between an unfolded state and a folded state. When the hinge mechanism 300 is in the unfolded state, the first housing 210, the second housing 220, and the flexible display 100 may be unfolded. In this case, the first housing 210 and the second housing 220 may be approximately at 180 degrees) ((° (where a small deviation is allowed, for example, 165°, 177°, or) 185°, the second display area 120 of the flexible display 100 may be unfolded, and the first display area 110 and the third display area 130 may be in a same plane (where a small deviation is allowed). When the hinge mechanism 300 is in the folded state, the first housing 210, the second housing 220, and the flexible display 100 may be folded. In this case, the first housing 210 and the second housing 220 may be fully folded to be parallel to each other (where a small deviation is allowed), the second display area 120 of the flexible display 100 is bent and deformed, and the first display area 110 and the third display area 130 may also be folded to be parallel to each other (where a small deviation is allowed). In an example, the hinge mechanism 300 further has an intermediate state in a process of being switched between the unfolded state and the folded state. The hinge mechanism 300 may be switched between the unfolded state and the folded state, so that the first housing 210, the second housing 220, and the flexible display 100 move accordingly, to fold and unfold the foldable device.

It should be noted that the foldable device may include one hinge mechanism 300 and one first housing 210 and one second housing 220 that are separately fastened to two opposite sides of the hinge mechanism 300. The first housing 210 and the second housing 220 may rotate toward each other to be stacked and may rotate away from each other to a same plane (where a small deviation is allowed). In this case, the foldable device may be folded into two layers.

The foldable device may alternatively include two or more first housings 210 that are disposed in parallel, one second housing 220 is disposed between every two adjacent first housings 210, and each first housing 210 is connected to the neighboring second housing 220 by using one hinge mechanism 300. In this case, the foldable device may be folded into three or more layers. For example, the foldable device includes two first housings 210 and one second housing 220. The second housing 220 is disposed between the two first housings 210. Two sides of the second housing 220 are rotatably connected to one first housing 210 by using one hinge mechanism 300 separately. Both the two first housings may rotate toward each other relative to the second housing 220 to be stacked, and the two first housings may alternatively rotate away from each other relative to the second housing 220 to be coplanar with the second housing 220 (where a small deviation is allowed). In this case, the foldable device may be folded into three layers.

Figure 3:
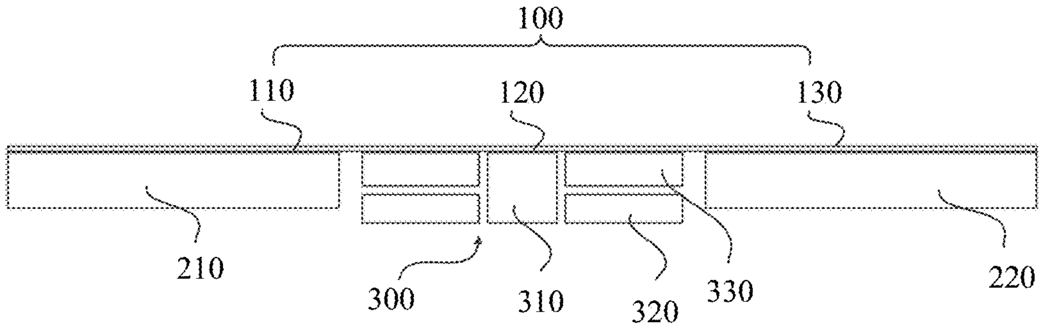
FIG. 3 is a schematic diagram in which another foldable device is unfolded according to an embodiment of this disclosure.

FIG. 3 is a schematic diagram in which another foldable device is unfolded according to an embodiment of this disclosure.

As shown in FIG. 3, a hinge mechanism 300 includes a main shaft assembly 310 and a foldable assembly 320. The foldable assembly 320 is connected to the main shaft assembly 310. The foldable assembly 320 may rotate relative to the main shaft assembly 310, so that the hinge mechanism 300 is switched between an unfolded state and a folded state. Two opposite sides of the foldable assembly 320 are respectively fastened to the first housing 210 and the second housing 220 on the two sides of the hinge mechanism 300. It may be understood that a connecting part configured to fasten the first housing 210 to the second housing 220 is disposed on the foldable assembly 320. Parts that are of the foldable assembly 320 and that are located on two sides of the main shaft assembly 310 may rotate relative to the main shaft assembly 310, so that the foldable assembly 320 can be folded and unfolded. In this case, the hinge mechanism 300 can be switched between the folded state and the unfolded state.

To prevent the flexible display 100 from being extended or shrunk, the foldable assembly 320 of the hinge mechanism 300 may be extended or shrunk in a rotation process, so that lengths of the foldable assembly 320 are different in different states of the hinge mechanism 300. In an example, in a process of folding the foldable device, the foldable assembly 320 of the hinge mechanism 300 is continuously extended, so that the first housing 210 and the second housing 220 that are fastened to the two sides of the foldable assembly 320 are continuously away from the main shaft assembly 310. In this way, a risk that the flexible display 100 is compressed can be reduced. In a process of unfolding the foldable device, the foldable assembly 320 of the hinge mechanism 300 is continuously shortened, so that the first housing 210 and the second housing 220 that are fastened to the two sides of the foldable assembly 320 continuously approach the main shaft assembly 310. In this way, a risk that the flexible display 100 is extended can be reduced.

Figure 4:
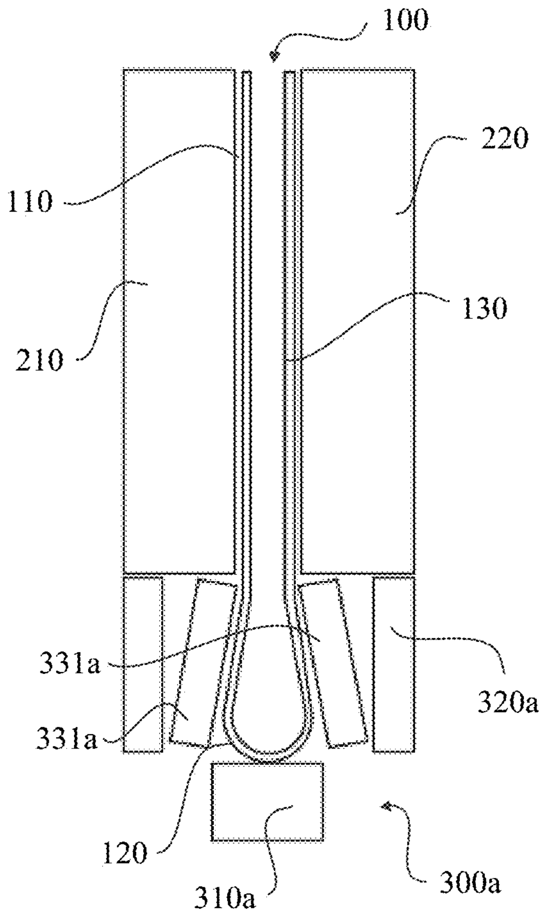
FIG. 4 is a schematic diagram in which a foldable device is folded in one technology.

FIG. 4 is a schematic diagram in which a foldable device is folded in one technology.

As shown in FIG. 4, in a hinge mechanism 300*a* in the technology, a flexible display 100 may be supported by using two movable support plates 331*a* that are respectively located on two sides of a main shaft assembly 310*a*, and the two movable support plates 331*a* are movably mounted on a foldable assembly 320*a*. For example, one end of the movable support plate 331*a* may be rotatably connected to an end that is of the foldable assembly 320*a* and that is away from the main shaft assembly 310*a*, and the other end of the movable support plate 331*a* may be slidably connected to an end that is of the foldable assembly 320*a* and that is close to the main shaft assembly 310*a* or may be slidably connected to the main shaft assembly 310*a*. In addition, the movable support plate 331*a* may rotate relative to the end that is of the foldable assembly 320*a* and that is close to the main shaft assembly 310*a* or may rotate relative to the main shaft assembly 310*a*. Relative positions and an included angle between the movable support plate 331*a* and the foldable assembly 320*a* are changed through rotation, and extension and shrinkage of the foldable assembly 320*a* in an unfolding process and a folding process, so that after the hinge mechanism 300*a* is folded, display accommodating space that is expanded at an end may be formed between the movable support plates 331*a* on the two sides of the main shaft assembly 310*a* and the main shaft assembly 310*a*.

However, when the movable support plate 331*a* and the foldable assembly 320*a* are movably mounted, a gap in which the movable support plate 331*a* and the foldable assembly 320*a* move relative to each other causes a position of the movable support plate 331*a* to be unstable, and consequently, an included angle between the two movable support plates 331*a* has a tolerance. In addition, when the hinge mechanism 300*a* is switched between a folded state and an unfolded state, extension and shrinkage of the foldable assembly 320*a* needs to be controlled through rotation of the foldable assembly 320*a*. A motion of the movable support plate 331*a* that is movably mounted on the foldable assembly 320*a* needs to be controlled through extension and shrinkage, and rotation of the foldable assembly 320*a*. In an example, when the motion of the movable support plate 331*a* needs to be controlled, extension and shrinkage of the foldable assembly 320*a* are first controlled through rotation of the foldable assembly 320*a*, and then the motion of the movable support plate 331*a* is controlled through extension and shrinkage of the foldable assembly 320*a* and rotation of the foldable assembly 320*a*. In this way, it is difficult to control a length of a control chain of the movable support plate 331*a* that is movably mounted on the foldable assembly 320*a*, and a position of the movable support plate 331*a* in a moving process, and consequently, an included angle between the two movable support plates 331*a* is unstable, and has a large tolerance. This leads to an unstable form of the display accommodating space, and increases a risk of damage to the flexible display.

Figure 5:
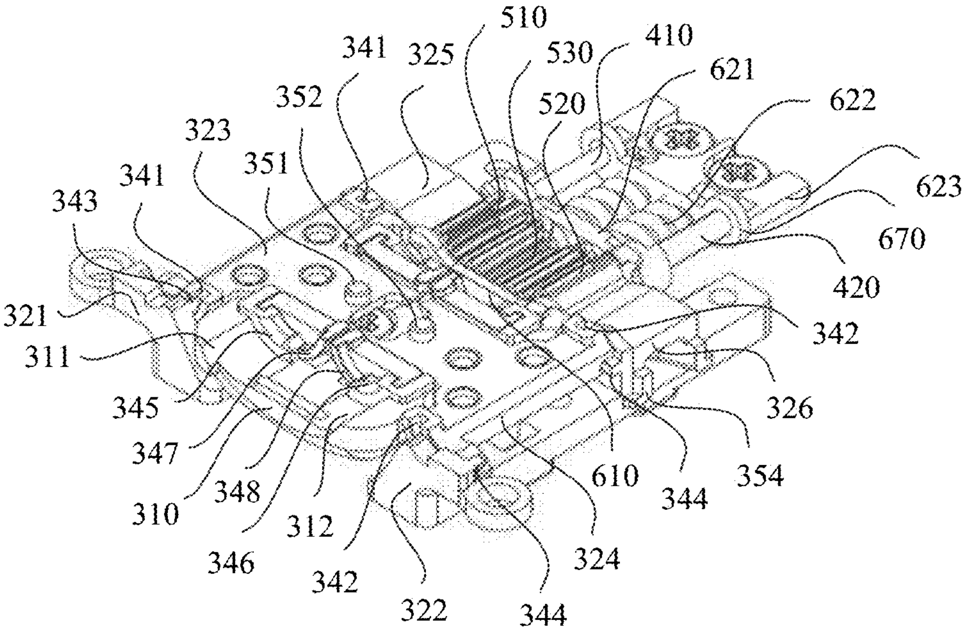
FIG. 5 is a schematic diagram of a hinge mechanism in an unfolded state according to an embodiment of this disclosure.
Figure 6:
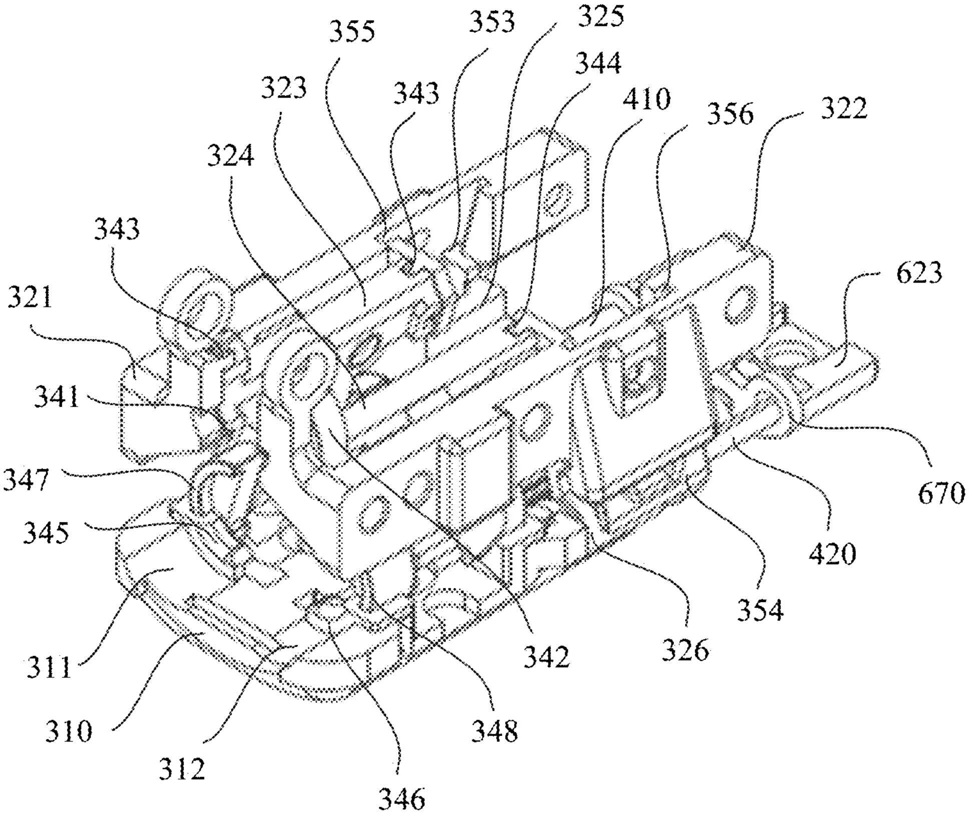
FIG. 6 is a schematic diagram of a hinge mechanism in a folded state according to an embodiment of this disclosure.
Figure 7:
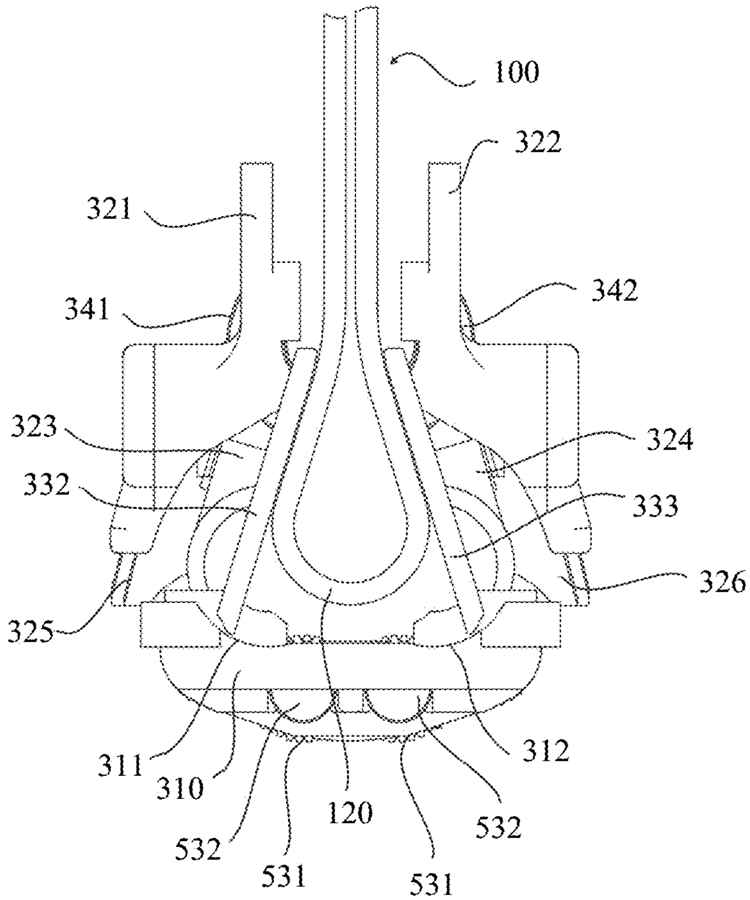
FIG. 7 is a schematic diagram in which a flexible display is folded when a hinge mechanism is in a folded state according to an embodiment of this disclosure.

FIG. 5 is a schematic diagram of a hinge mechanism in an unfolded state according to an embodiment of this disclosure. FIG. 6 is a schematic diagram of a hinge mechanism in a folded state according to an embodiment of this disclosure. FIG. 7 is a schematic diagram in which a flexible display is folded when a hinge mechanism is in a folded state according to an embodiment of this disclosure.

As shown in FIG. 5 to FIG. 7, and FIG. 3, to resolve the foregoing problem, an embodiment of this disclosure provides a hinge mechanism 300, including a main shaft assembly 310, a foldable assembly 320, and a support assembly 330. The foldable assembly 320 may rotate relative to the main shaft assembly 310, so that the hinge mechanism 300 is switched between the unfolded state and the folded state. The foldable assembly 320 includes a guide rod arm group, a support arm group, and a connecting frame group. The guide rod arm group includes a first guide rod arm 325 and a second guide rod arm 326. The support arm group includes a first support arm 323 and a second support arm 324. The connecting frame group includes a first connecting frame 321 and a second connecting frame 322. The first guide rod arm 325, the first support arm 323, and the first connecting frame 321 are distributed on one side of the main shaft assembly 310. The second guide rod arm 326, the second support arm 324, and the second connecting frame 322 are distributed on the other side of the main shaft assembly 310. One end of the first support arm 323 is rotatably connected to the main shaft assembly 310, and the other end of the first support arm 323 is rotatably connected to the first connecting frame 321 through a first arc-shaped sliding groove 341 and a first arc-shaped arm 343 that slidably fits the first arc-shaped sliding groove 341. The first arc-shaped sliding groove 341 and the first arc-shaped arm 343 are disposed on the other end of the first support arm 323 and the first connecting frame 321. One end of the first guide rod arm 325 is rotatably connected to the main shaft assembly 310, and the other end of the first guide rod arm 325 is slidably connected to the first connecting frame 321. A rotation axis through which the first support arm 323 rotates relative to the main shaft assembly 310 and a rotation axis through which the first guide rod arm 325 rotates relative to the main shaft assembly 310 are different, and are parallel to each other. One end of the second support arm 324 is rotatably connected to the main shaft assembly 310, and the other end of the second support arm 324 is rotatably connected to the second connecting frame 322 through a second arc-shaped sliding groove 342 and a second arc-shaped arm 344 that slidably fits the second arc-shaped sliding groove 342. The second arc-shaped sliding groove 342 and the second arc-shaped arm 344 are disposed on the other end of the second support arm 324 and the second connecting frame 322. One end of the second guide rod arm 326 is rotatably connected to the main shaft assembly 310, and the other end of the second guide rod arm 326 is slidably connected to the second connecting frame 322. A rotation axis through which the second support arm 324 rotates relative to the main shaft assembly 310 and a rotation axis through which the second guide rod arm 326 rotates relative to the main shaft assembly 310 are different, and are parallel to each other. The support assembly 330 includes a first support plate 332 and a second support plate 333 that are respectively located on two sides of the main shaft assembly 310 and that are configured to support a flexible display 100. The first support plate 332 is fastened to the first support arm 323 that is on a same side as the first support plate 332, and the second support plate 333 is fastened to the second support arm 324 that is on a same side as the second support plate 333. When the first connecting frame 321 and the second connecting frame 322 rotate toward each other, the first connecting frame 321 and the second connecting frame 322 respectively slide in a direction away from the first guide rod arm 325 and in a direction away from the second guide rod arm 326, and the first support arm 323 and the second support arm 324 respectively rotate relative to the first connecting frame 321 and the second connecting frame 322, so that an end that is of each of the first support plate 332 and the second support plate 333 and that is close to the main shaft assembly 310 separately moves in a direction away from the main shaft assembly 310. When the hinge mechanism 300 is in the folded state, a surface that is of each of the first support plate 332 and the second support plate 333 and that is used to support the flexible display 100 is at an acute angle with the main shaft assembly 310. The first support plate 332, the second support plate 333, and the main shaft assembly 310 jointly enclose display accommodating space.

Figure 8:
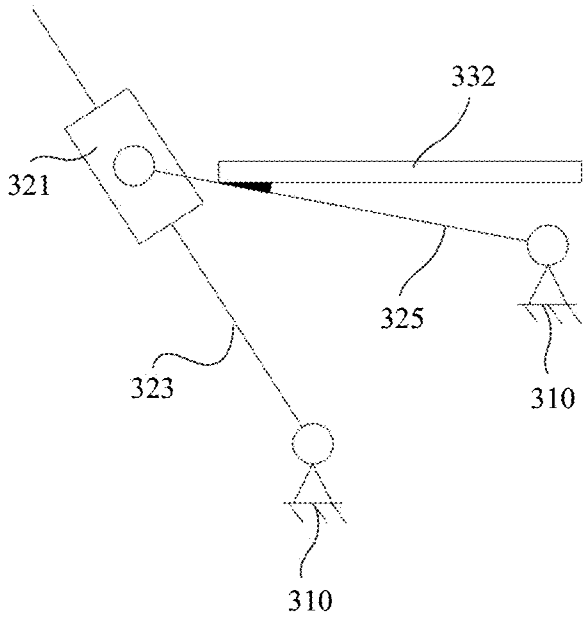
FIG. 8 is a simplified diagram in which a main shaft assembly, a first guide rod arm, a first support arm, and a first connecting frame that are of a hinge mechanism are connected according to an embodiment of this disclosure.

FIG. 8 is a simplified diagram in which a main shaft assembly, a first guide rod arm, a first support arm, and a first connecting frame that are of a hinge mechanism are connected according to an embodiment of this disclosure.

As shown in FIG. 8, the main shaft assembly 310, the first support arm 323, the first guide rod arm 325, and the first connecting frame 321 form one guide rod mechanism. Similarly, the main shaft assembly 310, the second support arm 324, the second guide rod arm 326, and the second connecting frame 322 form one guide rod mechanism. The first support plate 332 and the second support plate 333 are respectively fastened to the first support arm 323 and the second support arm 324, and may respectively rotate with the first support arm 323 and the second support arm 324. When the hinge mechanism 300 is switched to the folded state, display accommodating space that is expanded at an end and that is used for folding the flexible display 100 may be formed between the first support plate 332 and the second support plate 333. The first support plate 332 is strongly coupled to the first support arm 323, a rotation angle of the first support plate 332 is consistent with a rotation angle of the first support arm 323, the second support plate 333 is strongly coupled to the second support arm 324, and a rotation angle of the second support plate 333 is consistent with a rotation angle of the second support arm 324, so that a tolerance that is of an included angle between the first support plate 332 and the second support plate 333 and that is caused by instability of relative positions between the first support plate 332 and the first support arm 323 and instability of relative positions between the second support plate 333 and the second support arm 324 can be reduced. In addition, a motion of the first support plate 332 needs to be controlled only through rotation of the first support arm 323, and a motion of the second support plate 333 needs to be controlled only through rotation of the second support arm 324, so that a control chain for controlling the motion of the first support plate 332 and the motion of the second support plate 333 is shortened. This helps control the motion of the first support plate 332 and the motion of the second support plate 333 more accurately. In addition, the included angle between the first support plate 332 and the second support plate 333 is more stable and has a smaller tolerance, so that the formed display accommodating space is more stable in form, and a risk of damage to the flexible display 100 can be reduced. In addition, the first connecting frame 321 is rotatably connected to the first support arm 323 through the first arc-shaped sliding groove 341 and the first arc-shaped arm 343, and the rotation axis through which the first connecting frame 321 rotates relative to the first support arm 323 is located outside the first connecting frame 321 and the first support arm 323. The second connecting frame 322 is rotatably connected to the second support arm 324 through the second arc-shaped sliding groove 342 and the second arc-shaped arm 344, and the rotation axis through which the second connecting frame 322 rotates relative to the second support arm 324 is located outside the second connecting frame 322 and the second support arm 324. When the hinge mechanism 300 is switched to the folded state, the end that is of the first support arm 323 and that is connected to the first connecting frame 321 and the end that is of the second support arm 324 and that is connected to the second connecting frame 322 approach the middle, so that the rotation angle of the first support arm 323 and the first support plate 332 that is fastened to the first support arm 323, and the rotation angle of the second support arm 324 and the second support plate 333 that is fastened to the second support arm 324 may be increased. In this way, the included angle between the first support plate 332 and the second support plate 333 is increased, and the display accommodating space formed between the first support plate 332, the second support plate 333 and the main shaft assembly 310 is increased. When a fitting relationship between the first guide rod arm 325, the second guide rod arm 326, the first support arm 323, the second support arm 324, and the main shaft assembly 310 remains unchanged, and a fitting relationship between the first guide rod arm 325, the second guide rod arm 326, the first connecting frame 321, and the second connecting frame 322 remains unchanged, the display accommodating space may be increased without disposing a rotatable connecting structure through which the first support plate 332 and the first support arm 323 rotate relative to each other, and the second support plate 333 and the second support arm 324 rotate relative to each other. Therefore, the hinge mechanism 300 is simple in structure, and is convenient to assemble.

The following describes, by using specific embodiments, an implementation of the hinge mechanism 300 provided in embodiments of this disclosure.

As shown in FIG. 3, in this embodiment of this disclosure, the hinge mechanism 300 includes the main shaft assembly 310, the foldable assembly 320, and the support assembly 330. The foldable assembly 320 may rotate relative to the main shaft assembly 310, so that the hinge mechanism 300 is switched between the unfolded state and the folded state. It may be understood that the foldable assembly 320 may be folded and unfolded relative to the main shaft assembly 310, and is configured to fasten the first housing 210 to the second housing 220. The support assembly 330 is mounted on the foldable assembly 320, and is configured to support the flexible display 100.

As shown in FIG. 5 and FIG. 6, the foldable assembly 320 includes a guide rod arm group, a support arm group, and a connecting frame group. The guide rod arm group includes a first guide rod arm 325 and a second guide rod arm 326. The support arm group includes a first support arm 323 and a second support arm 324. The connecting frame group includes a first connecting frame 321 and a second connecting frame 322. The first guide rod arm 325, the first support arm 323, and the first connecting frame 321 are distributed on one side of the main shaft assembly 310. The second guide rod arm 326, the second support arm 324, and the second connecting frame 322 are distributed on the other side of the main shaft assembly 310. One end of the first support arm 323 is rotatably connected to the main shaft assembly 310, and the other end of the first support arm 323 is rotatably connected to the first connecting frame 321 through a first arc-shaped sliding groove 341 and a first arc-shaped arm 343 that slidably fits the first arc-shaped sliding groove 341. The first arc-shaped sliding groove 341 and the first arc-shaped arm 343 are disposed on the other end of the first support arm 323 and the first connecting frame 321. One end of the first guide rod arm 325 is rotatably connected to the main shaft assembly 310, and the other end of the first guide rod arm 325 is slidably connected to the first connecting frame 321. A rotation axis through which the first support arm 323 rotates relative to the main shaft assembly 310 and a rotation axis through which the first guide rod arm 325 rotates relative to the main shaft assembly 310 are different, and are parallel to each other. One end of the second support arm 324 is rotatably connected to the main shaft assembly 310, and the other end of the second support arm 324 is rotatably connected to the second connecting frame 322 through a second arc-shaped sliding groove 342 and a second arc-shaped arm 344 that slidably fits the second arc-shaped sliding groove 342. The second arc-shaped sliding groove 342 and the second arc-shaped arm 344 are disposed on the other end of the second support arm 324 and the second connecting frame 322. One end of the second guide rod arm 326 is rotatably connected to the main shaft assembly 310, and the other end of the second guide rod arm 326 is slidably connected to the second connecting frame 322. A rotation axis through which the second support arm 324 rotates relative to the main shaft assembly 310 and a rotation axis through which the second guide rod arm 326 rotates relative to the main shaft assembly 310 are different, and are parallel to each other.

It may be understood that an end that is of the first connecting frame 321 and that is away from the first support arm 323 is fastened to the first housing 210, and an end that is of the second connecting frame 322 and that is away from the second support arm 324 is fastened to the second housing 220.

It should be noted that the first arc-shaped sliding groove 341 may be provided on the first support arm 323, and the first arc-shaped arm 343 may be disposed on the first connecting frame 321. Alternatively, the first arc-shaped arm 343 may be disposed on the first support arm 323, and the first arc-shaped sliding groove 341 may be provided on the first connecting frame 321. The second arc-shaped sliding groove 342 may be provided on the second support arm 324, and the second arc-shaped arm 344 may be disposed on the second connecting frame 322. Alternatively, the second arc-shaped arm 344 may be disposed on the second support arm 324, and the second arc-shaped sliding groove 342 may be provided on the second connecting frame 322.

For example, the first arc-shaped sliding groove 341 is provided on the first support arm 323, the first arc-shaped arm 343 is disposed on the first connecting frame 321, the second arc-shaped sliding groove 342 is provided on the second support arm 324, and the second arc-shaped arm 344 is disposed on the second connecting frame 322.

It may be understood that each of the first arc-shaped sliding groove 341 and the second arc-shaped sliding groove 342 may be a quarter circular arc groove, a one-third circular arc groove, a half circular arc groove, or the like. Each of the first arc-shaped arm 343 and the second arc-shaped arm 344 may be a quarter circular arc arm, a one-third circular arc arm, a half circular arc arm, or the like. Shapes and positions of the first arc-shaped sliding groove 341, the second arc-shaped sliding groove 342, the first arc-shaped arm 343, and the second arc-shaped arm 344 may be adjusted based on an actual situation of an disclosure scenario.

Each side groove wall of the first arc-shaped sliding groove 341 may be of an integrated structure. In this way, a tolerance caused by assembling the first arc-shaped sliding groove 341 can be reduced. The first arc-shaped sliding groove 341 may alternatively be formed by assembling a first mechanical part having an arc-shaped recess and a second mechanical part having an arc-shaped protrusion. The arc-shaped recess of the first mechanical part and the arc-shaped protrusion of the second mechanical part are spaced, to define the first arc-shaped sliding groove 341. In this way, the first arc-shaped sliding groove 341 is easy to form.

The second arc-shaped sliding groove 342 may be disposed with reference to the first arc-shaped sliding groove 341. Each side groove wall of the second arc-shaped sliding groove 342 may also be of an integrated structure. In this way, a tolerance caused by assembling the second arc-shaped sliding groove 342 can be reduced. The second arc-shaped sliding groove 342 may also be formed by assembling a third mechanical part having an arc-shaped recess and a fourth mechanical part having an arc-shaped protrusion. The arc-shaped recess of the third mechanical part and the arc-shaped protrusion of the fourth mechanical part are spaced, to define the second arc-shaped sliding groove 342. In this way, the second arc-shaped sliding groove 342 is easy to form.

A rotation axis through which the first connecting frame 321 rotates around the first support arm 323 is located outside a side that is of each of the first connecting frame 321 and the first support arm 323 and that faces the flexible display 100. A rotation axis through which the second connecting frame 322 rotates around the second support arm 324 is located outside a side that is of each of the second connecting frame 322 and the second support arm 324 and that faces the flexible display 100.

As shown in FIG. 8, the main shaft assembly 310, the first support arm 323, the first guide rod arm 325, and the first connecting frame 321 form one guide rod mechanism. In a process in which the first support arm 323 and the first guide rod arm 325 rotate relative to the main shaft assembly 310, the first connecting frame 321 may be driven to rotate, and the first connecting frame 321 may slide along the first guide rod arm 325, to change a distance between a rotation axis through which the first connecting frame 321 rotates around the main shaft assembly 310 and a rotation axis through which the first guide rod arm 325 rotates around the main shaft assembly 310. As shown in FIG. 8, in a process in which the hinge mechanism 300 is switched to the folded state, both the first guide rod arm 325 and the first support arm 323 rotate in a clockwise direction in FIG. 8, and the first connecting frame 321 slides in a direction away from the rotation axis through which the first guide rod arm 325 rotates around the main shaft assembly 310. In a process in which the hinge mechanism 300 is switched to the unfolded state, both the first guide rod arm 325 and the first support arm 323 rotate in an anticlockwise direction in FIG. 8, and the first connecting frame 321 slides in a direction close to the rotation axis through which the first guide rod arm 325 rotates around the main shaft assembly 310.

Similar to the foregoing fitting relationship and motion principle between the main shaft assembly 310 and the first support arm 323, the first guide rod arm 325, and the first connecting frame 321, the main shaft assembly 310, the second support arm 324, the second guide rod arm 326, and the second connecting frame 322 form one guide rod mechanism. In a process in which the second support arm 324 and the second guide rod arm 326 rotate relative to the main shaft assembly 310, the second connecting frame 322 may be driven to rotate, and the second connecting frame 322 may slide along the second guide rod arm 326, to change a distance between a rotation axis through which the second connecting frame 322 rotates around the main shaft assembly 310 and a rotation axis through which the second guide rod arm 326 rotates around the main shaft assembly 310. In a process in which the hinge mechanism 300 is switched to the folded state, the second guide rod arm 326 and the first guide rod arm 325 rotate toward each other, the second support arm 324 and the first support arm 323 rotate toward each other, and the second connecting frame 322 and the first connecting frame 321 rotate toward each other.

As shown in FIG. 7, in this embodiment of this disclosure, the support assembly 330 includes the first support plate 332 and the second support plate 333 that are respectively located on two sides of the main shaft assembly 310, and that are configured to support the flexible display 100. The first support plate 332 is fastened to the first support arm 323 that is on a same side as the first support plate 332, and the second support plate 333 is fastened to the second support arm 324 that is on a same side as the second support plate 333.

It may be understood that the first support plate 332 and the second support plate 333 may be connected by bonding, welding, or using a fastener, or may be fastened to the first support arm 323 and the second support arm 324 respectively through integral forming, or the like.

In some embodiments of this disclosure, an end that is of each of the first support plate 332 and the second support plate 333 and that is close to the main shaft assembly 310 may extend toward a central axis of the main shaft assembly 310 to a position at which only a gap in which the first support plate 332 and the second support plate 333 rotate is reserved. In this case, triangle-like display accommodating space is formed among the first support plate 332, the second support plate 333 and the main shaft assembly 310 that are of the hinge mechanism 300 in the folded state.

In an example, in some embodiments of this disclosure, space used to support another structure of the flexible display 100 may also be reserved between the end that is of each of the first support plate 332 and the second support plate 333 and that is close to the main shaft assembly 310.

In embodiments of this disclosure, when the first connecting frame 321 and the second connecting frame 322 rotate toward each other, the first connecting frame 321 and the second connecting frame 322 respectively slide in a direction away from the first guide rod arm 325 and in a direction away from the second guide rod arm 326, and the first support arm 323 and the second support arm 324 respectively rotate relative to the first connecting frame 321 and the second connecting frame 322, so that an end that is of each of the first support plate 332 and the second support plate 333 and that is close to the main shaft assembly 310 separately moves in a direction away from the main shaft assembly 310. When the hinge mechanism 300 is in the folded state, a surface that is of each of the first support plate 332 and the second support plate 333 and that is used to support the flexible display 100 is at an acute angle with the main shaft assembly 310. The first support plate 332, the second support plate 333, and the main shaft assembly 310 jointly enclose the display accommodating space.

It may be understood that, when the hinge mechanism 300 is in the folded state, an included angle between the surface that is of each of the first connecting frame 321 and the second connecting frame 322 and that faces the flexible display 100 and the main shaft assembly 310 may be a right angle (where a small deviation is allowed), or may be an obtuse angle.

In this way, the main shaft assembly 310, the first support arm 323, the first guide rod arm 325, and the first connecting frame 321 form one guide rod mechanism. The main shaft assembly 310, the second support arm 324, the second guide rod arm 326, and the second connecting frame 322 form one guide rod mechanism. The first support plate 332 and the second support plate 333 are respectively fastened to the first support arm 323 and the second support arm 324, and may respectively rotate with the first support arm 323 and the second support arm 324. When the hinge mechanism 300 is switched to the folded state, display accommodating space that is expanded at an end and that is used for folding the flexible display 100 may be formed between the first support plate 332 and the second support plate 333. The first support plate 332 is strongly coupled to the first support arm 323, a rotation angle of the first support plate 332 is consistent with a rotation angle of the first support arm 323, the second support plate 333 is strongly coupled to the second support arm 324, and a rotation angle of the second support plate 333 is consistent with a rotation angle of the second support arm 324, so that a tolerance that is of an included angle between the first support plate 332 and the second support plate 333 and that is caused by instability of relative positions between the first support plate 332 and the first support arm 323 and instability of relative positions between the second support plate 333 and the second support arm 324 can be reduced. In addition, a motion of the first support plate 332 needs to be controlled only through rotation of the first support arm 323, and a motion of the second support plate 333 needs to be controlled only through rotation of the second support arm 324, so that a control chain for controlling the motion of the first support plate 332 and the motion of the second support plate 333 is shortened. This helps control the motion of the first support plate 332 and the motion of the second support plate 333 more accurately. In addition, the included angle between the first support plate 332 and the second support plate 333 is more stable and has a smaller tolerance, so that the formed display accommodating space is more stable in form, and a risk of damage to the flexible display 100 can be reduced. In addition, the first connecting frame 321 is rotatably connected to the first support arm 323 through the first arc-shaped sliding groove 341 and the first arc-shaped arm 343, and the rotation axis through which the first connecting frame 321 rotates relative to the first support arm 323 is located outside the first connecting frame 321 and the first support arm 323. The second connecting frame 322 is rotatably connected to the second support arm 324 through the second arc-shaped sliding groove 342 and the second arc-shaped arm 344, and the rotation axis through which the second connecting frame 322 rotates relative to the second support arm 324 is located outside the second connecting frame 322 and the second support arm 324. When the hinge mechanism 300 is switched to the folded state, the end that is of the first support arm 323 and that is connected to the first connecting frame 321 and the end that is of the second support arm 324 and that is connected to the second connecting frame 322 approach the middle, so that the rotation angle of the first support arm 323 and the first support plate 332 that is fastened to the first support arm 323, and the rotation angle of the second support arm 324 and the second support plate 333 that is fastened to the second support arm 324 may be increased. In this way, the included angle between the first support plate 332 and the second support plate 333 is increased, and the display accommodating space formed between the first support plate 332, the second support plate 333 and the main shaft assembly 310 is increased. When a fitting relationship between the first guide rod arm 325, the second guide rod arm 326, the first support arm 323, the second support arm 324, and the main shaft assembly 310 remains unchanged, and a fitting relationship between the first guide rod arm 325, the second guide rod arm 326, the first connecting frame 321, and the second connecting frame 322 remains unchanged, the display accommodating space may be increased without disposing a rotatable connecting structure through which the first support plate 332 and the first support arm 323 rotate relative to each other, and the second support plate 333 and the second support arm 324 rotate relative to each other. Therefore, the hinge mechanism 300 is simple in structure, and is convenient to assemble.

It may be understood that the foldable assembly 320 may include one connecting frame group, or may include two or more connecting frame groups that are distributed in an axial direction of the main shaft assembly 310. The support arm group and the guide rod arm group are disposed correspondingly with the connecting frame group, and a quantity of support arm groups, a quantity of guide rod arm groups, and a quantity of connecting frame groups are the same.

The first support arm 323 and the second support arm 324 in a same support arm group may be symmetrically distributed on two sides of the main shaft assembly 310, or may be distributed in a staggered manner in the axial direction of the main shaft assembly 310. The first guide rod arm 325 and the second guide rod arm 326 in a same guide rod arm group may be symmetrically distributed on two sides of the main shaft assembly 310, or may be distributed in a staggered manner in the axial direction of the main shaft assembly 310.

For example, the first support arm 323 and the second support arm 324 in a same support arm group are symmetrically distributed on two sides of the main shaft assembly 310, the first guide rod arm 325 and the second guide rod arm 326 in a same guide rod arm group are symmetrically distributed on two sides of the main shaft assembly 310, and the first connecting frame 321 and the second connecting frame 322 in a same connecting frame group are symmetrically distributed on two sides of the main shaft assembly 310. In this way, the hinge mechanism 300 drives the first housing 210 and the second housing 220 that are connected to the two sides of the hinge mechanism 300 to switch between the folded state and the unfolded state more stably.

Figure 9:
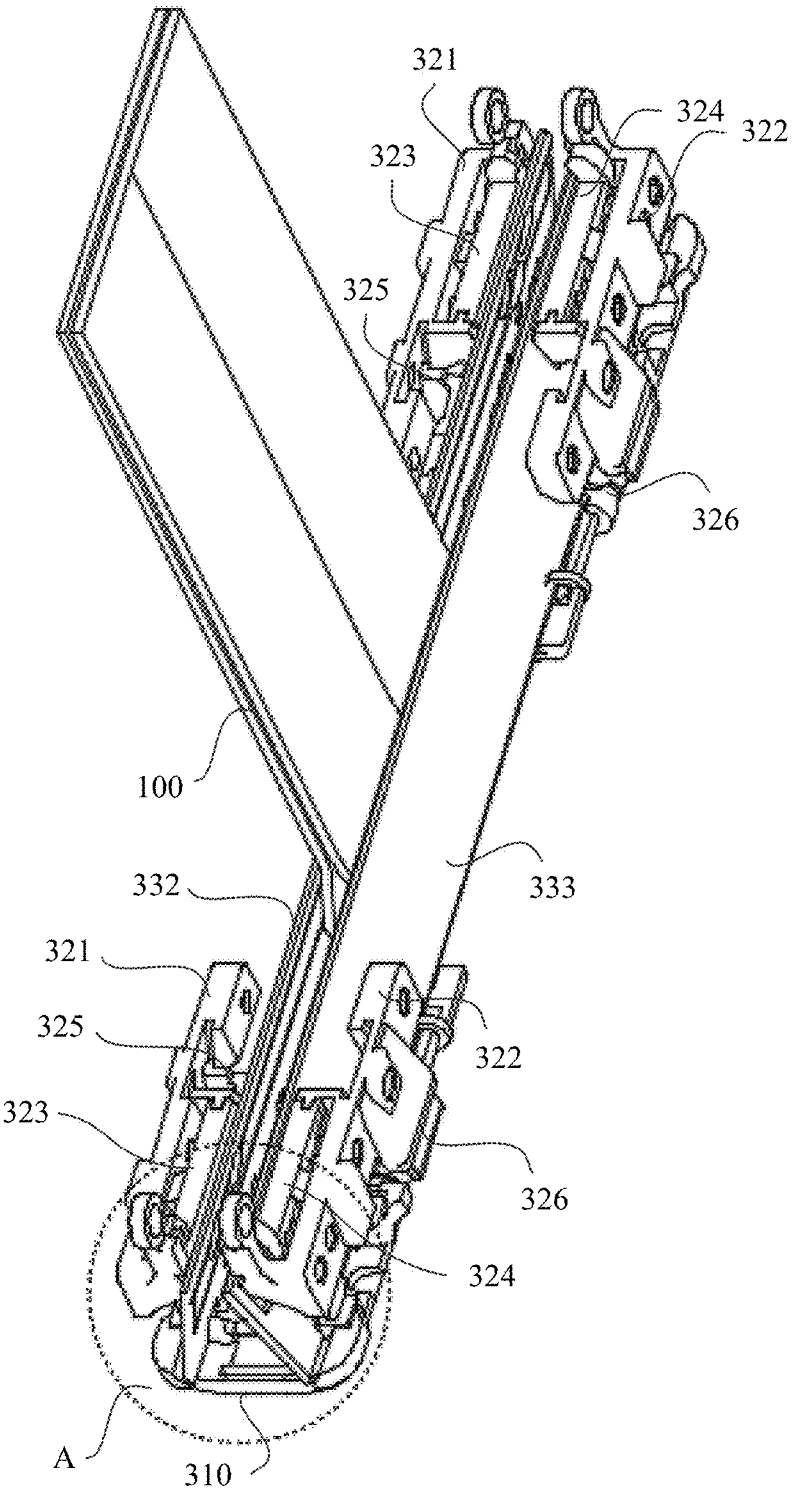
FIG. 9 is a schematic diagram in which a flexible display is folded when another hinge mechanism is in a folded state according to an embodiment of this disclosure.
Figure 10:
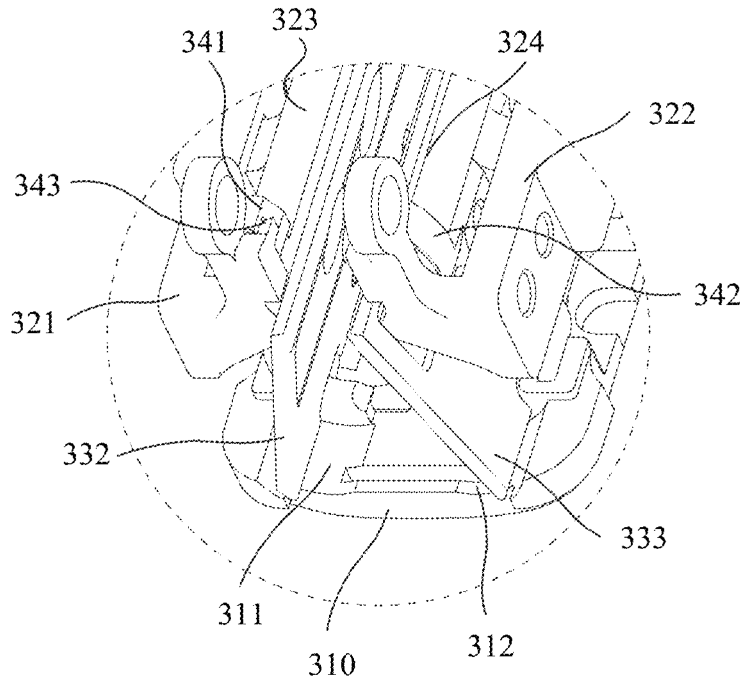
FIG. 10 is an enlarged view at A in FIG. 9.

FIG. 9 is a schematic diagram in which a flexible display is folded when another hinge mechanism is in a folded state according to an embodiment of this disclosure. FIG. 10 is an enlarged view at A in FIG. 9.

As shown in FIG. 9 and FIG. 10, in some embodiments of this disclosure, the foldable assembly 320 includes two guide rod arm groups, two support arm groups, and two connecting frame groups. One guide rod arm group, one support arm group, and one connecting frame group are disposed at each of two ends in an axial direction of the main shaft assembly 310. In this way, the main shaft assembly 310 can be more securely connected to the support assembly 330 and the first housing 210 and the second housing 220 on the two sides.

It may be understood that the guide rod arm group, the support arm group, and the connecting frame group at each end of the main shaft assembly 310 may be assembled on the main shaft assembly 310 in the foregoing assembly manner. Details are not described herein again.

In some embodiments of this disclosure, when the first connecting frame 321 and the second connecting frame 322 rotate toward each other, the first arc-shaped arm 343 slides clockwise along the first arc-shaped sliding groove 341, and the second arc-shaped arm 344 slides anticlockwise along the second arc-shaped sliding groove 342. In this way, a large included angle is obtained by rotating the first support arm 323 and the second support arm 324, and display accommodating space that is expanded at an end is formed between the first support plate 332 and the second support plate 333 that are fastened on the first support arm 323 and the second support arm 324, and the main shaft assembly 310. In addition, the formed display accommodating space is large.

In some embodiments of this disclosure, when the first connecting frame 321 and the second connecting frame 322 rotate toward each other, an angle at which the first connecting frame 321 rotates relative to the main shaft assembly 310 is less than an angle at which the first support arm 323 rotates relative to the main shaft assembly 310, and an angle at which the second connecting frame 322 rotates relative to the main shaft assembly 310 is less than an angle at which the second support arm 324 rotates relative to the main shaft assembly 310. In this way, when the hinge mechanism 300 is switched to the folded state, an included angle between the first support arm 323 and the second support arm 324 is greater than an included angle between the first connecting frame 321 and the second connecting frame 322, so that display accommodating space that is expanded at an end is formed between the first support plate 332 and the second support plate 333 that are fastened on the first support arm 323 and the second support arm 324, and the main shaft assembly 310. In addition, the formed display accommodating space is large.

In some embodiments of this disclosure, the first support plate 332 may be of a multi-segment structure. The first support plate 332 includes a plurality of first sub-boards. The plurality of first sub-boards of the first support plate 332 is sequentially assembled and fastened in the axial direction of the main shaft assembly 310. Each first sub-board is configured to support the flexible display 100, and at least one first sub-board is fastened to the first support arm 323. In this way, the narrow and long first support plate 332 is easy to manufacture. This helps reduce manufacturing costs.

In an example, in some other examples, the first support plate 332 may alternatively be of an integrated structure. In this way, an assembly error caused when the plurality of first sub-boards is assembled can be reduced.

In some embodiments of this disclosure, the second support plate 333 includes a plurality of second sub-boards. The plurality of second sub-boards of the second support plate 333 is sequentially assembled and fastened in the axial direction of the main shaft assembly 310. Each second sub-board is configured to support the flexible display 100, and at least one second sub-board is fastened to the second support arm 324. In this way, the narrow and long second support plate 333 is easy to manufacture. This helps reduce manufacturing costs.

In an example, in some other examples, the second support plate 333 may alternatively be of an integrated structure. In this way, an assembly error caused when the plurality of second sub-boards is assembled can be reduced.

In some embodiments of this disclosure, the first support plate 332 and the first support arm 323 are of an integrated structure. In this way, an assembly error caused when the first support plate 332 and the first support arm 323 are assembled can be reduced, so that a position of the first support plate 332 is controlled more accurately, an angle tolerance is smaller, and the formed display accommodating space is more stable.

It should be noted that, when the first support plate 332 is of a multi-segment structure, the first sub-boards that are fastened to the first support arm 323 and the first support arm 323 may be of an integrated structure.

In some embodiments of this disclosure, the second support plate 333 and the second support arm 324 are of an integrated structure. In this way, an assembly error caused when the second support plate 333 and the second support arm 324 are assembled can be reduced, so that a position of the second support plate 333 is controlled more accurately, an angle tolerance is smaller, and the formed display accommodating space is more stable.

It should be noted that, when the second support plate 333 is of a multi-segment structure, the second sub-boards that are fastened to the second support arm 324 and the second support arm 324 may be of an integrated structure.

Figure 11:
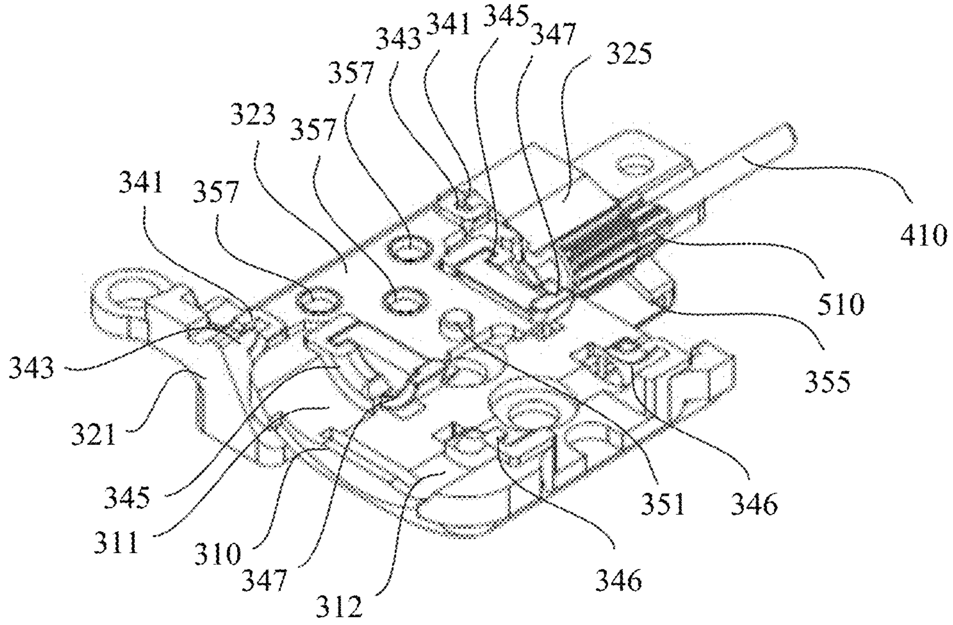
FIG. 11 is a schematic diagram in which a first guide rod arm, a first connecting frame, and a first support arm are connected to a main shaft assembly when a hinge mechanism is in an unfolded state according to an embodiment of this disclosure.
Figure 12:
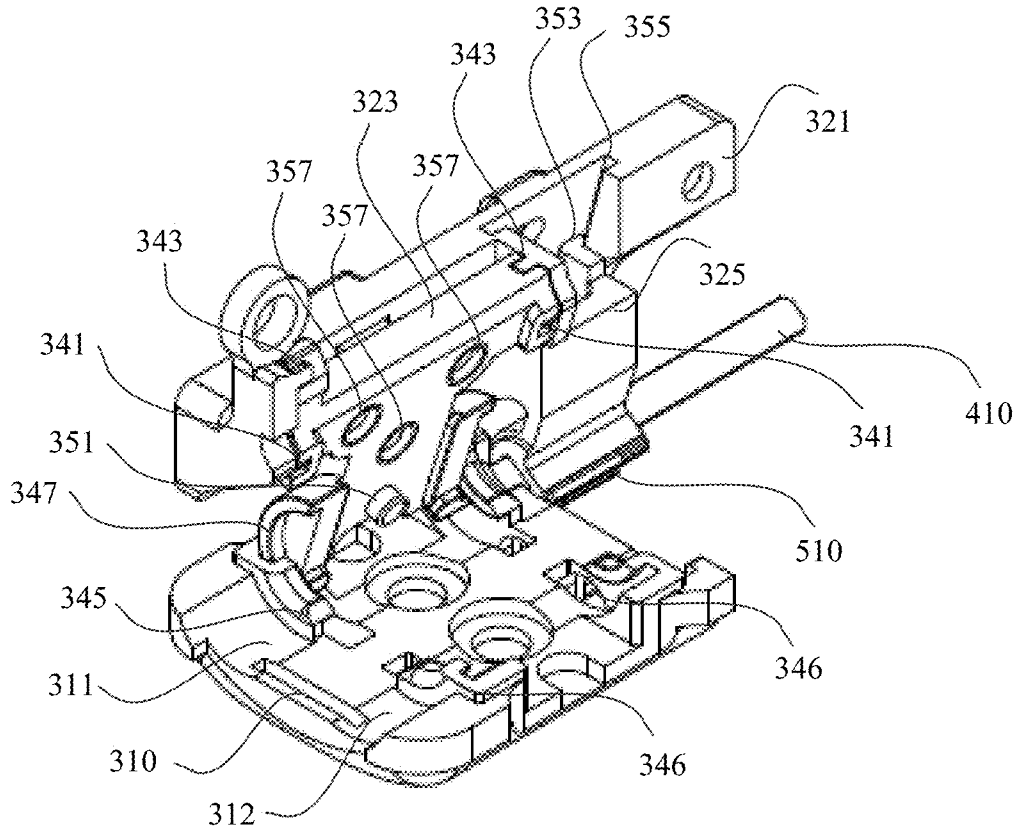
FIG. 12 is a schematic diagram in which a first guide rod arm, a first connecting frame, and a first support arm are connected to a main shaft assembly when a hinge mechanism is in a folded state according to an embodiment of this disclosure.
Figure 13:
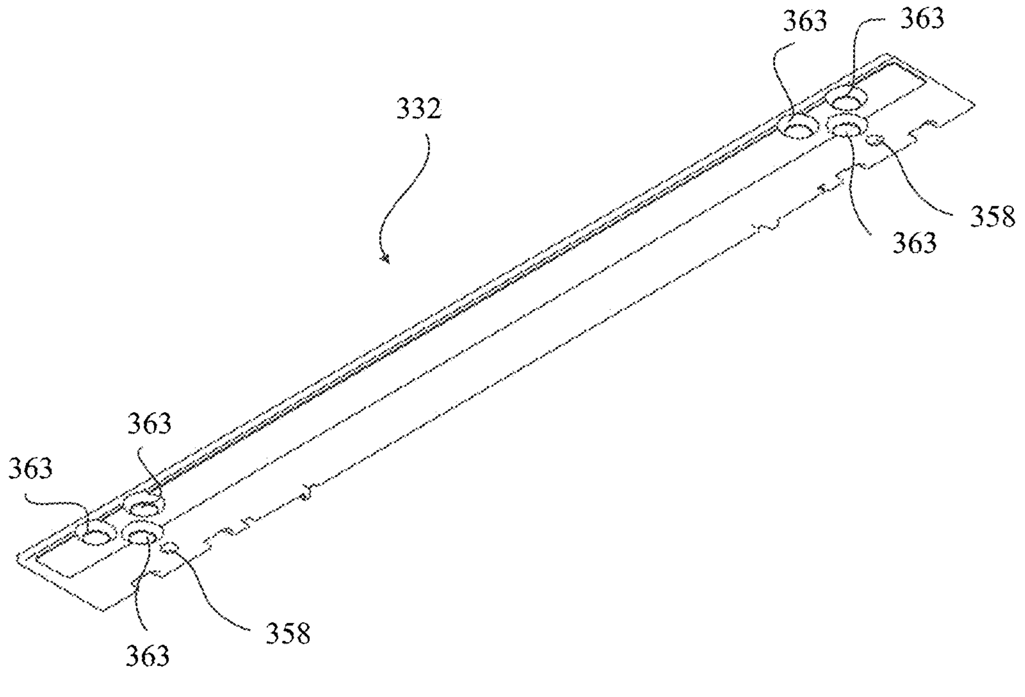
FIG. 13 is a schematic diagram of a first support plate of a hinge mechanism according to an embodiment of this disclosure.
Figure 14:
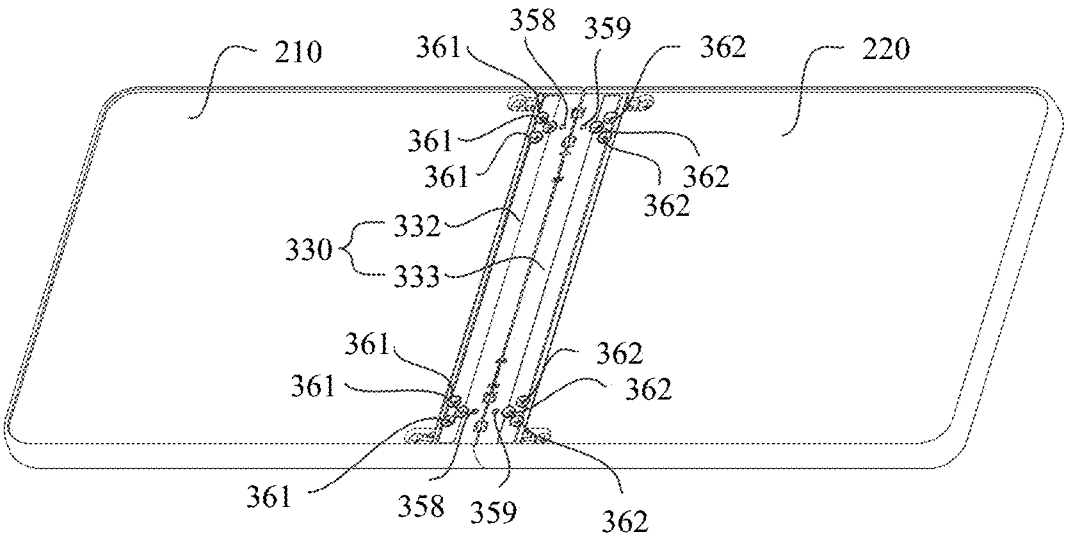
FIG. 14 is a schematic diagram in which another foldable device is unfolded according to an embodiment of this disclosure.

FIG. 11 is a schematic diagram in which a first guide rod arm, a first connecting frame, and a first support arm are connected to a main shaft assembly when a hinge mechanism is in an unfolded state according to an embodiment of this disclosure. FIG. 12 is a schematic diagram in which a first guide rod arm, a first connecting frame, and a first support arm are connected to a main shaft assembly when a hinge mechanism is in a folded state according to an embodiment of this disclosure. FIG. 13 is a schematic diagram of a first support plate of a hinge mechanism according to an embodiment of this disclosure. FIG. 14 is a schematic diagram in which another foldable device is unfolded according to an embodiment of this disclosure.

As shown in FIG. 11 to FIG. 14, in some embodiments of this disclosure, a first positioning post 351 is disposed on the first support arm 323, and a first positioning hole 358 corresponding to the first positioning post 351 is provided on the first support plate 332. The first positioning post 351 extends into the corresponding first positioning hole 358, so that the first support arm 323 and the first support plate 332 are positioned. In this way, the first support plate 332 is accurately mounted at a preset position of the first support arm 323, so that assembly efficiency is improved.

Referring to an assembly relationship between the first support arm 323 and the first support plate 332, in some embodiments of this disclosure, a second positioning post 352 is disposed on the second support arm 324, and a second positioning hole 359 corresponding to the second positioning post 352 is provided on the second support plate 333. The second positioning post 352 extends into the corresponding second positioning hole 359, so that the second support arm 324 and the second support plate 333 are positioned. In this way, the second support plate 333 is accurately mounted at a preset position of the second support arm 324, so that assembly efficiency is improved.

In some embodiments of this disclosure, the first support arm 323 is fastened to the first support plate 332 by using a first plate body fastener 361. It may be understood that, a first mounting hole 357 that is in a one-to-one correspondence with the first plate body fastener 361, and that is configured to mount the corresponding first plate body fastener 361 is provided on the first support arm 323, and a second mounting hole 363 through which the corresponding first plate body fastener 361 passes through is provided on the first support plate 332, to fasten the first support arm 323 to the first support plate 332 by using the first plate body fastener 361. In this way, assembly between the first support plate 332 and the first support arm 323 is easy.

In some embodiments of this disclosure, the first support arm 323 may be detachably connected to the first support plate 332 by using the first plate body fastener 361. In this way, it is convenient to replace the first support plate 332.

In some embodiments of this disclosure, the second support plate 333 is fastened to the second support plate 333 by using the second plate body fastener 362. It may be understood that, a third mounting hole that is in a one-to-one correspondence with the second plate body fastener 362, and that is configured to mount the corresponding second plate body fastener 362 is provided on the second support arm 324, and a fourth mounting hole through which the corresponding second plate body fastener 362 passes through is provided on the second support plate 333, to fasten the second support arm 324 to the second support plate 333 by using the second plate body fastener 362. In this way, assembly between the second support plate 333 and the second support arm 324 is easy.

In some embodiments of this disclosure, the second support arm 324 may be detachably connected to the second support plate 333 by using the second plate body fastener 362. In this way, it is convenient to replace the second support plate 333.

In some embodiments of this disclosure, the first support arm 323 is fastened to the first support plate 332 by using at least two first plate body fasteners 361, and the at least two first plate body fasteners 361 and the first positioning post 351 are not on a same straight line. In this way, the first support plate 332 and the first support arm 323 are connected more securely, and are unlikely to loosen.

For example, three first plate body fasteners 361 that are distributed in an isosceles triangle are fastened to a fastening surface of the first support arm 323. A bottom edge of the isosceles triangle is parallel to an axial direction of the main shaft assembly 310, and the first positioning post 351 is disposed at a vertex angle of the isosceles triangle and is located outside the isosceles triangle. The first positioning post 351 and the two first plate body fasteners 361 on the bottom edge of the isosceles triangle form another isosceles triangle. In this way, stability of the connection between the first support plate 332 and the first support arm 323 can be further improved.

Figure 15:
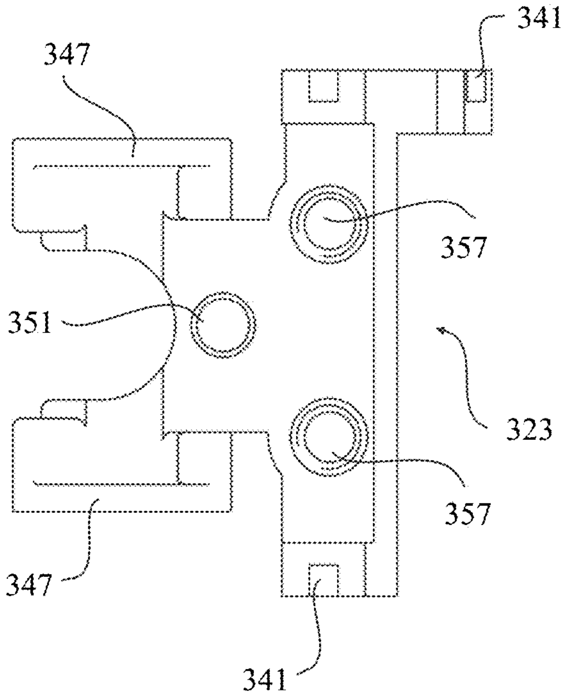
FIG. 15 is a schematic diagram of a first support arm of another hinge mechanism according to an embodiment of this disclosure from an angle of view.
Figure 16:
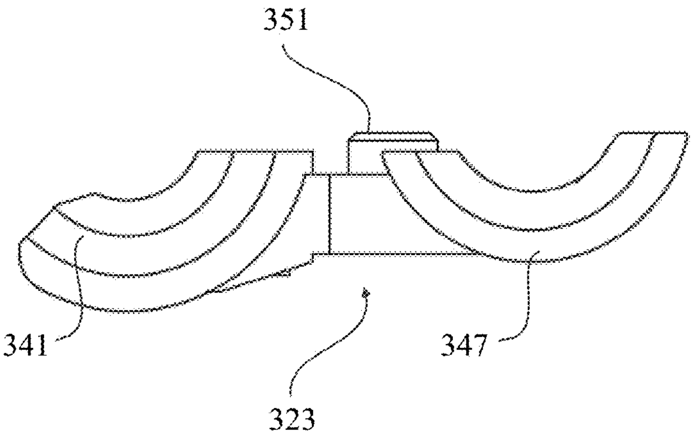
FIG. 16 is a schematic diagram of a first support arm of another hinge mechanism according to an embodiment of this disclosure from another angle of view.
Figure 17:
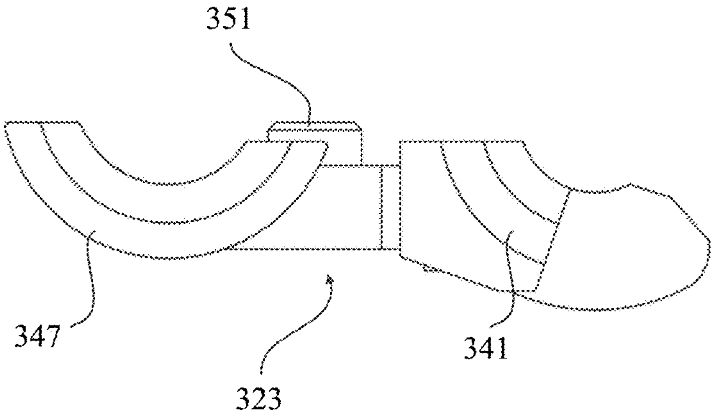
FIG. 17 is a schematic diagram of a first support arm of another hinge mechanism according to an embodiment of this disclosure from still another angle of view.
Figure 18:
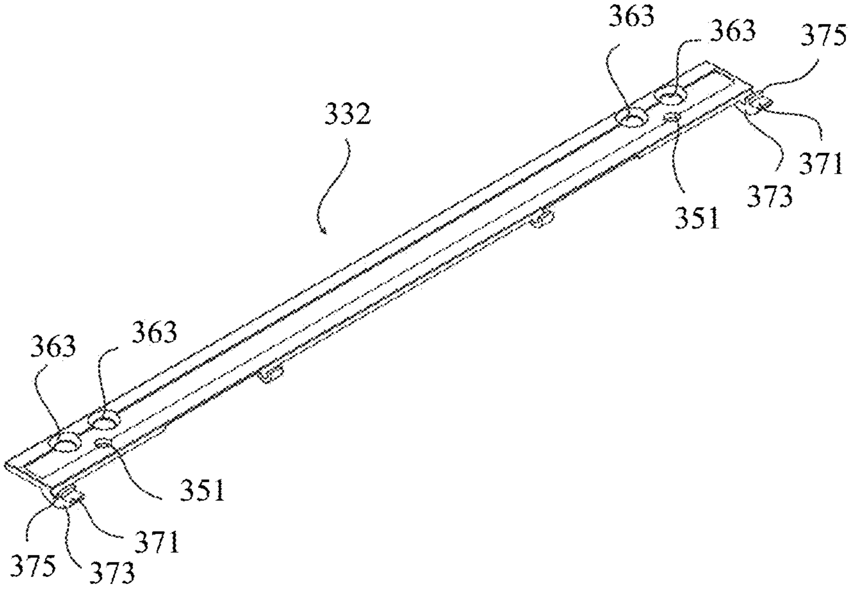
FIG. 18 is a schematic diagram of a first support plate of another hinge mechanism according to an embodiment of this disclosure.
Figure 19:
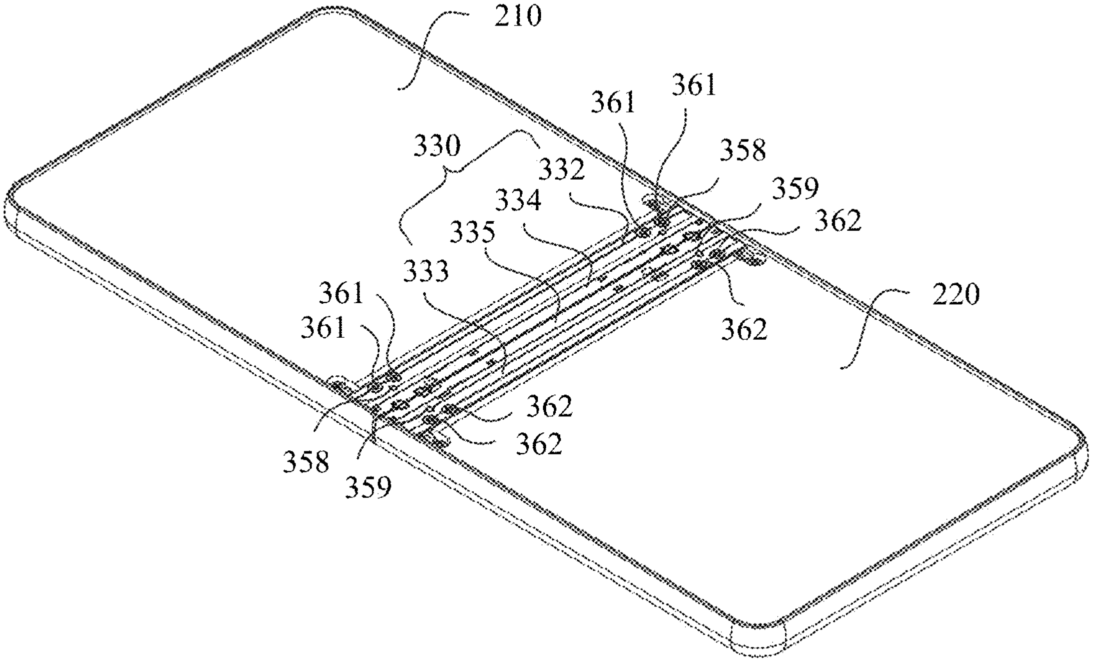
FIG. 19 is a schematic diagram in which another foldable device is unfolded according to an embodiment of this disclosure.

FIG. 15 to FIG. 17 are schematic diagrams of a first support arm of another hinge mechanism according to an embodiment of this disclosure from three different angles of view. FIG. 18 is a schematic diagram of a first support plate of another hinge mechanism according to an embodiment of this disclosure. FIG. 19 is a schematic diagram in which another foldable device is unfolded according to an embodiment of this disclosure.

As shown in FIG. 15 to FIG. 19, for example, two first plate body fasteners 361 are fastened to a fastening surface of the first support arm 323. The two first plate body fasteners 361 and the first positioning post 351 are distributed in an isosceles triangle, and a connection line between centers of the two first plate body fasteners 361 is a bottom edge of the isosceles triangle, and is parallel to an axial direction of the main shaft assembly 310. In this way, the first support plate 332 with a narrow width is securely fastened to the first support arm 323.

Referring to an assembly relationship between the first support arm 323 and the first support plate 332, in some embodiments of this disclosure, the second support arm 324 is fastened to the second support plate 333 by using at least two second plate body fasteners 362, and the at least two second plate body fasteners 362 and the second positioning post 352 are not on a same straight line. In this way, the second support plate 333 and the second support arm 324 are connected more securely, and are unlikely to loosen.

For example, three second plate body fasteners 362 that are distributed in an isosceles triangle are fastened to a fastening surface of the second support arm 324. A bottom edge of the isosceles triangle is parallel to the axial direction of the main shaft assembly 310, and the second positioning post 352 is disposed at a vertex angle of the isosceles triangle and is located outside the isosceles triangle. The second positioning post 352 and the two second plate body fasteners 362 on the bottom edge of the isosceles triangle form another isosceles triangle. In this way, stability of the connection between the second support plate 333 and the second support arm 324 can be further improved.

For example, two second plate body fasteners 362 are fastened to a fastening surface of the second support arm 324. The two second plate body fasteners 362 and the second positioning post 352 are distributed in an isosceles triangle, and a connection line between centers of the two second plate body fasteners 362 is a bottom edge of the isosceles triangle, and is parallel to the axial direction of the main shaft assembly 310. In this way, the second support plate 333 with a narrow width is securely fastened to the second support arm 324.

As shown in FIG. 11, FIG. 12, and FIG. 15 to FIG. 17, in some embodiments of this disclosure, the first arc-shaped sliding grooves 341 are provided on both ends in the axial direction of the main shaft assembly 310 of the first support arm 323, and the two first arc-shaped arms 343 that slidably fit the two first arc-shaped sliding grooves 341 respectively are disposed on the first connecting frame 321. The first support arm 323 is rotatably connected to the first connecting frame 321 through the two first arc-shaped sliding grooves 341 on the two ends and the two first arc-shaped arms 343 that are slidably assembled in the two first arc-shaped sliding grooves 341. In this way, the first support arm 323 is rotatably connected to the first connecting frame 321 stably, and it is relatively easy to provide the first arc-shaped sliding groove 341 at an end part of the first support arm 323, thereby facilitating manufacturing.

The second support arm 324 may be disposed with reference to the first support arm 323. In some embodiments of this disclosure, second arc-shaped sliding grooves 342 are provided on both ends in the axial direction of the main shaft assembly 310 of the second support arm 324, and two second arc-shaped arms 344 that slidably fit the two second arc-shaped sliding grooves 342 respectively are disposed on the second connecting frame 322. The second support arm 324 is rotatably connected to the second connecting frame 322 through the two second arc-shaped sliding grooves 342 on the two ends and the two second arc-shaped arms 344 that are slidably assembled in the two second arc-shaped sliding grooves 342. In this way, the second support arm 324 is rotatably connected to the second connecting frame 322 stably, and it is relatively easy to provide the second arc-shaped sliding groove 342 at an end part of the second support arm 324, thereby facilitating manufacturing.

In some embodiments of this disclosure, the first support arm 323 and the second support arm 324 may alternatively be rotatably connected to the main shaft assembly 310 around a virtual axis located outside the main shaft assembly 310. A rotation axis through which the first support arm 323 rotates around the main shaft assembly 310 is located outside a side that is of each of the first support arm 323 and the main shaft assembly 310 and that faces the flexible display 100. A rotation axis through which the second support arm 324 rotates around the main shaft assembly 310 is located outside a side that is of each of the second support arm 324 and the main shaft assembly 310 and that faces the flexible display 100. In this way, the rotation axis through which the first support arm 323 rotates relative to the main shaft assembly 310 and the rotation axis through which the first guide rod arm 325 rotates relative to the main shaft assembly 310 are disposed at two different positions that are parallel to each other. In addition, the rotation axis through which the second support arm 324 rotates relative to the main shaft assembly 310 and the rotation axis through which the second guide rod arm 326 rotates relative to the main shaft assembly 310 are disposed at two different positions that are parallel to each other, so that a size of the main shaft assembly 310 can be reduced.

In some embodiments of this disclosure, the first support arm 323 is rotatably connected to the main shaft assembly 310 through a third arc-shaped sliding groove 345 and a third arc-shaped arm 347 that slidably fits the third arc-shaped sliding groove 345. The third arc-shaped sliding groove 345 and the third arc-shaped arm 347 are disposed on the first support arm 323 and the main shaft assembly 310. In this way, the rotation axis through which the first support arm 323 rotates relative to the main shaft assembly 310 may not occupy positions of the first support arm 323 and the main shaft assembly 310, and a physical connecting shaft does not need to be disposed by increasing sizes of the first support arm 323 and the main shaft assembly 310. This can reduce limitation on space occupied by disposing the physical connecting shaft and an angle at which the first support arm 323 rotates relative to the main shaft assembly 310. In addition, the first support arm 323 is securely connected to the main shaft assembly 310, and a connection structure between the first support arm 323 and the main shaft assembly 310 may be well hidden. This improves integration and use experience of the hinge mechanism 300.

It may be understood that the third arc-shaped sliding groove 345 may be provided on the first support arm 323, and the third arc-shaped arm 347 may be disposed on the main shaft assembly 310. Alternatively, the third arc-shaped arm 347 may be disposed on the first support arm 323, and the third arc-shaped sliding groove 345 may be provided on the main shaft assembly 310. For example, the third arc-shaped sliding groove 345 is provided on the main shaft assembly 310, and the third arc-shaped arm 347 is disposed on the first support arm 323.

The third arc-shaped sliding groove 345 may be a quarter circular arc groove, a one-third circular arc groove, a half circular arc groove, or the like. The third arc-shaped arm 347 may be a quarter circular arc arm, a one-third circular arc arm, a half circular arc arm, or the like. Shapes and positions of the third arc-shaped sliding groove 345 and the third arc-shaped arm 347 may be adjusted based on an actual situation of an disclosure scenario.

Each side groove wall of the third arc-shaped sliding groove 345 may be of an integrated structure. In this way, a tolerance caused by assembling the third arc-shaped sliding groove 345 can be reduced. The third arc-shaped sliding groove 345 may alternatively be formed by assembling a fifth mechanical part having an arc-shaped recess and a sixth mechanical part having an arc-shaped protrusion. The arc-shaped recess of the fifth mechanical part and the arc-shaped protrusion of the sixth mechanical part are spaced, to define the third arc-shaped sliding groove 345. In this way, the third arc-shaped sliding groove 345 is easy to form. It should be noted that when the third arc-shaped sliding groove 345 is provided on the main shaft assembly 310, the sixth mechanical part may be further configured to support the flexible display 100.

In some embodiments of this disclosure, the first support arm 323 may alternatively be rotatably connected to the main shaft assembly 310 by using a physical connecting shaft.

For an assembly relationship between the second support arm 324 and the main shaft assembly 310, refer to an assembly relationship between the first support arm 323 and the main shaft assembly 310. In some embodiments of this disclosure, the second support arm 324 is rotatably connected to the main shaft assembly 310 through a fourth arc-shaped sliding groove 346 and a fourth arc-shaped arm

348 that slidably fits the fourth arc-shaped sliding groove 346. The fourth arc-shaped sliding groove 346 and the fourth arc-shaped arm 348 are disposed on the second support arm 324 and the main shaft assembly 310. In this way, the rotation axis through which the second support arm 324 rotates relative to the main shaft assembly 310 may not occupy positions of the second support arm 324 and the main shaft assembly 310, and a physical connecting shaft does not need to be disposed by increasing sizes of the second support arm 324 and the main shaft assembly 310. This can reduce limitation on space occupied by disposing the physical connecting shaft and an angle at which the second support arm 324 rotates relative to the main shaft assembly 310. In addition, the second support arm 324 is securely connected to the main shaft assembly 310, and a connection structure between the second support arm 324 and the main shaft assembly 310 may be well hidden. This improves integration and use experience of the hinge mechanism 300.

It may be understood that the fourth arc-shaped sliding groove 346 may be provided on the second support arm 324, and the fourth arc-shaped arm 348 may be disposed on the main shaft assembly 310. Alternatively, the fourth arc-shaped arm 348 may be disposed on the second support arm 324, and the fourth arc-shaped sliding groove 346 may be provided on the main shaft assembly 310. For example, the fourth arc-shaped sliding groove 346 is provided on the main shaft assembly 310, and the fourth arc-shaped arm 348 is disposed on the second support arm 324.

The fourth arc-shaped sliding groove 346 may be a quarter circular arc groove, a one-third circular arc groove, a half circular arc groove, or the like. The fourth arc-shaped arm 348 may be a quarter circular arc arm, a one-third circular arc arm, a half circular arc arm, or the like. Shapes and positions of the fourth arc-shaped sliding groove 346 and the fourth arc-shaped arm 348 may be adjusted based on an actual situation of an disclosure scenario.

Each side groove wall of the fourth arc-shaped sliding groove 346 may be of an integrated structure. In this way, a tolerance caused by assembling the fourth arc-shaped sliding groove 346 can be reduced. The fourth arc-shaped sliding groove 346 may alternatively be formed by assembling a seventh mechanical part having an arc-shaped recess and an eighth mechanical part having an arc-shaped protrusion. The arc-shaped recess of the seventh mechanical part and the arc-shaped protrusion of the eighth mechanical part are spaced, to define the fourth arc-shaped sliding groove 346. In this way, the fourth arc-shaped sliding groove 346 is easy to form. It should be noted that when the fourth arc-shaped sliding groove 346 is provided on the main shaft assembly 310, the eighth mechanical part may be further configured to support the flexible display 100. The sixth mechanical part and the eighth mechanical part may be of an integrated structure. The fifth mechanical part and the seventh mechanical part may be of an integrated structure.

In some embodiments of this disclosure, the second support arm 324 may alternatively be rotatably connected to the main shaft assembly 310 by using a physical connecting shaft.

As shown in FIG. 5, FIG. 6, FIG. 11, and FIG. 12, in some embodiments of this disclosure, the first connecting frame 321 is slidably connected to the first guide rod arm 325 through a first linear sliding groove 355 and a first sliding block 353 that slidably fits the first linear sliding groove 355. The first linear sliding groove 355 and the first sliding block 353 are disposed on the first connecting frame 321 and the first guide rod arm 325.

It may be understood that the first linear sliding groove 355 may be provided on the first connecting frame 321, and the first sliding block 353 that is slidably assembled in the first linear sliding groove 355 may be disposed on the first guide rod arm 325. Alternatively, the first linear sliding groove 355 may be provided on the first guide rod arm 325, and the first sliding block 353 that is slidably assembled in the first linear sliding groove 355 may be disposed on the first connecting frame 321. Cross sections that are of the first linear sliding groove 355 and the first sliding block 353 and that are perpendicular to sliding directions of the first linear sliding groove 355 and the first sliding block 353 correspond to each other. The cross section may be in a shape of trapezoid, triangle, "cross", "T", or the like. For example, the cross section of the first linear sliding groove 355 is in a shape of "T".

In some embodiments of this disclosure, the second connecting frame 322 is slidably connected to the second guide rod arm 326 through a second linear sliding groove 356 and a second sliding block 354 that slidably fits the second linear sliding groove 356. The second linear sliding groove 356 and the second sliding block 354 are disposed on the second connecting frame 322 and the second guide rod arm 326.

It may be understood that the second linear sliding groove 356 may be provided on the second connecting frame 322, and the second sliding block 354 that is slidably assembled in the second linear sliding groove 356 may be disposed on the second guide rod arm 326. Alternatively, the second linear sliding groove 356 may be provided on the second guide rod arm 326, and the second sliding block 354 that is slidably assembled in the second linear sliding groove 356 may be disposed on the second connecting frame 322. Cross sections that are of the second linear sliding groove 356 and the second sliding block 354 and that are perpendicular to sliding directions of the second linear sliding groove 356 and the second sliding block 354 correspond to each other. The cross section may be in a shape of trapezoid, triangle, "cross", "T", or the like. For example, the cross section of the second linear sliding groove 356 is in a shape of "T".

In some embodiments of this disclosure, the first guide rod arm 325 is rotatably connected to the main shaft assembly 310 by using a first connecting shaft 410 disposed on the main shaft assembly 310. In this way, a position of a rotation axis through which the first guide rod arm 325 rotates around the main shaft assembly 310 is grasped, and a part of a surface of the first guide rod arm 325 is not blocked by the main shaft assembly 310, so that another structure is disposed on the surface of the part of the first guide rod arm 325.

It may be understood that, when the foldable assembly 320 includes a plurality of guide rod arm groups, first connecting shafts 410 that are connected to first guide rod arms 325 in the plurality of guide rod arm groups are coaxial. The plurality of coaxial first connecting shafts 410 may be of a head-to-tail connected integrated structure, or may be split structures that are disposed at intervals.

It should be noted that the first connecting shaft 410 may be rotatably connected to the main shaft assembly 310, and the first guide rod arm 325 may be in a transmission connection to the first connecting shaft 410 by using a structure like a surface or a spline. Alternatively, the first guide rod arm 325 and the first connecting shaft 410 may be in interference fit or integrally formed. The first connecting shaft 410 may alternatively be fastened to the main shaft assembly 310, and the first guide rod arm 325 is rotatably connected to the corresponding first connecting shaft 410.

In some embodiments of this disclosure, the first guide rod arm 325 may alternatively be rotatably connected to the main shaft assembly 310 through an arc-shaped sliding groove and an arc-shaped arm that slidably fit each other.

In an example, in some embodiments of this disclosure, when the foldable assembly 320 includes a plurality of guide rod arm groups, some first guide rod arms 325 may be rotatably connected to the main shaft assembly 310 by using the first connecting shafts 410 disposed on the main shaft assembly 310, and some first guide rod arms 325 may be rotatably connected to the main shaft assembly 310 through arc-shaped sliding grooves and arc-shaped arms that slidably fit each other, provided that rotation axes through which all the first guide rod arms 325 rotate relative to the main shaft assembly 310 are coaxial.

In some embodiments of this disclosure, the second guide rod arm 326 is rotatably connected to the main shaft assembly 310 by using a second connecting shaft 420 disposed on the main shaft assembly 310. In this way, a position of a rotation axis through which the second guide rod arm 326 rotates around the main shaft assembly 310 is grasped, and a part of a surface of the second guide rod arm 326 is not blocked by the main shaft assembly 310, so that another structure is disposed on the surface of the part of the second guide rod arm 326.

It may be understood that, when the foldable assembly 320 includes a plurality of guide rod arm groups, second connecting shafts 420 that are connected to second guide rod arms 326 in the plurality of guide rod arm groups are coaxial. The plurality of coaxial second connecting shafts 420 may be of a head-to-tail connected integrated structure, or may be split structures that are disposed at intervals.

It should be noted that the second connecting shaft 420 may be rotatably connected to the main shaft assembly 310, and the second guide rod arm 326 may be in a transmission connection to the second connecting shaft 420 by using a structure like a surface or a spline. Alternatively, the second guide rod arm 326 and the second connecting shaft 420 may be in interference fit or integrally formed. The second connecting shaft 420 may alternatively be fastened to the main shaft assembly 310, and the second guide rod arm 326 is rotatably connected to the corresponding second connecting shaft 420.

In some embodiments of this disclosure, the second guide rod arm 326 may alternatively be rotatably connected to the main shaft assembly 310 through an arc-shaped sliding groove and an arc-shaped arm that slidably fit each other.

In an example, in some embodiments of this disclosure, when the foldable assembly 320 includes a plurality of guide rod arm groups, some second guide rod arms 326 may be rotatably connected to the main shaft assembly 310 by using the second connecting shafts 420 disposed on the main shaft assembly 310, and some second guide rod arms 326 may be rotatably connected to the main shaft assembly 310 through arc-shaped sliding grooves and arc-shaped arms that slidably fit each other, provided that rotation axes through which all the second guide rod arms 326 rotate relative to the main shaft assembly 310 are coaxial.

As shown in FIG. 5 to FIG. 7 and FIG. 10 to FIG. 12, in some embodiments of this disclosure, a first avoidance groove 311 and a second avoidance groove 312 are provided on the main shaft assembly 310. The first avoidance groove 311 is used for rotating the first support plate 332, and a groove wall of the first avoidance groove 311 is an arc surface extending along a rotation path of the end that is of the first support plate 332 and that is close to the main shaft assembly 310. The second avoidance groove 312 is used for rotating the second support plate 333, and a groove wall of the second avoidance groove 312 is an arc surface extending along a rotation path of the end that is of the second support plate 333 and that is close to the main shaft assembly 310. The end that is of the first support plate 332 and that is close to the main shaft assembly 310 is in lap fit with the groove wall of the first avoidance groove 311, to limit the first support plate 332 to move toward the main shaft assembly 310. The end that is of the second support plate 333 and that is close to the main shaft assembly 310 is in lap fit with the groove wall of the second avoidance groove 312, to limit the second support plate 333 to move toward the main shaft assembly 310.

In this way, a tolerance that is of a moving track of each of the first support plate 332 and the second support plate 333 and that is caused by factors such as a gap required for rotating the first support arm 323 fastened to the first support plate 332 and a gap required for rotating the second support arm 324 fastened to the second support plate 333 can be reduced, so that a motion of the first support plate 332 and a motion of the second support plate 333 can be more stable.

Figure 20:
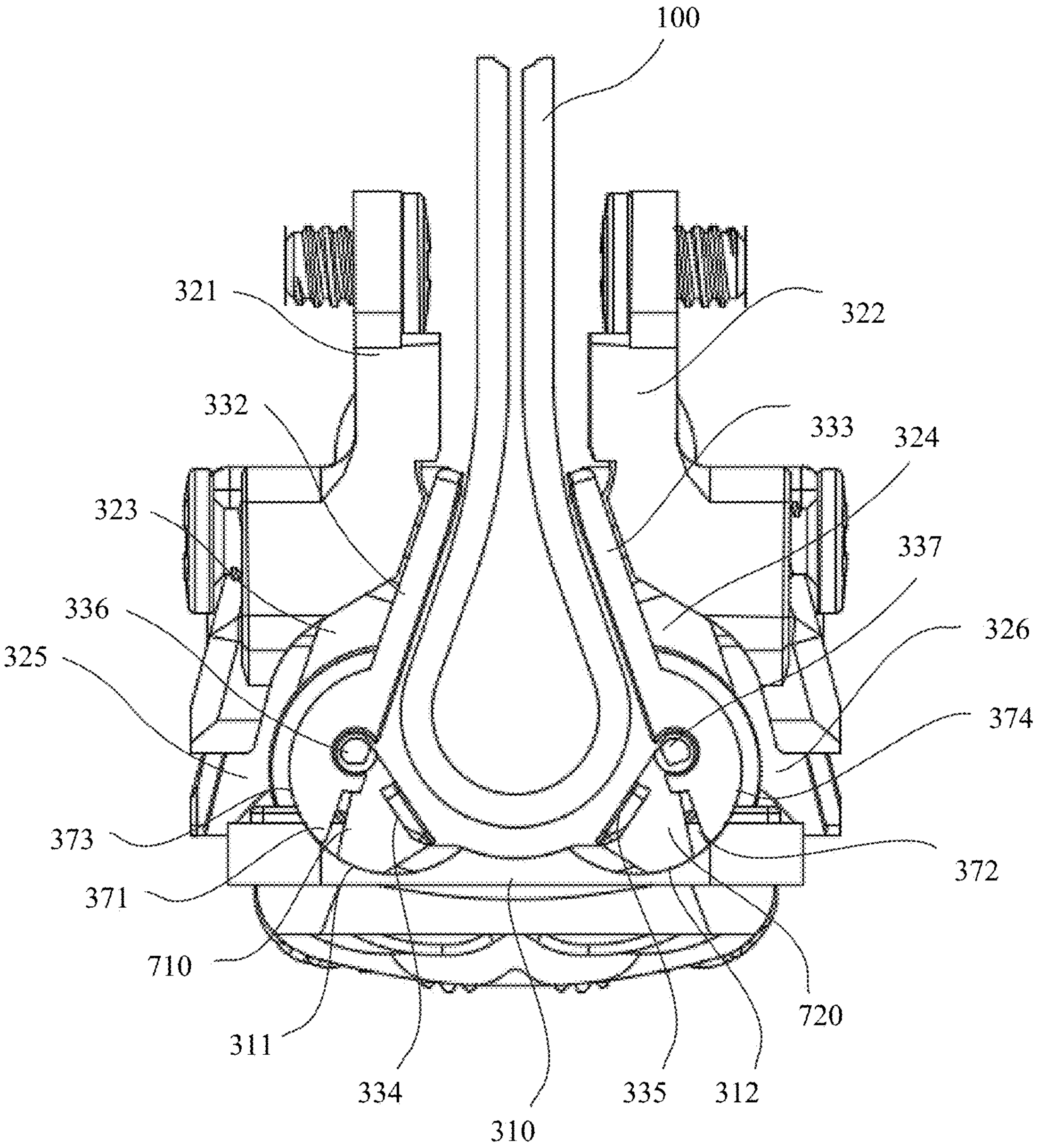
FIG. 20 is a schematic diagram in which a flexible display is folded when another hinge mechanism is in a folded state according to an embodiment of this disclosure.

FIG. 20 is a schematic diagram in which a flexible display is folded when another hinge mechanism is in a folded state according to an embodiment of this disclosure.

As shown in FIG. 20 and FIG. 18, in some examples, a first arc-shaped lap joint part 373 corresponding to the groove wall of the first avoidance groove 311 is disposed on the first support plate 332. The first arc-shaped lap joint part 373 is in lap joint with the groove wall of the first avoidance groove 311, and may slide along the groove wall of the first avoidance groove 311. The first arc-shaped lap joint part 373 presses against the groove wall of the first avoidance groove 311, to limit the first support plate 332 to move toward the main shaft assembly 310. In this way, a lap joint surface between the first arc-shaped lap joint part 373 and the groove wall of the first avoidance groove 311 is large, so that constraint effect on rotation of the first support plate 332 can be improved, and the motion of the first support plate 332 can be more stable.

In some examples, a second arc-shaped lap joint part 374 corresponding to the groove wall of the second avoidance groove 312 is disposed on the second support plate 333. The second arc-shaped lap joint part 374 is in lap joint with the groove wall of the second avoidance groove 312, and may slide along the groove wall of the second avoidance groove 312. The second arc-shaped lap joint part 374 presses against the groove wall of the second avoidance groove 312, to limit the second support plate 333 to move toward the main shaft assembly 310. In this way, a lap joint surface between the second arc-shaped lap joint part 374 and the groove wall of the second avoidance groove 312 is large, so that constraint effect on rotation of the second support plate 333 can be improved, and the motion of the second support plate 333 can be more stable.

Figure 21:
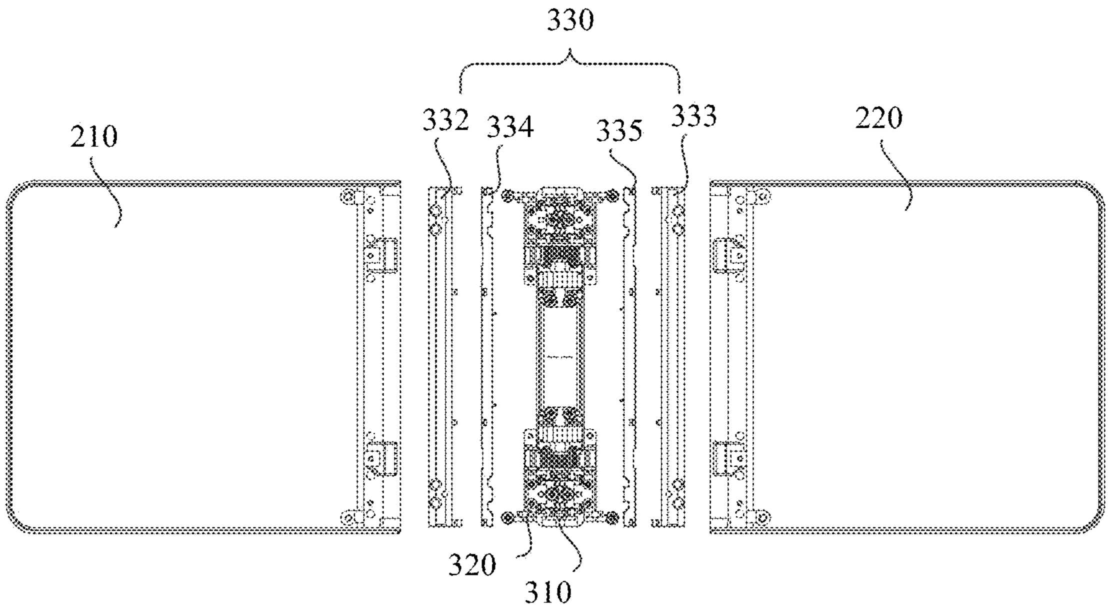
FIG. 21 is an exploded view in which another foldable device is unfolded according to an embodiment of this disclosure.
Figure 22:
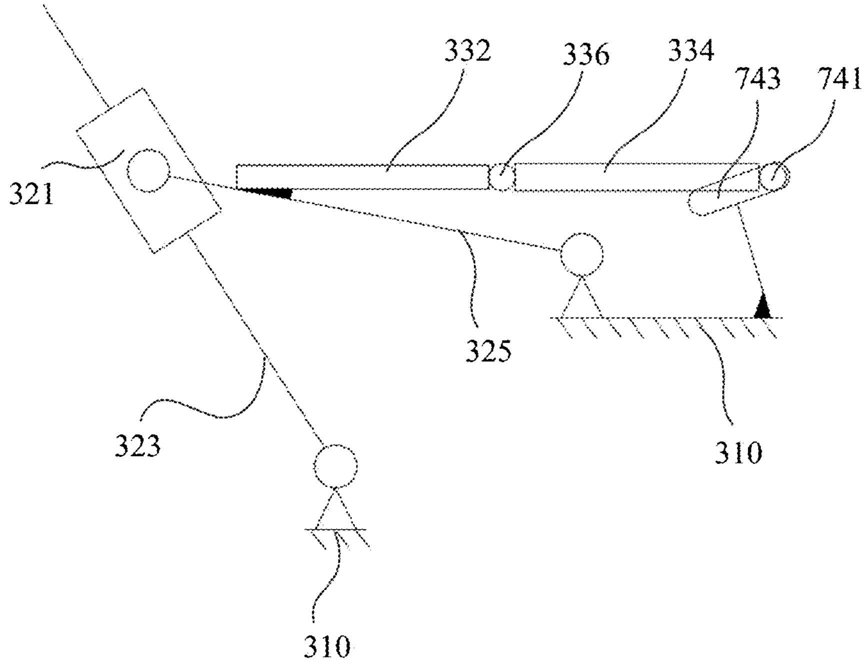
FIG. 22 is a simplified diagram in which a first guide rod arm, a first connecting frame, and a first support arm are connected to a main shaft assembly when another hinge mechanism is in an unfolded state according to an embodiment of this disclosure.
Figure 23:
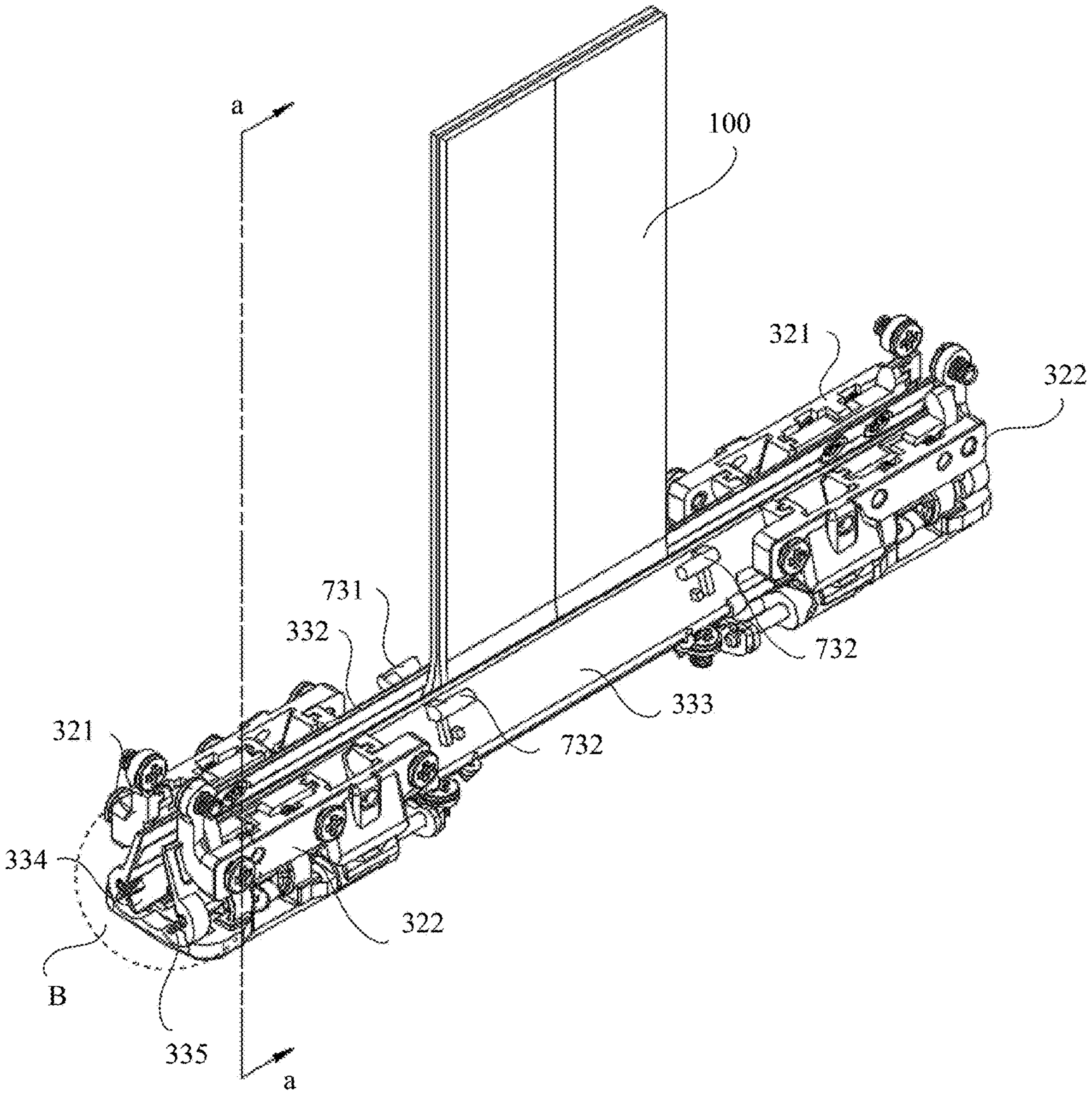
FIG. 23 is a schematic diagram in which a flexible display is folded when another hinge mechanism is in a folded state according to an embodiment of this disclosure.
Figure 24:
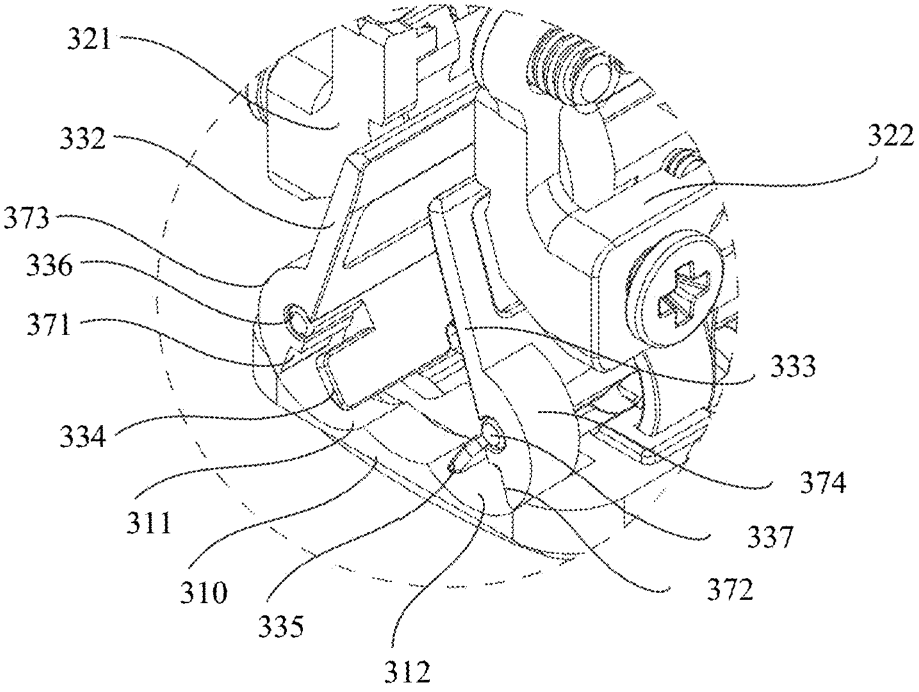
FIG. 24 is an enlarged view at B in FIG. 23.

FIG. 21 is an exploded view in which another foldable device is unfolded according to an embodiment of this disclosure. FIG. 22 is a simplified diagram in which a first guide rod arm, a first connecting frame, and a first support arm are connected to a main shaft assembly when another hinge mechanism is in an unfolded state according to an embodiment of this disclosure. FIG. 23 is a schematic diagram in which a flexible display is folded when another hinge mechanism is in a folded state according to an embodiment of this disclosure. FIG. 24 is an enlarged view at B in FIG. 23.

As shown in FIG. 21 to FIG. 24, and FIG. 20, in some embodiments of this disclosure, the support assembly 330 further includes a first secondary support plate 334 and a second secondary support plate 335 that are located on a side that is of the main shaft assembly 310 and that faces the flexible display 100, and that are configured to support the flexible display 100. An end of the first secondary support plate 334 is rotatably connected to an end that is of the first support plate 332 and that faces the main shaft assembly 310, and an end of the second secondary support plate 335 is rotatably connected to an end that is of the second support plate 333 and that faces the main shaft assembly 310. The hinge mechanism 300 further includes a first constraint structure and a second constraint structure. The first constraint structure is configured to constrain a moving track of an end that is of the first secondary support plate 334 and that is away from the first support plate 332. The second constraint structure is configured to constrain a moving track of an end that is of the second secondary support plate 335 and that is away from the second support plate 333.

When the hinge mechanism 300 is switched from the unfolded state to the folded state, the end that is of the first secondary support plate 334 and that is connected to the first support plate 332, and the end that is of the second secondary support plate 335 and that is connected to the second support plate 333 separately move in a direction away from the main shaft assembly 310. In addition, the first secondary support plate 334 and the second secondary support plate 335 respectively rotate relative to the first support plate 332 and the second support plate 333, so that the end that is of the first secondary support plate 334 and that is away from the first support plate 332 and the end that is of the second secondary support plate 335 and that is away from the second support plate 333 respectively rotate relative to the main shaft assembly 310 under constraints of the first constraint structure and the second constraint structure, and respectively move toward two sides of the main shaft assembly 310. When the hinge mechanism 300 is in the folded state, a surface that is of each of the first secondary support plate 334 and the second secondary support plate 335 and that is used to support the flexible display 100 is at an obtuse angle with the main shaft assembly 310. The first secondary support plate 334, the second secondary support plate 335, the first support plate 332, the second support plate 333, and the main shaft assembly 310 jointly enclose the display accommodating space.

It should be noted that, when the support assembly 330 includes the first secondary support plate 334 and the second secondary support plate 335, a gap for the first support plate 332 and the second support plate 333 to move is formed between the first secondary support plate 334 and the second secondary support plate 335.

It may be understood that, when the hinge mechanism 300 is in the folded state, the second display area 120 of the flexible display 100 that is clamped in the hinge mechanism 300 is folded to form a water-drop-like structure, and a water-drop-like structure may also be formed between the first support plate 332, the second support plate 333, the first secondary support plate 334, the second secondary support plate 335, and the main shaft assembly 310. It should be noted that the water-drop-like structure formed after the second display area 120 is folded includes a first gradient segment that is away from the main shaft assembly 310 and a second gradient segment that is close to the main shaft assembly 310. An end part that is of the first gradient segment and that is close to the main shaft assembly 310 is connected to an end part that is of the second gradient segment and that is away from the main shaft assembly 310. The first gradient segment is gradually folded toward the middle from an end that is close to the main shaft assembly 310 to an end that is away from the main shaft assembly 310. The second gradient segment is gradually folded toward the middle from an end that is close to the main shaft assembly 310 to an end that is away from the main shaft assembly 310. The first support plate 332 and the second support plate 333 may support two sides of the first gradient segment of the water-drop-like structure that is formed after the second display area 120 is folded. The first secondary support plate 334 and the second secondary support plate 335 may support two sides of the second gradient segment of the water-drop-like structure that is formed after the second display area 120 is folded. In this way, a form of the folded second display area 120 is more convenient to control, and a risk of damage to the flexible display 100 caused by an unstable form of the second display area 120 during folding can be reduced.

In some embodiments of this disclosure, when the hinge mechanism 300 is switched from the unfolded state to the folded state, an angle at which the first secondary support plate 334 rotates relative to the main shaft assembly 310 is less than an angle at which the first connecting frame 321 rotates relative to the main shaft assembly 310, and an angle at which the second secondary support plate 335 rotates relative to the main shaft assembly 310 is less than an angle at which the second connecting frame 322 rotates relative to the main shaft assembly 310. In this way, when the hinge mechanism 300 is switched to the folded state, an opening degree of an end part that is of each of the first secondary support plate 334 and the second secondary support plate 335 and that is away from the main shaft assembly 310 is greater than an opening degree of an end part that is of each of the first connecting frame 321 and the second connecting frame 322 and that is away from the main shaft assembly 310, so that the first support plate 332 and the second support plate 333 form water-drop-like display accommodating space with the main shaft assembly 310. This helps effectively support a part that is of the folded flexible display 100 and that is close to the main shaft assembly 310 by using the first secondary support plate 334 and the second secondary support plate 335.

As shown in FIG. 18, FIG. 20, and FIG. 24, in some embodiments of this disclosure, a first support part 371 is disposed at an end that is of the first support plate 332 and that faces the main shaft assembly 310, and the first support part 371 is configured to support the first secondary support plate 334 when the hinge mechanism 300 is switched to the unfolded state. In this way, when the hinge mechanism 300 is in the unfolded state, the first support part 371 may enable the first secondary support plate 334 to be stably located at a preset position, to stably support the flexible display 100.

The second support plate 333 may be designed with reference to a structure of the first support plate 332. In some embodiments of this disclosure, a second support part 372 is disposed at an end that is of the second support plate 333 and that faces the main shaft assembly 310, and the second support part 372 is configured to support the second secondary support plate 335 when the hinge mechanism 300 is switched to the unfolded state. In this way, when the hinge mechanism 300 is in the unfolded state, the second support part 372 may enable the second secondary support plate 335 to be stably located at a preset position, to stably support the flexible display 100.

Figure 25:
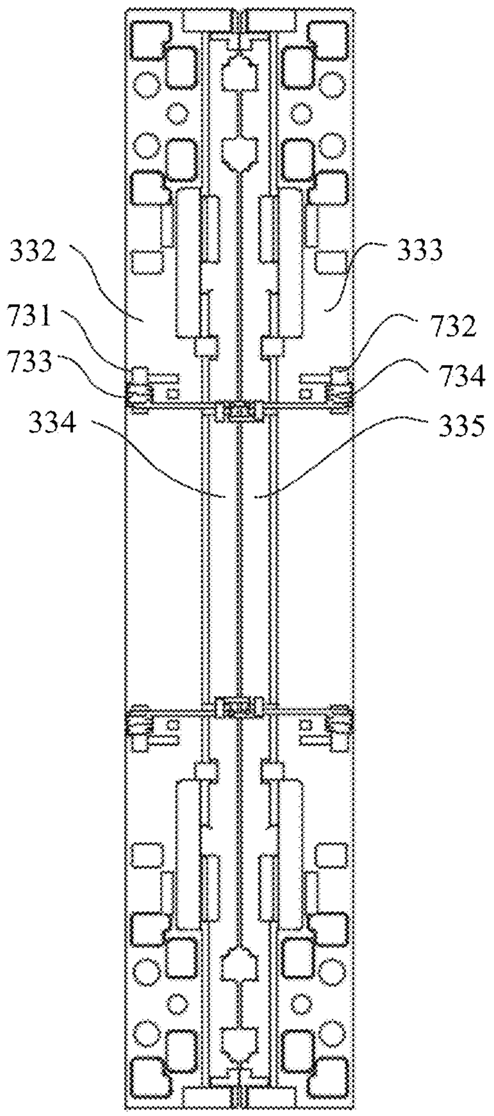
FIG. 25 is a schematic diagram in which a first support plate and a first secondary support plate of another hinge mechanism are connected by using a torsion spring according to an embodiment of this disclosure.
Figure 26:
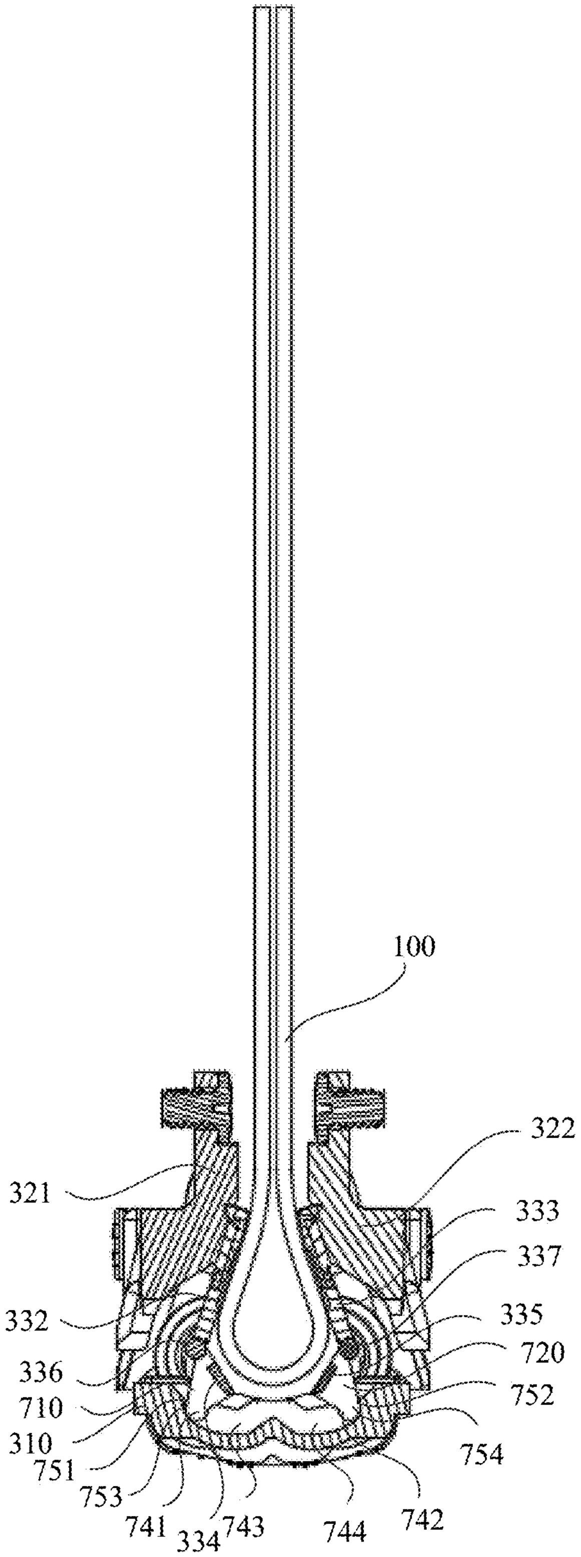
FIG. 26 is a cross-sectional diagram along a-a in FIG. 23.

FIG. 25 is a schematic diagram in which a first support plate and a first secondary support plate of another hinge mechanism are connected by using a torsion spring according to an embodiment of this disclosure. FIG. 26 is a cross-sectional diagram along a-a in FIG. 23.

As shown in FIG. 25 and FIG. 26, in some embodiments of this disclosure, the first constraint structure includes a first torsion spring 733. The first torsion spring 733 is disposed between the first secondary support plate 334 and the first support plate 332, and the first torsion spring 733 is configured to provide force for rotating the first secondary support plate 334 toward the first support part 371. When the hinge mechanism 300 is in an unfolded state, the first secondary support plate 334 presses against the first support part 371 under action force of the first torsion spring 733. The first constraint structure further includes a first limiting part 751 disposed on the main shaft assembly 310. When the hinge mechanism 300 is switched from the unfolded state to the folded state, the first limiting part 751 is configured to enable the first secondary support plate 334 to rotate relative to the first support plate 332 in a direction away from the first support part 371. In this way, a moving track of an end that is of the first secondary support plate 334 and that is away from the first support plate 332 may be constrained by using the first torsion spring 733, so that a risk that the first secondary support plate 334 shakes randomly relative to the main shaft assembly 310 and the first support plate 332 can be reduced.

It may be understood that, the first torsion spring 733 always provides the first secondary support plate 334 with force for rotating toward the first support part 371. In a process in which the hinge mechanism 300 is switched from the unfolded state to the folded state, the first secondary support plate 334 first rotates when driven by the first support plate 332. After rotating to the first limiting part 751, the first secondary support plate 334 presses against the first limiting part 751, and the first support plate 332 continues rotating. The first limiting part 751 enables the first secondary support plate 334 to rotate relative to the first support plate 332 in a direction away from the first support part 371, and the first secondary support plate 334 presses against a position at which the first limiting part 751 is located, so that a surface that is of the first secondary support plate 334 and that is used to support the flexible display 100 is at an obtuse angle with the main shaft assembly 310. The first support plate 332 continues to rotate to a position at which the surface used to support the flexible display 100 is at an acute angle with the main shaft assembly 310, to further tighten the first torsion spring 733. A torque of the first torsion spring 733 generated when the hinge mechanism 300 is in the unfolded state is less than a torque of the first torsion spring 733 generated when the hinge mechanism 300 is in the folded state.

It should be noted that a first pressing part 753 corresponding to the first limiting part 751 is disposed on the first secondary support plate 334. When the first secondary support plate 334 is driven by the first support plate 332 to rotate to the first limiting part 751, the first pressing part 753 presses against the first limiting part 751. One or more first torsion springs 733 may be disposed between the first support plate 332 and the first secondary support plate 334. A first mounting post 731 for mounting the first torsion spring 733 may be disposed on the first support plate 332. The first torsion spring 733 is sleeved on the first mounting post 731, and two ends of the first torsion spring 733 are respectively connected to the first support plate 332 and the first secondary support plate 334 by using a fastening structure.

In some embodiments of this disclosure, the second constraint structure includes a second torsion spring 734. The second torsion spring 734 is disposed between the second secondary support plate 335 and the second support plate 333, and the second torsion spring 734 is configured to provide force for rotating the second secondary support plate 335 toward the second support part 372. When the hinge mechanism 300 is in the unfolded state, the second secondary support plate 335 presses against the second support part 372 under action force of the second torsion spring 734. The second constraint structure further includes a second limiting part 752 disposed on the main shaft assembly 310. When the hinge mechanism 300 is switched from the unfolded state to the folded state, the second limiting part 752 is configured to enable the second secondary support plate 335 to rotate relative to the second support plate 333 in a direction away from the second support part 372. In this way, a moving track of an end that is of the second secondary support plate 335 and that is away from the second support plate 333 may be constrained by using the second torsion spring 734, so that a risk that the second secondary support plate 335 shakes randomly relative to the main shaft assembly 310 and the second support plate 333 can be reduced.

It may be understood that, the second torsion spring 734 always provides the second secondary support plate 335 with force for rotating toward the second support part 372. In a process in which the hinge mechanism 300 is switched from the unfolded state to the folded state, the second secondary support plate 335 first rotates when driven by the second support plate 333. After rotating to the second limiting part 752, the second secondary support plate 335 presses against the second limiting part 752, and the second support plate 333 continues rotating. The second limiting part 752 enables the second secondary support plate 335 to rotate relative to the second support plate 333 in a direction away from the second support part 372, and the second secondary support plate 335 presses against a position at which the second limiting part 752 is located, so that a surface that is of the second secondary support plate 335 and that is used to support the flexible display 100 is at an obtuse angle with the main shaft assembly 310. The second support plate 333 continues to rotate to a position at which the surface used to support the flexible display 100 is at an acute angle with the main shaft assembly 310, to further tighten the second torsion spring 734. A torque of the second torsion spring 734 generated when the hinge mechanism 300 is in the unfolded state is less than a torque of the second torsion spring 734 generated when the hinge mechanism 300 is in the folded state.

It should be noted that a second pressing part 754 corresponding to the second limiting part 752 is disposed on the second secondary support plate 335. When the second secondary support plate 335 is driven by the second support plate 333 to rotate to the second limiting part 752, the second pressing part 754 presses against the second limiting part 752. One or more second torsion springs 734 may be disposed between the second support plate 333 and the second secondary support plate 335. A second mounting post 732 for mounting the second torsion spring 734 may be disposed on the second support plate 333. The second torsion spring 734 is sleeved on the second mounting post 732, and two ends of the second torsion spring 734 are respectively connected to the second support plate 333 and the second secondary support plate 335 by using a fastening structure.

Figure 27:
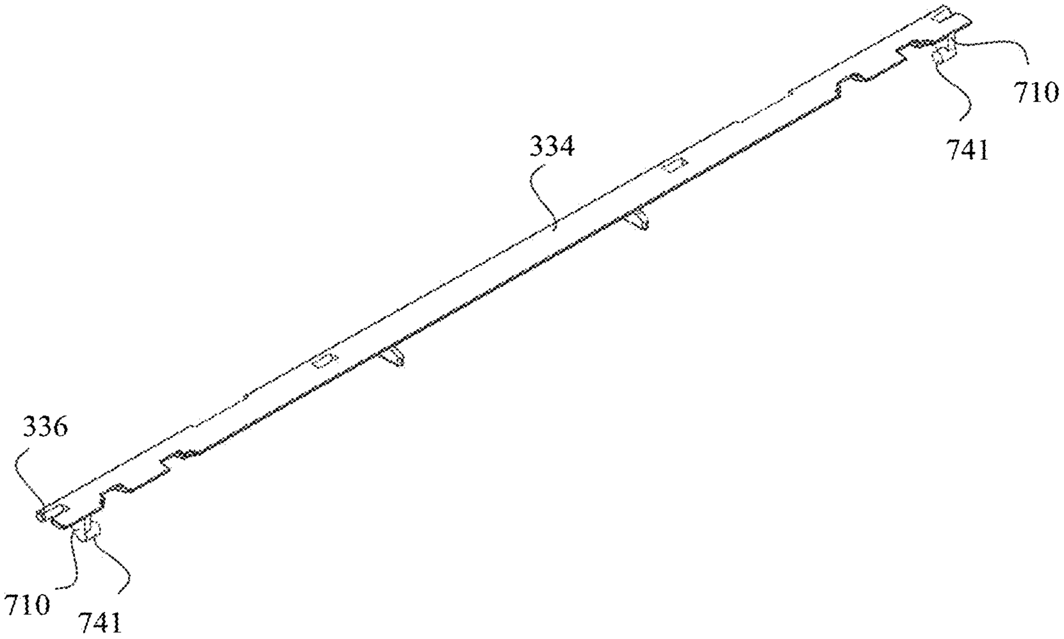
FIG. 27 is a schematic diagram of a first secondary support plate of another hinge mechanism according to an embodiment of this disclosure.
Figure 28:
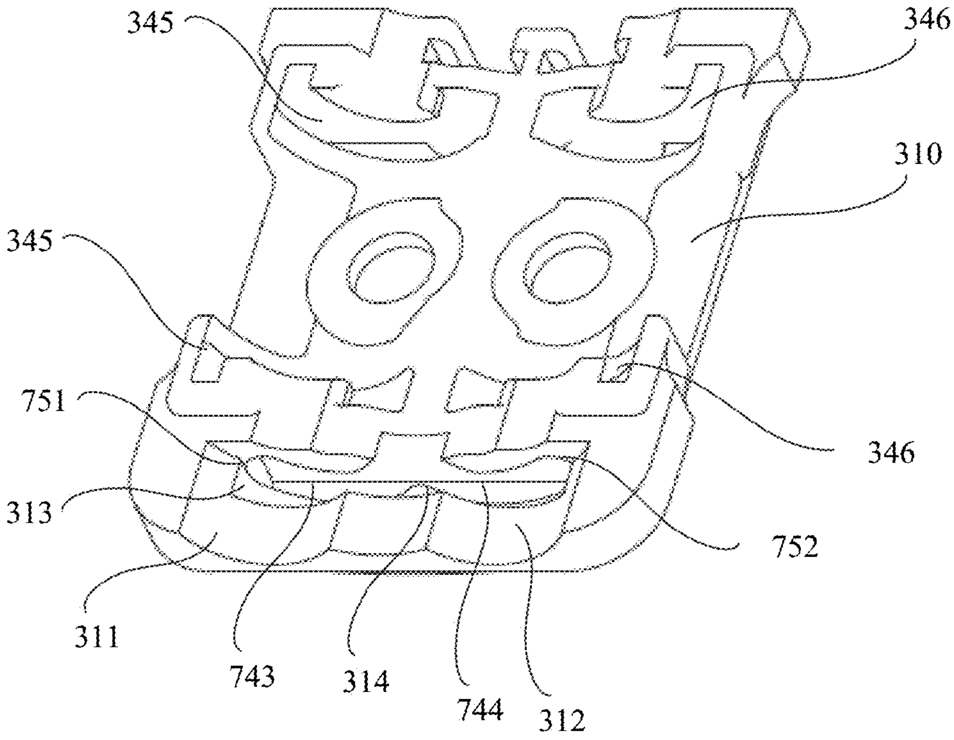
FIG. 28 is a schematic diagram of a main shaft assembly of another hinge mechanism according to an embodiment of this disclosure from an angle of view.
Figure 29:
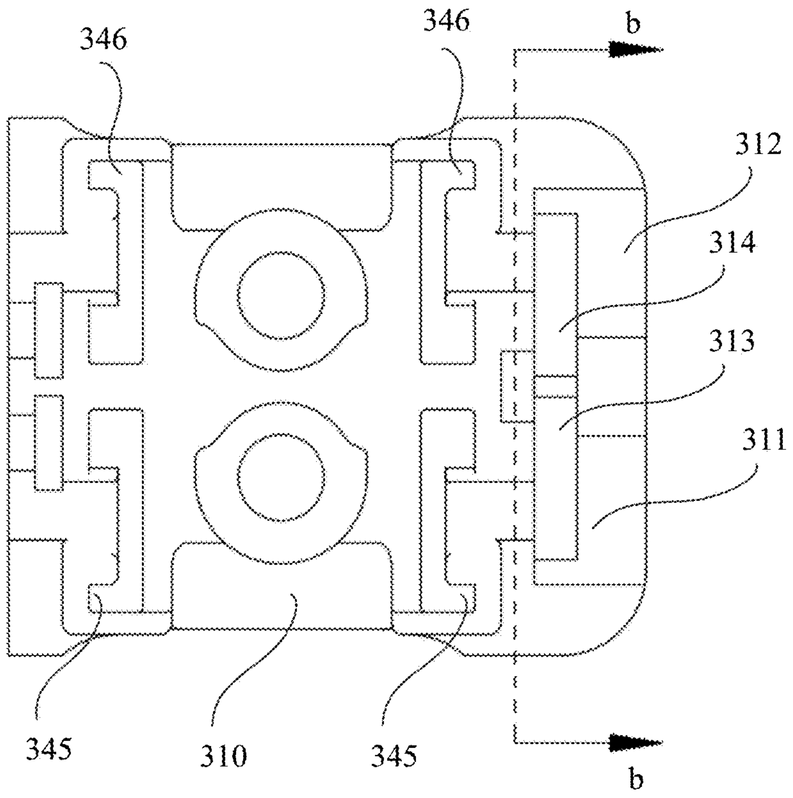
FIG. 29 is a schematic diagram of a main shaft assembly of another hinge mechanism according to an embodiment of this disclosure from another angle of view.
Figure 30:
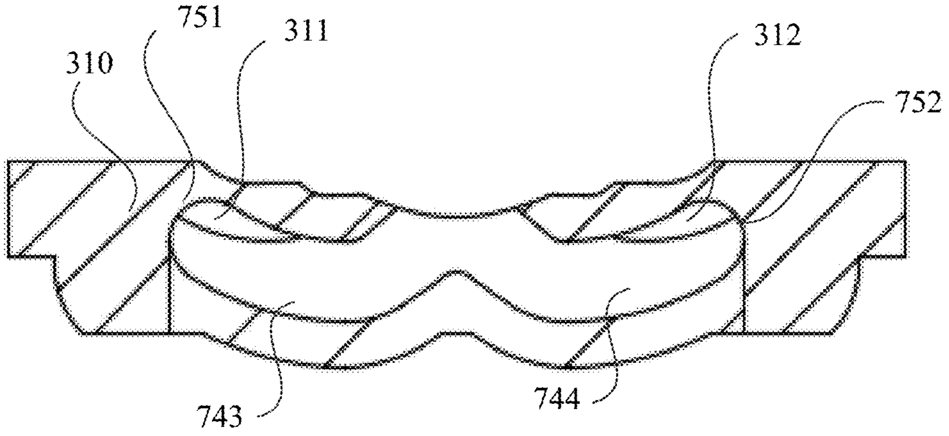
FIG. 30 is a cross-sectional diagram along b-b in FIG. 29.

FIG. 27 is a schematic diagram of a first secondary support plate of another hinge mechanism according to an embodiment of this disclosure. FIG. 28 is a schematic diagram of a main shaft assembly of another hinge mechanism according to an embodiment of this disclosure. FIG. 28 is a schematic diagram of a main shaft assembly of another hinge mechanism according to an embodiment of this disclosure from an angle of view. FIG. 29 is a schematic diagram of a main shaft assembly of another hinge mechanism according to an embodiment of this disclosure from another angle of view. FIG. 30 is a cross-sectional diagram along b-b in FIG. 29.

As shown in FIG. 27 to FIG. 30, and FIG. 26, in some embodiments of this disclosure, the first constraint structure includes a first sliding shaft 741 disposed at an end that is of the first secondary support plate 334 and that is away from the first support plate 332 and a first track slot 743 disposed on the main shaft assembly 310. The first sliding shaft 741 is oriented in the axial direction of the main shaft assembly 310, and the first sliding shaft 741 extends into the first track slot 743 and slidably fits the first track slot 743. In addition, the first sliding shaft 741 is capable of rotating in the first track slot 743. In this way, in a process in which the first sliding shaft 741 moves relative to the main shaft assembly 310, a moving track of the end that is of the first secondary support plate 334 and that is away from the first support plate 332 may be constrained in a manner in which a slot wall of the first track slot 743 presses against the first sliding shaft 741, so that the first secondary support plate 334 moves based on a preset moving track. This can reduce a risk that the first secondary support plate 334 randomly shakes relative to the main shaft assembly 310 and the first support plate 332.

It should be noted that, in a process in which the hinge mechanism 300 is switched to the folded state, the first support arm 323 drives the first support plate 332 to rotate in a folding direction. In a process of rotating in the folding direction, the first support plate 332 drives the first secondary support plate 334 to move in the folding direction. The first sliding shaft 741 presses against a slot wall on one side of the first track slot 743, so that the end that is of the first secondary support plate 334 and that is away from the first support plate 332 moves along the first track slot 743 in the folding direction, and the first secondary support plate 334 rotates around the first sliding shaft 741 in the folding direction. When a surface that is of the first support plate 332 and that is used to support the flexible display 100 rotates to have an acute angle with the main shaft assembly 310, a surface that is of the first secondary support plate 334 and that is used to support the flexible display 100 is driven to rotate to have an obtuse angle with the main shaft assembly 310. In a process in which the hinge mechanism 300 is switched to an unfolded state, the first support arm 323 drives the first support plate 332 to rotate in an unfolding direction. In a process of rotating in the unfolding direction, the first support plate 332 drives the first secondary support plate 334 to move in the unfolding direction. The first sliding shaft 741 presses against a slot wall on the other side of the first track slot 743, so that the end that is of the first secondary support plate 334 and that is away from the first support plate 332 moves along the first track slot 743 in the unfolding direction, and the first secondary support plate 334 rotates around the first sliding shaft 741 in the unfolding direction. When the surface that is of the first support plate 332 and that is used to support the flexible display 100 rotates to an unfolding position, the surface that is of the first secondary support plate 334 and that is used to support the flexible display 100 is driven to rotate to the unfolding position. In this case, the surface that is of the first support plate 332 and that is used to support the flexible display 100 and the surface that is of the first secondary support plate 334 and that is used to support the flexible display 100 are coplanar (where a slight deviation is allowed).

The first track slot 743 may be an arc-shaped slot, a linear slot, an irregular curved slot, or the like. During actual disclosure, a shape of the first track slot 743 may be adjusted based on a moving track of the corresponding first sliding shaft 741. For example, the first track slot 743 is an arc-shaped slot.

It may be understood that the first sliding shaft 741 may be disposed on the first secondary support plate 334, and the first track slot 743 may be provided on the main shaft assembly 310. Alternatively, the first track slot 743 may be provided on the first secondary support plate 334, and the first sliding shaft 741 may be disposed on the main shaft assembly 310. For example, the first sliding shaft 741 is disposed on the first secondary support plate 334, and the first track slot 743 is provided on the main shaft assembly 310.

When the first sliding shaft 741 is disposed on the first secondary support plate 334, the first sliding shaft 741 may be fastened to the first secondary support plate 334 by using a first extension arm 710 extending from a side that is of the first secondary support plate 334 and that backs on the flexible display 100, to form space between the first secondary support plate 334 and the main shaft assembly 310 for the first secondary support plate 334 to move. An end surface of the first sliding shaft 741 is fastened to a side wall of the first extension arm 710. A third avoidance groove 313 for the first extension arm 710 to move is provided on the main shaft assembly 310, and the first track slot 743 is provided on a groove wall that is of the third avoidance groove 313 and that is on a side in the axial direction of the main shaft assembly 310.

In some examples, the first support arm 323 is rotatably connected to the main shaft assembly 310 through two third arc-shaped sliding grooves 345 and two third arc-shaped arms 347 that are distributed at intervals in the axial direction of the main shaft assembly 310. The first track slot 743 is located between the third arc-shaped sliding groove 345 close to the first avoidance groove 311 and the third avoidance groove 313.

In some embodiments of this disclosure, the second constraint structure includes a second sliding shaft 742 disposed at an end that is of the second secondary support plate 335 and that is away from the second support plate 333, and a second track slot 744 disposed on the main shaft assembly 310. The second sliding shaft 742 is oriented in the axial direction of the main shaft assembly 310, and the second sliding shaft 742 extends into the second track slot 744 and slidably fits the second track slot 744. In addition, the second sliding shaft 742 is capable of rotating in the second track slot 744. In this way, in a process in which the second sliding shaft 742 moves relative to the main shaft assembly 310, a moving track of the end that is of the second secondary support plate 335 and that is away from the second support plate 333 may be constrained in a manner in which a slot wall of the second track slot 744 presses against the second sliding shaft 742, so that the second secondary support plate 335 moves based on a preset moving track. This can reduce a risk that the second secondary support plate 335 randomly shakes relative to the main shaft assembly 310 and the second support plate 333.

It should be noted that, in a process in which the hinge mechanism 300 is switched to the folded state, the second support arm 324 drives the second support plate 333 to rotate in a folding direction. In a process of rotating in the folding direction, the second support plate 333 drives the second secondary support plate 335 to move in the folding direction. The second sliding shaft 742 presses against a slot wall on one side of the second track slot 744, so that the end that is of the second secondary support plate 335 and that is away from the second support plate 333 moves along the second track slot 744 in the folding direction, and the second secondary support plate 335 rotates around the second sliding shaft 742 in the folding direction. When a surface that is of the second support plate 333 and that is used to support the flexible display 100 rotates to have an acute angle with the main shaft assembly 310, a surface that is of the second secondary support plate 335 and that is used to support the flexible display 100 is driven to rotate to have an obtuse angle with the main shaft assembly 310. In a process in which the hinge mechanism 300 is switched to an unfolded state, the second support arm 324 drives the second support plate 333 to rotate in an unfolding direction. In a process of rotating in the unfolding direction, the second support plate 333 drives the second secondary support plate 335 to move in the unfolding direction. The second sliding shaft 742 presses against a slot wall on the other side of the second track slot 744, so that the end that is of the second secondary support plate 335 and that is away from the second support plate 333 moves along the second track slot 744 in the unfolding direction, and the second secondary support plate 335 rotates around the second sliding shaft 742 in the unfolding direction. When the surface that is of the second support plate 333 and that is used to support the flexible display 100 rotates to an unfolding position, the surface that is of the second secondary support plate 335 and that is used to support the flexible display 100 is driven to rotate to the unfolding position. In this case, the surface that is of the second support plate 333 and that is used to support the flexible display 100 and the surface that is of the second secondary support plate 335 and that is used to support the flexible display 100 are coplanar (where a slight deviation is allowed).

The second track slot 744 may be an arc-shaped slot, a linear slot, an irregular curved slot, or the like. During actual disclosure, a shape of the second track slot 744 may be adjusted based on a moving track of the corresponding second sliding shaft 742. For example, the second track slot 744 is an arc-shaped slot.

It may be understood that the second sliding shaft 742 may be disposed on the second secondary support plate 335, and the second track slot 744 may be provided on the main shaft assembly 310. Alternatively, the second track slot 744 may be provided on the second secondary support plate 335, and the second sliding shaft 742 may be disposed on the main shaft assembly 310. For example, the second sliding shaft 742 is disposed on the second secondary support plate 335, and the second track slot 744 is provided on the main shaft assembly 310.

When the second sliding shaft 742 is disposed on the second secondary support plate 335, the second sliding shaft 742 may be fastened to the second secondary support plate 335 by using a second extension arm 720 extending from a side that is of the second secondary support plate 335 and that backs on the flexible display 100, to form space between the second secondary support plate 335 and the main shaft assembly 310 for the second secondary support plate 335 to move. An end surface of the second sliding shaft 742 is fastened to a side wall of the second extension arm 720. A fourth avoidance groove 314 for the second extension arm 720 to move is provided on the main shaft assembly 310, and the second track slot 744 is provided on a groove wall that is of the fourth avoidance groove 314 and that is on a side in the axial direction of the main shaft assembly 310.

In some examples, the second support arm 324 is rotatably connected to the main shaft assembly 310 through two fourth arc-shaped sliding grooves 346 and two fourth arc-shaped arms 348 that are distributed at intervals in the axial direction of the main shaft assembly 310. The second track slot 744 is located between the fourth arc-shaped sliding groove 346 close to the second avoidance groove 312 and the fourth avoidance groove 314.

In some embodiments of this disclosure, the first track slot 743 is provided on the main shaft assembly 310, an end that is of the first track slot 743 and that is close to the central axis of the main shaft assembly 310 is open, and an end that is of the first track slot 743 and that is away from the central axis of the main shaft assembly 310 is sealed. The end that is of the first track slot 743 and that is close to the central axis of the main shaft assembly 310 is used for the first sliding shaft 741 to enter and exit. In this way, it is convenient to assemble the first sliding shaft 741 into the first track slot 743.

In some embodiments of this disclosure, the second track slot 744 is provided on the main shaft assembly 310, an end that is of the second track slot 744 and that is close to the central axis of the main shaft assembly 310 is open, and an end that is of the second track slot 744 and that is away from the central axis of the main shaft assembly 310 is sealed. The end that is of the second track slot 744 and that is close to the central axis of the main shaft assembly 310 is used for the second sliding shaft 742 to enter and exit. In this way, it is convenient to assemble the first sliding shaft 741 into the first track slot 743.

In some examples, the first sliding shaft 741 and the second sliding shaft 742 are symmetrically disposed relative to the central axis of the main shaft assembly 310. Correspondingly, the first track slot 743 and the second track slot 744 are symmetrically provided relative to the central axis of the main shaft assembly 310. The end that is of the first track slot 743 and that is close to the central axis of the main shaft assembly 310 communicates with the end that is of the second track slot 744 and that is close to the central axis of the main shaft assembly 310. In this way, the end that is of the first track slot 743 and that is close to the main shaft assembly 310 and the end that is of the second track slot 744 and that is close to the central axis of the main shaft assembly 310 may at least partially overlap. The first track slot 743 and the second track slot 744 share one opening, and the first sliding shaft 741 and the second sliding shaft 742 may be separately mounted in the first track slot 743 and the second track slot 744 by using the same opening. This reduces a size of the main shaft assembly 310.

In some embodiments of this disclosure, when the hinge mechanism 300 is in the folded state, the first sliding shaft 741 presses against the end that is of the first track slot 743 and that is away from the central axis of the main shaft assembly 310, to limit an angle at which the first secondary support plate 334 rotates. In this way, the first sliding shaft 741 is used as the first pressing part 753, and the end that is of the first track slot 743 and that is away from the central axis of the main shaft assembly 310 is used as the first limiting part 751. An end part of the first track slot 743 may press against the first sliding shaft 741, to limit a moving position of the end that is of the first secondary support plate 334 and that is away from the first support plate 332 in a folding process of the hinge mechanism 300. The first limiting part 751 and the first pressing part 753 do not need to be separately disposed, so that a structure of the main shaft assembly 310 is simple, and a size of the main shaft assembly 310 is reduced.

It may be understood that the first constraint structure may include the first torsion spring 733, but does not include the first sliding shaft 741 and the first track slot 743, or include the first sliding shaft 741 and the first track slot 743, but does not include the first torsion spring 733, or may include the first torsion spring 733, and further include the first sliding shaft 741 and the first track slot 743. The first torsion spring 733, the first sliding shaft 741, and the first track slot 743 may all constrain a moving track of the end that is of the first secondary support plate 334 and that is away from the first support plate 332. When the first constraint structure includes the first torsion spring 733, and further includes the first sliding shaft 741 and the first track slot 743, constraint effect on the first secondary support plate 334 is good, an angle tolerance of the first secondary support plate 334 is small, and a position of the first secondary support plate 334 is stable. This helps protect the flexible display 100.

When the first constraint structure includes the first torsion spring 733, but does not include the first sliding shaft 741 and the first track slot 743, the first extension arm 710 may be disposed on the first secondary support plate 334, and the third avoidance groove 313 may be provided on the main shaft assembly 310. In this case, the first extension arm 710 is used as the first pressing part 753, a groove wall that is of the third avoidance groove 313, that is in a direction perpendicular to the axial direction of the main shaft assembly 310, and that is away from the central axis of the main shaft assembly 310 may be used as the first limiting part 751. The first extension arm 710 may be configured to press against the groove wall of the third avoidance groove 313, so that the first secondary support plate 334 rotates relative to the first support plate 332 in a direction away from the first support part 371.

In some embodiments of this disclosure, when the hinge mechanism 300 is in the folded state, the second sliding shaft 742 presses against the end that is of the second track slot 744 and that is away from the central axis of the main shaft assembly 310, to limit an angle at which the second secondary support plate 335 rotates. In this way, the second sliding shaft 742 is used as the second pressing part 754, and the end that is of the second track slot 744 and that is away from the central axis of the main shaft assembly 310 is used as the second limiting part 752. An end part of the second track slot 744 may press against the second sliding shaft 742, to limit a moving position of the end that is of the second secondary support plate 335 and that is away from the second support plate 333 in a folding process of the hinge mechanism 300. The second limiting part 752 and the second pressing part 754 do not need to be separately disposed, so that a structure of the main shaft assembly 310 is simple, and a size of the main shaft assembly 310 is reduced.

It may be understood that the second constraint structure may include the second torsion spring 734, but does not include the second sliding shaft 742 or the second track slot 744, or include the second sliding shaft 742 and the second track slot 744, but does not include the second torsion spring 734, or may include the second torsion spring 734, and further include the second sliding shaft 742 and the second track slot 744. The second torsion spring 734, the second sliding shaft 742, and the second track slot 744 may all constrain a moving track of the end that is of the second secondary support plate 335 and that is away from the second support plate 333. When the second constraint structure includes the second torsion spring 734, and further includes the second sliding shaft 742 and the second track slot 744, constraint effect on the second secondary support plate 335 is good, an angle tolerance of the second secondary support plate 335 is small, and a position of the second secondary support plate 335 is stable. This helps protect the flexible display 100.

When the second constraint structure includes the second torsion spring 734, but does not include the second sliding shaft 742 or the second track slot 744, the second extension arm 720 may be disposed on the second secondary support plate 335, and the fourth avoidance groove 314 may be provided on the main shaft assembly 310. In this case, the second extension arm 720 is used as the second pressing part 754, a groove wall that is of the fourth avoidance groove 314, that is in a direction perpendicular to the axial direction of the main shaft assembly 310, and that is away from the central axis of the main shaft assembly 310 may be used as the second limiting part 752. The second extension arm 720 may be configured to press against the groove wall of the fourth avoidance groove 314, so that the second secondary support plate 335 rotates relative to the second support plate 333 in a direction away from the second support part 372.

As shown in FIG. 18 and FIG. 27, in some embodiments of this disclosure, an end that is of the first support plate 332 and that faces the main shaft assembly 310 is rotatably connected to the first secondary support plate 334 by using a first elastic snap-fit 375 and a first pin shaft 336 that is snap-fitted into the first elastic snap-fit 375 and that rotatably fits the first elastic snap-fit 375. The first elastic snap-fit 375 and the first pin shaft 336 are disposed on the end that is of the first support plate 332 and that faces the main shaft assembly 310, and the first secondary support plate 334. In this way, the first support plate 332 with a small thickness is rotatably connected to the first secondary support plate 334, and assembly between the first support plate 332 and the first secondary support plate 334 is convenient.

It may be understood that the first elastic snap-fit 375 may be disposed on the first support plate 332, and the first pin shaft 336 may be disposed on the first secondary support plate 334. Alternatively, the first pin shaft 336 may be disposed on the first support plate 332, and the first elastic snap-fit 375 may be disposed on the first secondary support plate 334.

In some examples, a first groove for mounting the first pin shaft 336 and rotating the first pin shaft 336 is provided on a side surface that is of the first arc-shaped lap joint part 373 and that is away from the first avoidance groove 311. The first elastic snap-fit 375 is disposed on the first arc-shaped lap joint part 373, and is configured to limit the first pin shaft 336 to rotate in the first groove. A part between the first elastic snap-fit 375 and an end that is of the first arc-shaped lap joint part 373 and that is close to the main shaft assembly 310 may be used as the first support part 371. In this way, strength of a joint at which the first pin shaft 336 is rotatably connected can be improved, and a structure of the first support plate 332 can be simple.

In some embodiments of this disclosure, an end that is of the second support plate 333 and that faces the main shaft assembly 310 is rotatably connected to the second secondary support plate 335 by using a second elastic snap-fit 376 and a second pin shaft 337 that is snap-fitted into the second elastic snap-fit 376 and that rotatably fits the second elastic snap-fit 376. The second elastic snap-fit 376 and the second pin shaft 337 are disposed on the end that is of the second support plate 333 and that faces the main shaft assembly 310, and the second secondary support plate 335. In this way, the second support plate 333 with a small thickness is rotatably connected to the second secondary support plate 335, and assembly between the second support plate 333 and the second secondary support plate 335 is convenient.

It may be understood that the second elastic snap-fit 376 may be disposed on the second support plate 333, and the second pin shaft 337 may be disposed on the second secondary support plate 335. Alternatively, the second pin shaft 337 may be disposed on the second support plate 333, and the second elastic snap-fit 376 may be disposed on the second secondary support plate 335.

In some examples, a second groove for mounting the second pin shaft 337 and rotating the second pin shaft 337 is provided on a side surface that is of the second arc-shaped lap joint part 374 and that is away from the second avoidance groove 312. The second elastic snap-fit 376 is disposed on the second arc-shaped lap joint part 374, and is configured to limit the second pin shaft 337 to rotate in the second groove. A part between the second elastic snap-fit 376 and an end that is of the second arc-shaped lap joint part 374 and that is close to the main shaft assembly 310 may be used as the second support part 372. In this way, strength of a joint at which the second pin shaft 337 is rotatably connected can be improved, and a structure of the second support plate 333 can be simple.

In some embodiments of this disclosure, the first secondary support plate may be of a multi-segment structure. The first secondary support plate 334 includes a plurality of third sub-boards. The plurality of third sub-boards of the first secondary support plate 334 is sequentially assembled and fastened in the axial direction of the main shaft assembly 310. Each third sub-board is configured to support the flexible display 100, and an end of at least one third sub-board is rotatably connected to the end that is of the first support plate 332 and that faces the main shaft assembly 310. In this way, the narrow and long first secondary support plate 334 is easy to manufacture. This helps reduce manufacturing costs.

In an example, in some examples, the first secondary support plate 334 may alternatively be of an integrated structure. In this way, an assembly error caused when the plurality of third sub-boards is assembled can be reduced.

In some embodiments of this disclosure, the second secondary support plate may be of a multi-segment structure. The second secondary support plate 335 includes a plurality of fourth sub-boards. The plurality of fourth sub-boards of the second secondary support plate 335 is sequentially assembled and fastened in the axial direction of the main shaft assembly 310. Each fourth sub-board is configured to support the flexible display 100, and an end of at least one fourth sub-board is rotatably connected to the end that is of the second support plate 333 and that faces the main shaft assembly 310. In this way, the narrow and long second secondary support plate 335 is easy to manufacture. This helps reduce manufacturing costs.

In an example, in some examples, the second secondary support plate 335 may alternatively be of an integrated structure. In this way, an assembly error caused when the plurality of fourth sub-boards is assembled can be reduced.

Figure 31:
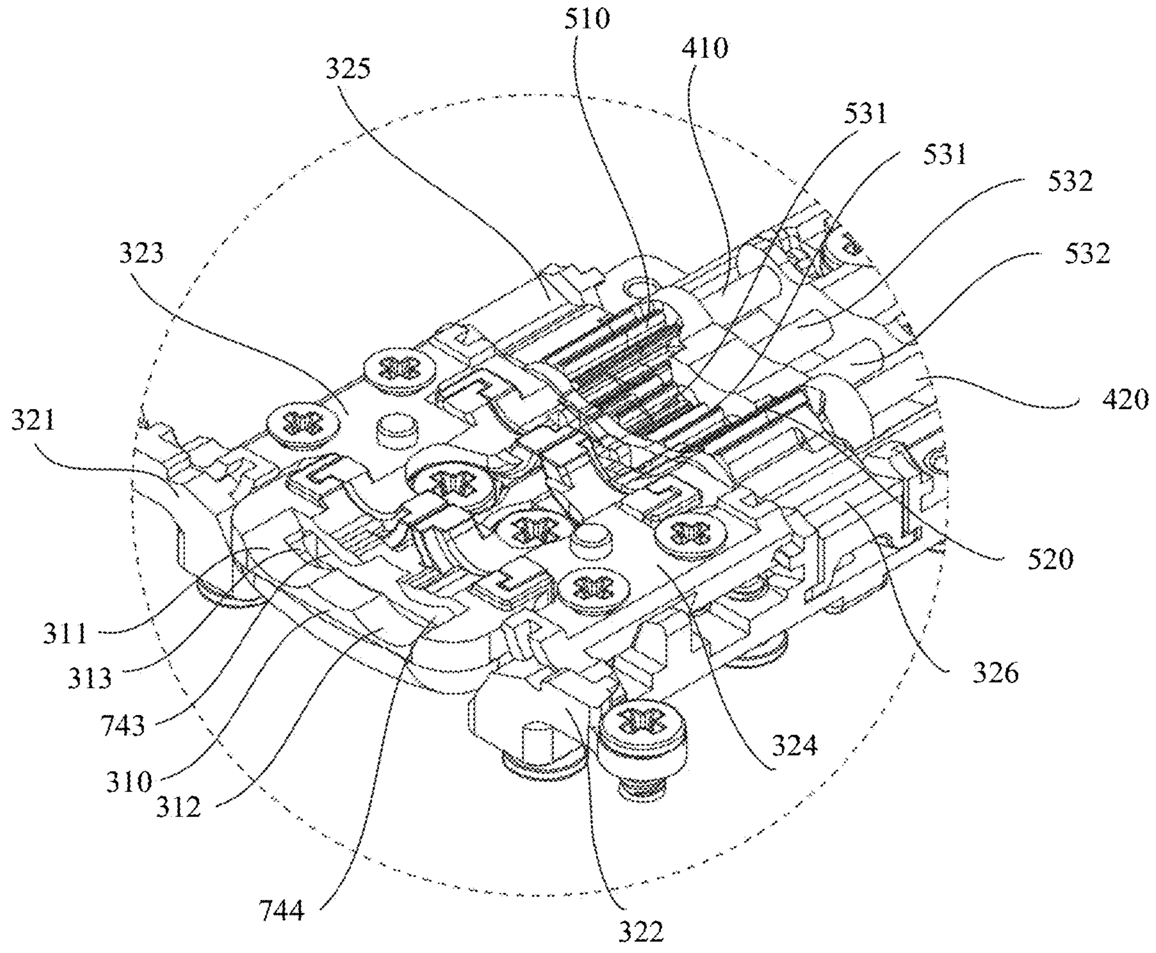
FIG. 31 is a schematic diagram of a joint between a main shaft assembly and a foldable assembly when another hinge mechanism is in an unfolded state according to an embodiment of this disclosure.
Figure 32:
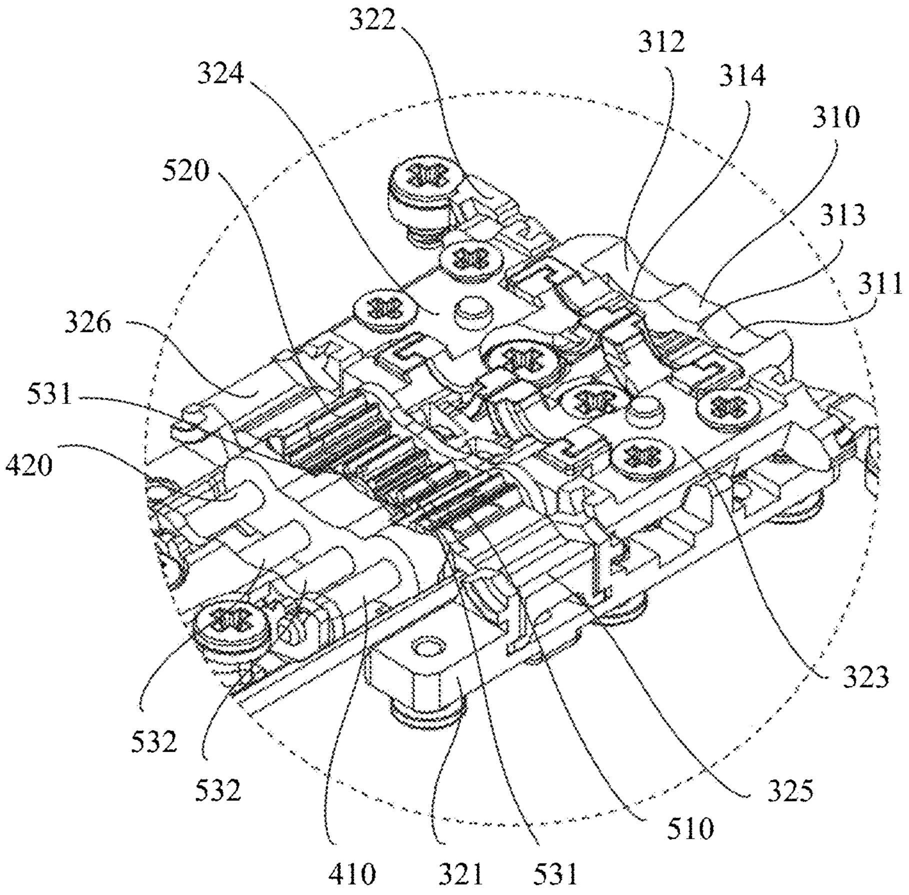
FIG. 32 is another schematic diagram of a joint between a main shaft assembly and a foldable assembly when another hinge mechanism is in an unfolded state according to an embodiment of this disclosure.
Figure 33:
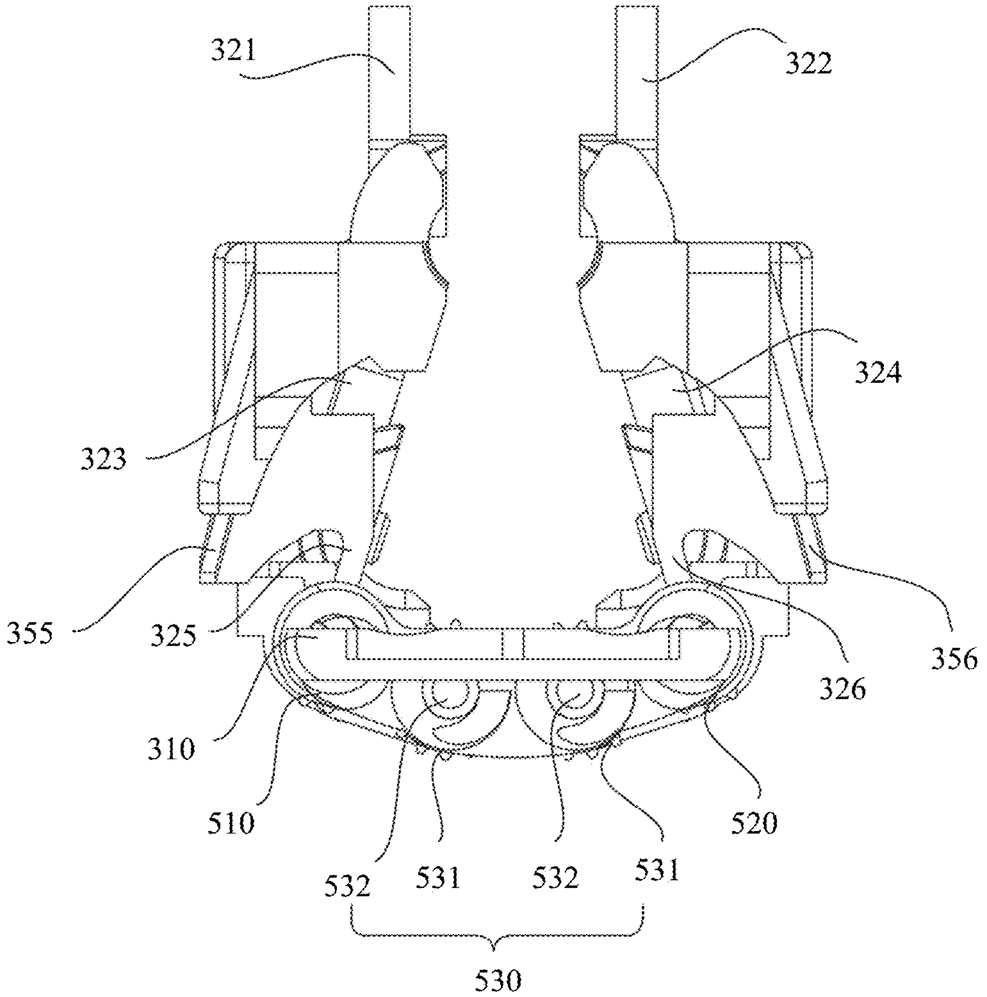
FIG. 33 is a schematic diagram in which a support assembly is removed when another hinge mechanism is in a folded state according to an embodiment of this disclosure.

FIG. 31 is a schematic diagram of a joint between a main shaft assembly and a foldable assembly when another hinge mechanism is in an unfolded state according to an embodiment of this disclosure. FIG. 32 is another schematic diagram of a joint between a main shaft assembly and a foldable assembly when another hinge mechanism is in an unfolded state according to an embodiment of this disclosure. FIG. 33 is a schematic diagram in which a support assembly is removed when another hinge mechanism is in a folded state according to an embodiment of this disclosure.

As shown in FIG. 31 to FIG. 33, and FIG. 5, the foldable assembly 320 further includes a synchronization structure, so that parts that are of the foldable assembly 320 and that are on two sides of the main shaft assembly 310 can synchronously move in a process in which the hinge mechanism 300 is switched between the folded state and the unfolded state. In embodiments of this disclosure, the synchronization structure is used to enable the parts that are of the foldable assembly 320 and that are on two sides of the main shaft assembly 310 to synchronously move.

For example, an end part of the first guide rod arm 325 is rotatably connected to the main shaft assembly 310 by using the first connecting shaft 410. An end part of the second guide rod arm 326 is rotatably connected to the main shaft assembly 310 by using the second connecting shaft 420. The synchronization structure includes a first gear 510 disposed at an end part at which the first guide rod arm 325 is connected to the first connecting shaft 410 and a second gear 520 disposed at an end part at which the second guide rod arm 326 is connected to the second connecting shaft 420. A rotation axis of the first gear 510 is coaxial to the first connecting shaft 410, a rotation axis of the second gear 520 is coaxial to the second connecting shaft 420, and the first gear 510 is connected to the second gear 520.

In some examples, the synchronization structure further includes a force transfer gear group 530 disposed between the first gear 510 and the second gear 520. The force transfer gear group 530 includes an even number of force transfer gears 531 that are sequentially engaged. The force transfer gear 531 close to the first gear 510 is engaged with the first gear 510, and the force transfer gear 531 close to the second gear 520 is engaged with the second gear 520.

It should be noted that each force transfer gear 531 may be rotatably connected to the main shaft assembly 310 by using a gear connecting shaft 532 that is parallel to the axial direction of the main shaft assembly 310. The gear connecting shaft 532 may be rotatably connected to the main shaft assembly 310. The force transfer gear 531 may be connected to the corresponding gear connecting shaft 532 by using a structure like a surface or a spline. The force transfer gear 531 and the corresponding gear connecting shaft 532 may alternatively be in interference fit or integrally formed. The gear connecting shaft 532 may alternatively be fastened to the main shaft assembly 310, and the force transfer gear 531 is rotatably connected to the corresponding gear connecting shaft 532.

It may be understood that the gear connecting shaft 532 is between the first connecting shaft 410 and the second connecting shaft 420. In this way, sizes of the first gear 510 and the second gear 520 can be reduced. This helps reduce a thickness of the hinge mechanism 300.

It may be understood that when there are a plurality of connecting frame groups, guide rod arm groups, and support arm groups, one or more groups of synchronization structures may be disposed. A quantity of synchronization structures may be the same as or different from a quantity of guide rod arm groups. In some examples, the synchronization structure is in a one-to-one correspondence with the guide rod arm group.

Figure 34:
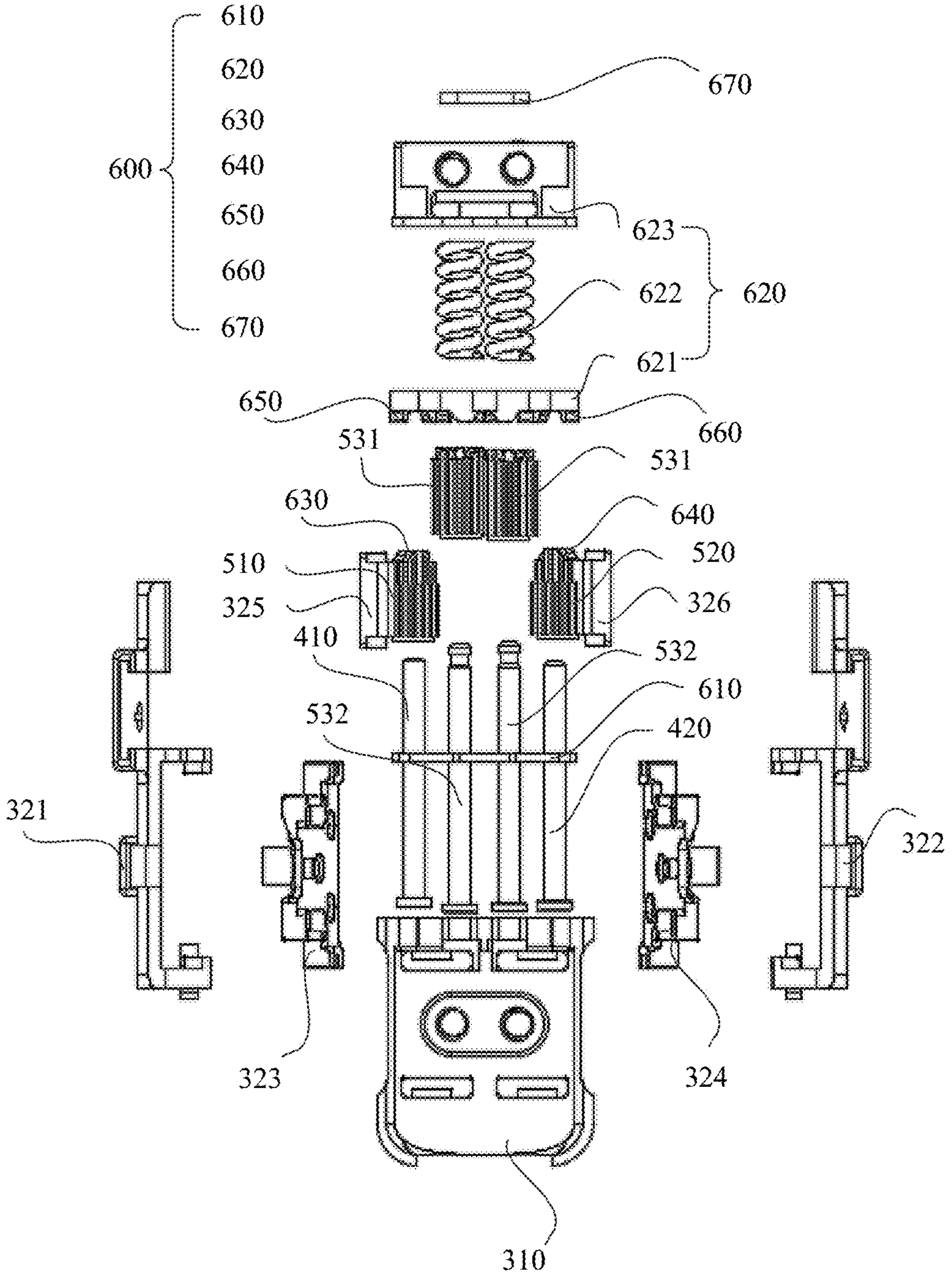
FIG. 34 is an exploded diagram of another hinge mechanism according to an embodiment of this disclosure.

FIG. 34 is an exploded diagram of another hinge mechanism according to an embodiment of this disclosure.

As shown in FIG. 34 and FIG. 5, the hinge mechanism 300 has damping effect or a self-hovering capability in an unfolded state, a folded state, and a process of being switched between the two states. In some embodiments of this disclosure, the hinge mechanism 300 further includes a damping assembly 600. The damping assembly 600 is configured to provide the foldable assembly 320 with damping force for preventing the foldable assembly 320 from rotating.

In some examples, the damping assembly 600 includes a fastening base 610 and an elastic pressing assembly 620 that are respectively disposed at two ends, in the axial direction of the main shaft assembly 310, of the guide rod arm group. A first cam 630 is disposed at an end that is of the first gear 510 at an end part of the first guide rod arm 325 and that faces the elastic pressing assembly 620, a second cam 640 is disposed at an end that is of the second gear 520 at an end part of the second guide rod arm 326 and that faces the elastic pressing assembly 620, and a third cam 650 corresponding to the first cam 630 and a fourth cam 660 corresponding to the second cam 640 are disposed at an end that is of the elastic pressing assembly 620 and that faces the first guide rod arm 325 and at an end that is of the elastic pressing assembly 620 and that faces the second guide rod arm 326. The elastic pressing assembly 620 is configured to press the third cam 650 on an end surface, on which the first cam 630 is disposed, of the first gear 510, and press the fourth cam 660 on an end surface, on which the second cam 640 is disposed, of the second gear 520. In addition, the first gear 510 and the second gear 520 are pressed tightly with the fastening base 610, protrusions and recesses that of the first cam 630 and the third cam 650 and that are engaged with each other press against each other, and protrusions and recesses that are of the second cam 640 and the fourth cam 660 and that are engaged with each other press against each other, to provide damping force for preventing the first gear 510 and the second gear 520 from rotating.

It should be noted that a surface on which the protrusions and the recesses that are of the first cam 630 and the third cam 650 and that are engaged with each other press against each other to provide the damping force for preventing the first gear 510 from rotating is an inclined surface. When the first gear 510 rotates under external force, the protrusions of the first cam 630 and the third cam 650 may slide out from the recesses, so that the third cam 650 may move along an axis of the main shaft assembly 310, and the first gear 510 and the first guide rod arm 325 are kept in a current state after external force is removed. It should be noted that a surface on which the protrusions and the recesses that are of the second cam 640 and the fourth cam 660 and that are engaged with each other press against each other to provide the damping force for preventing the second gear 520 from rotating is an inclined surface. When the second gear 520 rotates under external force, the protrusions of the second cam 640 and the fourth cam 660 may slide out from the recesses, so that the fourth cam 660 may move along an axis of the main shaft assembly 310, and the second gear 520 and the second guide rod arm 326 are kept in a current state after external force is removed. In this way, when there is no external force, the foldable assembly 320 and the hinge mechanism 300 can be self-hovered.

It may be understood that when there is a plurality of connecting frame groups, guide rod arm groups, and support arm groups, one or more damping assemblies 600 may be disposed. A quantity of damping assemblies 600 may be the same as or different from a quantity of guide rod arm groups. In some examples, the damping assembly 600 is in a one-to-one correspondence with the guide rod arm group.

In some examples, the elastic pressing assembly 620 includes a pressure rod 621, a spring 622, and a fastening member 623. The third cam 650 and the fourth cam 660 are disposed on the pressure rod 621. Two ends of the spring 622 respectively press against the pressure rod 621 and the fastening member 623. The fastening member 623 is configured to be fixedly connected to the main shaft assembly 310. It should be noted that one end of each of the first connecting shaft 410, the second connecting shaft 420, and the gear connecting shaft 532 may be installed on the main shaft assembly 310 by using the fastening member 623, the spring 622 may be sleeved outside the gear connecting shaft 532, the pressure rod 621 may be slidably connected to the first connecting shaft 410, the second connecting shaft 420, and the gear connecting shaft 532, and the first connecting shaft 410, the second connecting shaft 420, and the gear connecting shaft 532 may be used as guide rods for sliding the pressure rod 621. A circlip 670 configured to limit the gear connecting shaft 532 to move in the axial direction of the main shaft assembly 310 may be further disposed on the fastening member 623, so that the gear connecting shaft 532 can be rotatably mounted on the fastening member 623.

In the description of embodiments of this disclosure, it should be noted that, unless otherwise explicitly stipulated and restricted, terms “installation”, “joint connection”, and “connection” should be understood broadly, which, for example, may be a fixed connection, or may be an indirect connection by using a medium, or may be an internal communication between two components, or may be an interactive relationship between two components. A person of ordinary skill in the art may understand specific meanings of the foregoing terms in embodiments of this disclosure based on specific cases.

In the specification, claims, and accompanying drawings of embodiments of this disclosure, the terms “first”, “second”, “third”, “fourth”, and so on (if existent) are intended to distinguish between similar objects but do not necessarily indicate a specific order or sequence.

The invention claimed is:

1. A hinge mechanism, comprising:

a main shaft assembly comprising a main shaft assembly first side and a main shaft assembly second side;

a support assembly comprising:

a first support plate located on the main shaft assembly first side and configured to support a flexible display, wherein the first support plate comprises a first support plate first end and a first support plate first surface, and wherein the first support plate first end is proximate to the main shaft assembly; and a second support plate located on the main shaft assembly second side and configured to support the flexible display, wherein the second support plate comprises a second support plate first end and a second support plate first surface, and wherein the second support plate first end is proximate to the main shaft assembly; and a foldable assembly configured to rotate relative to the main shaft assembly to cause the hinge mechanism to switch between an unfolded state and a folded state, wherein the foldable assembly comprises:

a guide rod arm group comprising:

a first guide rod arm rotatably connected to the main shaft assembly at the main shaft assembly first side, wherein the first guide rod arm is configured to rotate relative to the main shaft assembly along a first rotation axis, and wherein the first guide rod arm comprises:

a first guide rod arm first end rotatably connected to the main shaft assembly; and a first guide rod arm second end rotatably connected to the main shaft assembly; and a second guide rod arm disposed on the main shaft assembly second side, wherein the second guide rod arm is configured to rotate along a third rotation axis relative to the main shaft assembly, and wherein the second guide rod arm comprises:

a second guide rod arm first end rotatably connected to the main shaft assembly; and a second guide rod arm second end;

a support arm group comprising:

a first support arm disposed on the main shaft assembly first side, wherein the first support arm is configured to rotate along a second rotation axis relative to the main shaft assembly, wherein the first rotation axis is parallel to the second rotation axis, wherein the first support arm is on a same positional side as the first support plate and is fastened to the first support plate, and wherein the first support arm comprises:

a first support arm first end rotatably connected to the main shaft assembly; and a first support arm second end comprising:

a first arc-shaped sliding groove disposed on the first support arm; and a first arc-shaped arm that is configured to slidably fit the first arc-shaped sliding groove; and a second support arm disposed on the main shaft assembly second side, wherein the second support arm is configured to rotate along a fourth rotation axis relative to the main shaft assembly, wherein the third rotation axis is parallel to the fourth rotation axis, wherein the second support arm is on a same positional side as the second support plate and is fastened to the second support plate, and wherein the second support arm comprises:

a second support arm first end rotatably connected to the main shaft assembly; and a second support arm second end comprising:

a second arc-shaped sliding groove disposed on the second support arm; and a second arc-shaped arm configured to slidably fit the second arc-shaped sliding groove; and a connecting frame group comprising:

a first connecting frame disposed on the main shaft assembly first side, wherein the first connecting frame is rotatably connected to the first support arm second end through the first arc-shaped sliding groove and the first arc-shaped arm, wherein the first arc-shaped sliding groove is disposed on the first connecting frame, and wherein the first guide rod arm second end is slidably connected to the first connecting frame; and a second connecting frame disposed on the main shaft assembly second side, wherein the second connecting frame is slidably connected to the second guide rod arm, wherein the second connecting frame is rotatably connected to the second support arm second end through the second arc-shaped sliding groove and the second arc-shaped arm, and wherein the second arc-shaped sliding groove and the second arc-shaped arm are disposed on the second connecting frame, wherein, when the first connecting frame rotates towards the second connecting frame, the first connecting frame and the second connecting frame slide in a first direction away from the first guide rod arm, the first support arm rotates relative to the first connecting frame, and the second support arm rotates relative to the second connecting frame such that the first support plate first end that is proximate to the main shaft assembly and the second support plate first end that is proximate to the main shaft assembly separately move in a second direction away from the main shaft assembly, and wherein, when the hinge mechanism is in the folded state, the first support plate first surface and the second support plate first surface are at an acute angle with the main shaft assembly, and the first support plate, the second support plate, and the main shaft assembly jointly enclose a flexible display accommodating space.

2. The hinge mechanism of claim 1, wherein, the first arc-shaped arm is configured to slide clockwise along the first arc-shaped sliding groove and the second arc-shaped arm is configured to slide anticlockwise along the second arc-shaped sliding groove when the first connecting frame and the second connecting frame rotate toward each other.

3. The hinge mechanism of claim 1, wherein the first connecting frame is configured to rotate in a first angle relative to the main shaft assembly, wherein the first support arm is configured to rotate in a second angle relative to the main shaft assembly, wherein the second connecting frame is configured to rotate in a third angle relative to the main shaft assembly, wherein the second support arm is configured to rotate in a fourth angle relative to the main shaft assembly, wherein the first angle is less than the second angle when the first connecting frame and the second connecting frame rotate toward each other, and wherein the third angle is less than the fourth angle when the first connecting frame and the second connecting frame rotate toward each other.

4. The hinge mechanism of claim 1, wherein the first support plate comprises a plurality of first sub-boards, wherein the first sub-boards are sequentially assembled and fastened to each other in an axial direction of the main shaft assembly, wherein each of the first sub-boards is configured to support the flexible display, and wherein at least one of the first sub-boards is fastened to the first support arm, wherein the second support plate comprises a plurality of second sub-boards, wherein the second sub-boards are sequentially assembled and fastened to each other in the axial direction of the main shaft assembly, wherein each of the second sub-boards is configured to support the flexible display, and wherein at least one of the second sub-boards is fastened to the second support arm.

5. The hinge mechanism of claim 1, wherein the first support plate and the first support arm are of an integrated structure, and wherein the second support plate and the second support arm are of an integrated structure.

6. The hinge mechanism of claim 1, wherein the first support arm comprises a first positioning post, wherein the first support plate comprises a first positioning hole corresponding to the first positioning post, wherein the first positioning post extends into the first positioning hole for positioning the first support arm with the first support plate, wherein the second support arm comprises a second positioning post, wherein the second support plate comprises a second positioning hole corresponding to the second positioning post, and wherein the second positioning post extends into the second positioning hole for positioning the second support arm with the second support plate.

7. The hinge mechanism of claim 6, further comprising:

a first plate body fastener, wherein the first support arm is fastened to the first support plate using the first plate body fastener; and a second plate body fastener, wherein the second support plate is fastened to the second support plate using the second plate body fastener.

8. The hinge mechanism of claim 7, wherein the first support arm is fastened to the first support plate using at least two of the first plate body fastener, wherein at least two of the first plate body fastener and the first positioning post are not on a first same straight line, wherein the second support arm is fastened to the second support plate using at least two of the second plate body fastener, and wherein at least two of the second plate body fastener and the second positioning post are not on a second same straight line.

9. The hinge mechanism of claim 1, wherein the first support arm comprises a third arc-shaped sliding groove, wherein the main shaft assembly comprises a third arc-shaped arm configured to slidably fit the third arc-shaped sliding groove, wherein the first support arm is rotatably connected to the main shaft assembly using the third arc-shaped sliding groove and the third arc-shaped arm, wherein the second support arm comprises a fourth arc-shaped sliding groove, wherein the main shaft assembly comprises a fourth arc-shaped arm configured to slidably fit the fourth arc-shaped sliding groove, wherein the second support arm is rotatably connected to the main shaft assembly using the fourth arc-shaped sliding groove and the fourth arc-shaped arm.

10. The hinge mechanism of claim 1, wherein the first connecting frame comprises a first linear sliding groove, wherein the first guide rod arm comprises a first sliding block that is configured to slidably fit the first linear sliding groove, wherein the first connecting frame is slidably connected to the first guide rod arm using the first linear sliding groove and the first sliding block, wherein the second connecting frame comprises a second linear sliding groove, wherein the second guide rod arm comprises a second sliding block that is configured to slidably fit the second linear sliding groove, and wherein the second connecting frame is slidably connected to the second guide rod arm using the second linear sliding groove.

11. The hinge mechanism of claim 1, wherein the main shaft assembly comprises a first connecting shaft and a second connecting shaft, and wherein the first guide rod arm is rotatably connected to the main shaft assembly using the first connecting shaft or the second guide rod arm is rotatably connected to the main shaft assembly using the second connecting shaft.

12. The hinge mechanism of claim 1, wherein the support assembly further comprises:

a first secondary support plate located on a side of the main shaft assembly and that faces the flexible display, wherein the first secondary support plate is configured to support the flexible display, and wherein the first secondary support plate comprises:

a first secondary support plate first end rotatably connected to the first support plate first end and that faces the main shaft assembly;

a first secondary support plate second end; and a first secondary support plate first surface; and a second secondary support plate that is located on the side of the main shaft assembly and that faces the flexible display, wherein the second secondary support plate is configured to support the flexible display, and wherein the second secondary support plate comprises:

a second secondary support plate first end rotatably connected to the second support plate first end and that faces the main shaft assembly;

a second secondary support plate second end; and a second secondary support plate first surface, wherein the hinge mechanism further comprises:

a first constraint structure that is configured to constrain a first moving track of the first secondary support plate second end and that is away from the first support plate; and a second constraint structure that is configured to constrain a second moving track of the second secondary support plate second end and that is away from the second support plate; and wherein when the hinge mechanism is switched from the unfolded state to the folded state:

the first secondary support plate and the second secondary support plate respectively rotate relative to the first support plate and the second support plate, the first secondary support plate second end and the second secondary support plate second end respectively rotate relative to the main shaft assembly under constraints of the first constraint structure and the second constraint structure, and respectively move toward the main shaft assembly first side and the main shaft assembly second side such that the first secondary support plate first surface and the second secondary support plate first surface support the flexible display and are at an obtuse angle with the main shaft assembly, and the first secondary support plate, the second secondary support plate, the first support plate, the second support plate, and the main shaft assembly jointly enclose the display accommodating space.

13. The hinge mechanism of claim 12, wherein the first secondary support plate is configured to rotate at a first angle relative to the main shaft assembly, wherein the first connecting frame is configured to rotate at a second angle relative to the main shaft assembly, wherein the second secondary support plate is configured to rotate at a third angle relative to the main shaft assembly, wherein the second connecting frame is configured to rotate at a fourth angle relative to the main shaft assembly, and wherein the first angle is less than the second angle and the third angle is less than the fourth angle when the hinge mechanism is switched from the unfolded state to the folded state.

14. The hinge mechanism of claim 12, further comprising a first support part and a second support part, wherein the first support part is disposed at the first support plate first end, wherein the first support part is configured to support the first secondary support plate when the hinge mechanism is switched to the unfolded state, wherein the second support part is disposed at the second support plate first end, and wherein the second support part is configured to support the second secondary support plate when the hinge mechanism is switched to the unfolded state.

15. The hinge mechanism of claim 14, wherein the first constraint structure comprises:

a first torsion spring disposed between the first secondary support plate and the first support plate, wherein the first torsion spring is configured to provide a first force for rotating the first secondary support plate toward the first support part; and a first limiting part disposed on the main shaft assembly, wherein the first secondary support plate presses against the first support part under the first force when the hinge mechanism is in the unfolded state, and wherein the first limiting part is configured to enable the first secondary support plate to rotate relative to the first support plate in a third direction away from the first support part when the hinge mechanism is switched from the unfolded state to the folded state, wherein the second constraint structure comprises:

a second torsion spring disposed between the second secondary support plate and the second support plate, wherein the second torsion spring is configured to provide a second force for rotating the second secondary support plate toward the second support part; and a second limiting part disposed on the main shaft assembly, wherein the second secondary support plate presses against the second support part under the second force when the hinge mechanism is in the unfolded state, and wherein the second limiting part is configured to enable the second secondary support plate to rotate relative to the second support plate in a fourth direction away from the second support part when the hinge mechanism is switched from the unfolded state to the folded state.

16. The hinge mechanism of claim 12, wherein the main shaft assembly comprises a first track slot and a second track slot, wherein the first constraint structure comprises a first sliding shaft disposed at the first secondary support plate second end, wherein the first sliding shaft is oriented in an axial direction of the main shaft assembly, extends into the first track slot and slidably fits the first track slot, wherein the first sliding shaft is configured to rotate in the first track slot, wherein the second constraint structure comprises a second sliding shaft disposed at the second secondary support plate second end, wherein the second sliding shaft is oriented in the axial direction of the main shaft assembly, extends into the second track slot, and slidably fits the second track slot, and wherein the second sliding shaft is configured to rotate in the second track slot.

17. The hinge mechanism of claim 16, wherein the first track slot comprises a first track slot first end that is proximate to a central axis of the main shaft assembly and a first track slot second end that is away from the central axis of the main shaft assembly, wherein the first track slot first end is open, wherein the first track slot second end is sealed, wherein the first track slot first end is for the first sliding shaft to enter and exit, wherein the first sliding shaft presses against the first track slot second end when the hinge mechanism is in the folded state to limit a first rotating angle at which the first secondary support plate rotates, wherein the second track slot comprises a second track slot first end that is proximate to the central axis of the main shaft assembly and a second track slot second end that is away from the central axis of the main shaft assembly, wherein the second track slot first end is open, wherein the second track slot second end is sealed, wherein the second track slot first end that is for the second sliding shaft to enter and exit, and wherein the second sliding shaft presses against the second track slot second end when the hinge mechanism is in the folded state to limit a second rotating angle at which the second secondary support plate rotates.

18. The hinge mechanism of claim 12, wherein the first support plate first end comprises a first elastic snap-fit and a first pin shaft, wherein the second support plate first end comprises a second elastic snap-fit and a second pin shaft, wherein the first support plate first end is rotatably connected to the first secondary support plate using the first pin shaft that is snap-fitted into the first elastic snap-fit and that rotatably fits the first elastic snap-fit, wherein the second support plate first end is rotatably connected to the second secondary support plate using the second pin shaft that is snap-fitted into the second elastic snap-fit and that rotatably fits the second elastic snap-fit.

19. The hinge mechanism of claim 12, wherein the first secondary support plate comprises a plurality of third sub-boards, wherein the third sub-boards are sequentially assembled and fastened to each other in an axial direction of the main shaft assembly, wherein each of the third sub-boards is configured to support the flexible display, wherein a third sub-board end of at least one of the third sub-boards is rotatably connected to the first support plate first end, wherein the second secondary support plate comprises a plurality of fourth sub-boards, wherein the fourth sub-boards are sequentially assembled and fastened to each other in the axial direction of the main shaft assembly, wherein each of the fourth sub-boards is configured to support the flexible display, and wherein a fourth sub-board end of at least one of the fourth sub-boards is rotatably connected to the second support plate first end.

20. The hinge mechanism of claim 1, wherein the main shaft assembly further comprises:

a first avoidance groove configured to rotate the first support plate, wherein the first avoidance groove comprises a first avoidance groove wall, and wherein the first avoidance groove wall is a first arc surface extending along a first rotation path of the first support plate first end; and a second avoidance groove configured to rotate the second support plate, wherein the second avoidance groove comprises a second avoidance groove wall, wherein the second avoidance groove is a second arc surface extending along a second rotation path of the second support plate first end, wherein the first support plate first end is in a first lap fit with the first avoidance groove wall for limiting the first support plate to move toward the main shaft assembly, and wherein the second support plate first end that is in second lap fit with the second avoidance groove wall for limiting the second support plate to move toward the main shaft assembly.

* * * * *